(12) United States Patent
Zhao et al.

(10) Patent No.: US 12,375,152 B2
(45) Date of Patent: Jul. 29, 2025

(54) BEAM SWITCHING METHOD AND APPARATUS

(71) Applicant: HUAWEI TECHNOLOGIES CO., LTD., Guangdong (CN)

(72) Inventors: Feiran Zhao, Hangzhou (CN); Ying Chen, Hangzhou (CN); Yunfei Qiao, Hangzhou (CN); Rong Li, Boulogne Billancourt (FR); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 18/479,523

(22) Filed: Oct. 2, 2023

(65) Prior Publication Data

US 2024/0030994 A1     Jan. 25, 2024

Related U.S. Application Data

(63) Continuation of application No. PCT/CN2022/083958, filed on Mar. 30, 2022.

(30) Foreign Application Priority Data

Apr. 28, 2021     (CN) .......................... 202110465462.0

(51) Int. Cl.
*H04B 7/06*     (2006.01)
*H04W 36/32*     (2009.01)

(52) U.S. Cl.
CPC ......... *H04B 7/0695* (2013.01); *H04B 7/0639* (2013.01); *H04W 36/322* (2023.05); *H04W 36/324* (2023.05)

(58) Field of Classification Search
CPC . H04B 7/0695; H04B 7/0639; H04W 36/322; H04W 36/324
See application file for complete search history.

(56) References Cited

U.S. PATENT DOCUMENTS 11,160,131 B2 *   10/2021   Sun .......................... H04W 8/02
12,047,965 B1 *   7/2024    Talakoub ............ H04W 72/566
(Continued)

FOREIGN PATENT DOCUMENTS

CN             110545138 A      12/2019

OTHER PUBLICATIONS

Zte, "Discussion on additional enhancement for NR-NTN," 3GPP TSG RAN WG1 #104e, R1-2100247, e-Meeting, Jan. 25-Feb. 5, 2021, 6 pages.
(Continued)

*Primary Examiner* — Jaison Joseph
(74) *Attorney, Agent, or Firm* — Fish & Richardson P.C.

(57) ABSTRACT

This application provides a beam switching method and apparatus. The beam switching method includes: A satellite device receives first location information of a terminal device. The satellite device sends first indication information, where the first indication information indicates one or more of K switching time periods. The K switching time periods are determined by the satellite device based on first information. The first information includes the first location information of the terminal device, location information of the satellite device, a velocity vector of the satellite device, and beam information of the satellite device. The K switching time periods are time periods in which the terminal device performs K times of beam switching.

20 Claims, 12 Drawing Sheets

(56) References Cited

U.S. PATENT DOCUMENTS

| | | | |
|---|---|---|---|
| 2019/0245614 A1* | 8/2019 | Lucky | H04B 7/2041 |
| 2020/0153500 A1* | 5/2020 | Kim | H04B 17/318 |
| 2021/0119698 A1* | 4/2021 | Atungsiri | H04B 7/2041 |
| 2021/0136641 A1* | 5/2021 | Roy | H04W 36/249 |
| 2022/0264417 A1* | 8/2022 | Zhou | H04B 7/2041 |
| 2022/0321206 A1* | 10/2022 | Shrestha | H04W 56/004 |
| 2022/0368401 A1* | 11/2022 | Yang | H04B 7/18541 |
| 2023/0074161 A1* | 3/2023 | Shrestha | H04W 48/14 |
| 2023/0232391 A1* | 7/2023 | Zhou | H04L 5/0091 |
| | | | 370/329 |
| 2023/0319800 A1* | 10/2023 | Zhu | H04W 36/06 |
| | | | 370/329 |
| 2024/0030994 A1* | 1/2024 | Zhao | H04W 36/322 |

OTHER PUBLICATIONS

International Search Report and Written Opinion in International Appln. No. PCT/CN2022/083958, mailed on Jul. 4, 2022, 16 pages (with English translation).

* cited by examiner

BEAM SWITCHING METHOD AND APPARATUS

CROSS-REFERENCE TO RELATED APPLICATIONS

This application is a continuation of International Patent Application No. PCT/CN2022/083958, filed on Mar. 30, 2022, which claims priority to Chinese Patent Application No. 202110465462.0, filed on Apr. 28, 2021. The disclosures of the aforementioned applications are hereby incorporated by reference in their entireties.

TECHNICAL FIELD

This application relates to the field of communication, and in particular, to a beam switching method and apparatus.

BACKGROUND

With the development of information technology, more urgent requirements are put forward for high efficiency, mobility, and diversity of communication. Satellites are irreplaceable in some important areas, such as space communication, aviation communication, maritime communication, military communication, and the like. Satellite communication has characteristics of long communication distance, large coverage, and flexible networking. It can provide services for both fixed terminals and mobile terminals. A conventional terrestrial communication network cannot provide seamless coverage for terminals, especially in special areas such as a desert, a forest, or an ocean, or in a high-speed moving vehicle such as an airplane or a high-speed railway. Therefore, a non-terrestrial network (NTN) technology in a 5th generation (5G) mobile communication system emerges. It provides seamless coverage for terminals by deploying base stations or some base station functions on high-altitude platforms (HAP) or satellites. The high-altitude platforms or satellites are less affected by natural disasters, improving the reliability of the 5G system.

Currently, high frequency communication based on an analog beam is used in a 5G network. When a serving beam is switched between a radio access network device and a terminal device, the terminal device usually measures a candidate beam in advance, and performs beam reporting and beam switching based on a beam indication delivered by the radio access network device. In addition, after the beam switching succeeds, acknowledgment signaling is further required. The foregoing series of procedures are complex. Because frequent beam and cell switching in new radio (NR) cause inevitable signaling overheads and processing delays, a beam switching speed and efficiency are affected, and measurement and power consumption of the terminal are increased. Therefore, how to resolve an increase in signaling overheads and terminal power consumption caused by the frequent beam and cell switching in the NTN is an urgent problem to be resolved.

SUMMARY

This application provides a beam switching method and apparatus, to effectively reduce signaling overheads caused by frequent beam and cell switching in an NTN, reduce measurement of a terminal, and reduce power consumption of the terminal.

According to a first aspect, a beam switching method is provided. The method may be performed by a network device, or may be performed by a chip or a circuit used for the network device, or may be performed by a satellite device. This is not limited in this application. For ease of description, the following uses an example in which the network device performs an operation for description.

The method includes: The network device receives first location information of a terminal device. The network device determines K switching time periods based on first information. The first information includes the first location information of the terminal device, location information of a satellite device, a velocity vector of the satellite device, and beam information of the satellite device. The K switching time periods are time periods in which the terminal device performs K times of beam switching, and K is a positive integer greater than or equal to 1. The network device sends first indication information, and the first indication information indicates one or more of the K switching time periods.

It should be noted that the solution provided in embodiments of this application is also applicable to cell switching, and the location information of the terminal device is periodically reported by the terminal device.

According to the solution provided in this application, the network device can predict relative movement trajectory information of a user in a satellite cell based on beam ground topology information and initial access location information of the user, and automatically complete beam switching in a timing manner based on the feature design. This effectively resolves signaling overheads caused by frequent beam switching in the NTN. In addition, the network device can reduce reference signal received power L1-RSRP measurement of the terminal device by delivering switching beam identification information, to achieve the objectives of saving energy and reducing system power consumption.

With reference to the first aspect, in some implementations of the first aspect, the beam information of the satellite device includes a pitch angle and an azimuth of a beam. The beam information of the satellite device and the location information of the satellite device are for determining a satellite beam topology. The satellite beam topology includes a projection shape, a beam width, and a beam boundary of the beam on the ground, and the satellite beam topology, the first location information of the terminal device, and the velocity vector of the satellite device are for determining a movement trajectory of the terminal device.

The satellite beam topology includes a projection shape, a beam width, and a beam boundary of a satellite beam on the ground.

For example, the network device determines a time at which the terminal device performs the K times of beam switching based on the movement trajectory of the terminal device.

With reference to the first aspect, in some implementations of the first aspect, the network device sends a first message list. The first message list indicates the K switching time periods. The first message list includes K indexes and K time periods. The K indexes are in a one-to-one correspondence with the K time periods. The K indexes indicate a sequence of the K times of beam switching, and the sequence of the K times of beam switching is a sequence of beam switching performed when the terminal device moves out of a cell covered by the satellite device from a current location. The K time periods indicate a time period in which the terminal device sequentially performs beam switching from a current moment to an $i^{th}$ time of beam switching, and i is a positive integer greater than or equal to 1 and less than or equal to K.

With reference to the first aspect, in some implementations of the first aspect, the network device receives second location information of the terminal device. When a distance difference between the second location information of the terminal device and a predetermined location in the movement trajectory of the terminal device is greater than a first preset threshold, the network device updates the movement trajectory of the terminal device and the first message list, and the network device sends an updated first message list to the terminal device.

With reference to the first aspect, in some implementations of the first aspect, the first message list includes K pieces of beam identification information. The K pieces of beam identification information are in a one-to-one correspondence with the K time periods. The K pieces of beam identification information identify corresponding beams on which the K times of beam switching are sequentially performed.

With reference to the first aspect, in some implementations of the first aspect, values of the K time periods are obtained in a differential manner.

With reference to the first aspect, in some implementations of the first aspect, the network device broadcasts a second message list. The second message list indicates the K switching time periods. The second message list includes K indexes and K time periods. The K indexes are in a one-to-one correspondence with the K time periods. Each of the K indexes indicates a quantity of beam spacings crossed by a relative location of the terminal device from a current location to a $j^{th}$ time of beam switching. The K time periods indicate a time period in which the terminal device performs beam switching from a current moment to the $j^{th}$ time of beam switching, and j is a positive integer greater than or equal to 1 and less than or equal to N. The network device sends second indication information. The second indication information includes a first index. The first index is one of the K indexes. The second indication information indicates a time period of beam switching corresponding to the first index.

With reference to the first aspect, in some implementations of the first aspect, the second indication message further includes identification information of a first beam. The identification information of the first beam is beam identification information of beam switching performed by the terminal device for the $j^{th}$ time, and the identification information of the first beam corresponds to the first index.

With reference to the first aspect, in some implementations of the first aspect, the second indication information is determined based on second information. The second information includes a distance from the first location information of the terminal device to a current beam boundary, a quantity of the beam spacings, and a span of a reference beam. The reference beam is a beam having a largest span along a satellite motion direction, and the quantity of beam spacings is obtained by evenly dividing the reference beam.

With reference to the first aspect, in some implementations of the first aspect, the network device determines a time spent by crossing each beam spacing based on the beam information, the satellite velocity vector, and the quantity of beam spacings.

With reference to the first aspect, in some implementations of the first aspect, the network device calculates a distance from the relative location of the terminal device to the current beam boundary based on the first location information of the terminal device and the satellite beam topology.

With reference to the first aspect, in some implementations of the first aspect, the network device evenly divides the reference beam into P beam spacings based on the satellite beam topology. The reference beam is a beam that has a largest span along a satellite motion direction, and P is a quantity of indexes of the second message list.

Optionally, for cell switching, the network device determines a cell topology based on cell information. The network device evenly divides a maximum span of the cell into Q cell intervals along the satellite motion direction, and Q is a quantity of indexes of the second message list.

With reference to the first aspect, in some implementations of the first aspect, the network device sends first information. The first information indicates a time period corresponding to each beam spacing. The first information is determined based on the beam information of the satellite device, the velocity vector of the satellite device, and the quantity of beam spacings.

With reference to the first aspect, in some implementations of the first aspect, the network device receives the second location information of the terminal device; and when idx #0 and idx #1 meet:

$$\text{Floor}\left(\frac{t1}{T}\right) + idx\#1 \neq idx\#0$$

in this way, idx #0 represents the quantity of beam spacings crossed by the relative location of the terminal device from the current location to the $j^{th}$ time of beam switching, idx #1 represents a quantity of beam spacings crossed by the relative location of the terminal device from a moment that the $j^{th}$ time of beam switching is completed to a $(j+1)^{th}$ time of beam switching, T represents a time that the terminal device crosses each beam spacing, and t1 represents a time spent by the network device from sending idx #0 to receiving the second location information of the terminal device. The network device sends third indication information. The indication information includes a second index. The second index is one of the K indexes. The third indication information indicates a time period of beam switching corresponding to the second index. The third indication information is different from the second indication information.

According to a second aspect, a beam switching method is provided. The method may be performed by a network device, or may be performed by a chip or a circuit used for the network device, or may be performed by a satellite device. This is not limited in this application. For ease of description, the following uses an example in which the network device performs an operation for description.

The method includes: The network device broadcasts a satellite ephemeris message list. The satellite ephemeris message list includes a synchronization signal block identifier, a beam angle of the satellite device, and location information of the satellite device. The satellite ephemeris message list is for determining a satellite beam topology around a terminal device. The network device receives a first request message. The first request message includes identification information of a second beam. The identification information of the second beam is determined based on the satellite ephemeris message list. The first request message is for requesting to switch from a current serving beam to the second beam in a first time period, and the first time period is determined based on first location information of the terminal device and the satellite ephemeris message list.

Based on the solution provided in this application, the network device broadcasts the satellite ephemeris message list, to enable the terminal device to predict the satellite beam topology around the terminal device, and prepare a resource configuration for beam switching, for example, a partial bandwidth BWP, by receiving a beam switching request message that carries beam identification information from the terminal device, so that the terminal device automatically completes beam switching. This can effectively resolve signaling overheads caused by frequent beam switching in the NTN, and reduce system power consumption.

Optionally, after completing the resource configuration, the network device may send a response message to the terminal device, to indicate that the terminal device may complete beam switching by itself.

With reference to the second aspect, in some implementations of the second aspect, a ground topology of the current serving beam is determined based on angle information of the current serving beam and the location information of the satellite device.

With reference to the second aspect, in some implementations of the second aspect, the network device receives second location information of the terminal device. When a distance difference between the second location information of the terminal device and a predetermined location in a movement trajectory of the terminal device is greater than a second preset threshold, the network device receives a second request message. The second request message includes identification information of a third beam. The second request message is for requesting to switch from the current serving beam to the third beam in a second time period. The first time period is determined based on the second location information of the terminal device and the satellite ephemeris message list. The third beam is different from the second beam, and the second time period is different from the first time period.

According to a third aspect, a beam switching method is provided. The method may be performed by a terminal device, or may be performed by a chip or a circuit used for the terminal device. This is not limited in this application. For ease of description, the following uses an example in which the terminal device performs an operating for description.

The method includes: The terminal device sends first location information of the terminal device. The terminal device receives first indication information. The first indication information indicates one or more of K switching time periods. The K switching time periods are determined based on first information. The first information includes the first location information of the terminal device, location information of the satellite device, a velocity vector of the satellite device, and beam information of the satellite device. The K switching time periods are time periods in which the terminal device performs K times of beam switching, and K is a positive integer greater than or equal to 1. The terminal device performs beam switching based on the first indication information.

It should be noted that the solution provided in embodiments of this application is also applicable to cell switching, and the location information of the terminal device is periodically reported by the terminal device.

According to the solution provided in this application, the network device can predict relative movement trajectory information of a user in a satellite cell based on beam ground topology information and initial access location information of the user, and automatically complete beam switching in a timing manner based on the feature design. This effectively resolves signaling overheads caused by frequent beam switching in the NTN. In addition, the satellite device can reduce reference signal received power L1-RSRP measurement of the terminal device by delivering switching beam identification information, to achieve the objectives of saving energy and reducing system power consumption.

With reference to the third aspect, in some implementations of the third aspect, the beam information of the satellite device includes a pitch angle and an azimuth of a beam. The beam information of the satellite device and the location information of the satellite device are for determining a satellite beam topology. The satellite beam topology includes a projection shape, a beam width, and a beam boundary of the beam on the ground, and the satellite beam topology, third location information of the terminal device, and the velocity vector of the satellite device are for determining a movement trajectory of the terminal device.

The satellite beam topology includes a projection shape, a beam width, and a beam boundary of a satellite beam on the ground.

For example, a time period for the K times of beam switching is determined based on the movement trajectory of the terminal device.

With reference to the third aspect, in some implementations of the third aspect, the terminal device receives a first message list. The first message list indicates the K switching time periods. The first message list includes K indexes and K time periods. The K indexes are in a one-to-one correspondence with the K time periods. The K indexes indicate a sequence of the K times of beam switching, and the sequence of the K times of beam switching is a sequence of beam switching performed when the terminal device moves out of a cell covered by the satellite device from a current location. The K time periods indicate a time period in which the terminal device sequentially performs beam switching from a current moment to an $i^{th}$ time of beam switching, and i is a positive integer greater than or equal to 1 and less than or equal to K. The terminal device performs beam switching based on the first message list.

With reference to the third aspect, in some implementations of the third aspect, the terminal device sends second location information of the terminal device. When a distance difference between the second location information of the terminal device and the first location information of the terminal device is greater than a first preset threshold, the terminal device receives an updated first message list from the network device.

With reference to the third aspect, in some implementations of the third aspect, the first message list includes K pieces of beam identification information. The K pieces of beam identification information are in a one-to-one correspondence with the K time periods. The K pieces of beam identification information identify corresponding beams on which the K times of beam switching are sequentially performed.

With reference to the third aspect, in some implementations of the third aspect, values of the K time periods are obtained in a differential manner.

With reference to the third aspect, in some implementations of the third aspect, the terminal device receives a second message list. The second message list indicates the K switching time periods. The second message list includes K indexes and K time periods. The K indexes are in a one-to-one correspondence with the K time periods. Each of the K indexes indicates a quantity of beam spacings crossed by a relative location of the terminal device from a current location to a $j^{th}$ time of beam switching. The K time periods indicate a time period in which the terminal device performs beam switching from a current moment to the $j^{th}$ time of beam switching, and j is a positive integer greater than or equal to 1 and less than or equal to N. The terminal device receives second indication information. The second indication information includes a first index. The first index is one of the K indexes. The second indication information indicates a time period of beam switching corresponding to the first index. The terminal device determines a time period of beam switching based on the second indication information, and completes beam switching by itself.

With reference to the third aspect, in some implementations of the third aspect, the second indication message further includes identification information of a first beam. The identification information of the first beam is beam identification information of beam switching performed by the terminal device for the $j^{th}$ time. The identification information of the first beam corresponds to the first index. The terminal device performs beam switching based on the identification information of the first beam.

With reference to the third aspect, in some implementations of the third aspect, the second indication information is determined based on second information. The second information includes a distance from the first location information of the terminal device to a current beam boundary, a quantity of beam spacings, and a span of a reference beam. The reference beam is a beam having a largest span along a satellite motion direction, and the quantity of beam spacings is obtained by evenly dividing the reference beam.

With reference to the third aspect, in some implementations of the third aspect, the terminal device receives first information. The first information indicates a time period corresponding to each beam spacing. The first information is determined based on the beam information of the satellite device, the velocity vector of the satellite device, and the quantity of beam spacings.

With reference to the third aspect, in some implementations of the third aspect, the terminal device sends the second location information of the terminal device; and when idx #0 and idx #1 meet:

$$\text{Floor}\left(\frac{t1}{T}\right) + idx\#1 \neq idx\#0$$

in this way, idx #0 represents the quantity of beam spacings crossed by the relative location of the terminal device from the current location to the $j^{th}$ time of beam switching, idx #1 represents a quantity of beam spacings crossed by the relative location of the terminal device from a moment that the $j^{th}$ time of beam switching is completed to a $(j+1)^{th}$ time of beam switching, T represents a time that the terminal device crosses each beam spacing, and t1 represents a time spent by the network device from sending idx #0 to receiving the second location information of the terminal device. The terminal device receives third indication information. The third indication information includes a second index. The second index is one of the K indexes. The third indication information indicates a time period of beam switching corresponding to the second index. The third indication information is different from the second indication information.

With reference to the third aspect, in some implementations of the third aspect, the terminal device determines beam identification information used by the terminal device to perform beam switching based on signal strength of a synchronization signal block. The terminal device performs beam switching based on the beam identification information.

According to a fourth aspect, a beam switching method is provided. The method may be performed by a terminal device, or may be performed by a chip or a circuit used for the terminal device. This is not limited in this application. For ease of description, the following uses an example in which the terminal device performs an operating for description.

The method includes: The terminal device receives a satellite ephemeris message list. The satellite ephemeris message list includes a synchronization signal block identifier, a beam angle of a satellite device, and location information of the satellite device. The satellite ephemeris message list is for determining a satellite beam topology around the terminal device. The terminal device sends a first request message. The first request message includes identification information of a second beam. The identification information of the second beam is determined based on the satellite ephemeris message list. The first request message is for requesting to switch from a current serving beam to the second beam in a first time period, and the first time period is determined based on first location information of the terminal device and the satellite ephemeris message list.

Based on the solution provided in this application, the terminal device can predict the satellite beam topology around the terminal device by receiving the satellite ephemeris message list of the satellite device and initial access location information of a user, and automatically complete beam switching by sending a beam switching request message that carries the identification information to a network device. This can effectively resolve signaling overheads caused by frequent beam switching in the NTN, and reduce system power consumption.

Optionally, the terminal device receives a response message from the network device. The response message indicates that the terminal device may complete beam switching by itself. Correspondingly, the terminal device performs beam switching based on the response message, a time of beam switching, and the corresponding beam identification information.

With reference to the fourth aspect, in some implementations of the fourth aspect, a ground topology of the current serving beam is determined based on angle information of the current serving beam and the location information of the satellite device.

With reference to the fourth aspect, in some implementations of the fourth aspect, the terminal device sends second location information of the terminal device. When a distance difference between the second location information of the terminal device and a predetermined location in a movement trajectory of the terminal device is greater than a second preset threshold, the terminal device sends a second request message. The second request message includes identification information of a third beam. The second request message is for requesting to switch from the current serving beam to the third beam in a second time period. The first time period is determined based on the second location information of the terminal device and the satellite ephemeris message list. The third beam is different from the second beam, and the second time period is different from the first time period.

According to a fifth aspect, a beam switching apparatus is provided. The apparatus includes: a transceiver unit, configured to receive, by a network device, first location information of a terminal device; and a processing unit, configured to determine, by the network device, K switching time periods based on first information. The first information includes the first location information of the terminal device, location information of the satellite device, a velocity vector of the satellite device, and beam information of the satellite device. The K switching time periods are time periods in which the terminal device performs K times of beam switching, and K is a positive integer greater than or equal to 1. The transceiver unit is further configured to send, by the network device, first indication information. The first indication information indicates one or more of the K switching time periods.

It should be noted that embodiments of this application are also applicable to cell switching, and the location information of the terminal device is periodically reported by the terminal device.

With reference to the fifth aspect, in some implementations of the fifth aspect, the beam information of the satellite device includes a pitch angle and an azimuth of a beam. The beam information of the satellite device and the location information of the satellite device are for determining a satellite beam topology. The satellite beam topology includes a projection shape, a beam width, and a beam boundary of the beam on the ground, and the satellite beam topology, the first location information of the terminal device, and the velocity vector of the satellite device are for determining a movement trajectory of the terminal device.

The satellite beam topology includes a projection shape, a beam width, and a beam boundary of a satellite beam on the ground.

For example, the network device determines a time period at which the terminal device performs the K times of beam switching based on the movement trajectory of the terminal device.

With reference to the fifth aspect, in some implementations of the fifth aspect, the transceiver unit is further configured for the network device to send a first message list. The first message list indicates the K switching time periods. The first message list includes K indexes and K time periods. The K indexes are in a one-to-one correspondence with the K time periods. The K indexes indicate a sequence of the K times of beam switching, and the sequence of the K times of beam switching is a sequence of beam switching performed when the terminal device moves out of a cell covered by the satellite device from a current location. The K time periods indicate a time period in which the terminal device sequentially performs beam switching from a current moment to an $i^{th}$ time of beam switching, and i is a positive integer greater than or equal to 1 and less than or equal to K.

With reference to the fifth aspect, in some implementations of the fifth aspect, the transceiver unit is further configured for the network device to receive second location information of the terminal device. The processing unit is further configured to: when a distance difference between the second location information of the terminal device and a predetermined location in the movement trajectory of the terminal device is greater than a first preset threshold, update, by the network device, the movement trajectory of the terminal device and the first message list. The transceiver unit is further configured for the network device to send an updated first message list to the terminal device.

With reference to the fifth aspect, in some implementations of the fifth aspect, the first message list includes K pieces of beam identification information. The K pieces of beam identification information are in a one-to-one correspondence with the K time periods. The K pieces of beam identification information identify corresponding beams on which the K times of beam switching are sequentially performed.

With reference to the fifth aspect, in some implementations of the fifth aspect, values of the K time periods are obtained in a differential manner.

With reference to the fifth aspect, in some implementations of the fifth aspect, the transceiver unit is further configured for the network device to broadcast a second message list. The second message list indicates the K switching time periods. The second message list includes K indexes and the K time periods. The K indexes are in a one-to-one correspondence with the K time periods. Each of the K indexes indicates a quantity of beam spacings crossed by a relative location of the terminal device from a current location to a $j^{th}$ time of beam switching. The K time periods indicate a time period in which the terminal device performs beam switching from a current moment to the $j^{th}$ time of beam switching, and j is a positive integer greater than or equal to 1 and less than or equal to N. The transceiver unit is further configured for the network device to send second indication information. The second indication information includes a first index. The first index is one of the K indexes. The second indication information indicates a time period of beam switching corresponding to the first index.

With reference to the fifth aspect, in some implementations of the fifth aspect, the second indication message further includes identification information of a first beam. The identification information of the first beam is beam identification information of beam switching performed by the terminal device for the $j^{th}$ time, and the identification information of the first beam corresponds to the first index.

With reference to the fifth aspect, in some implementations of the fifth aspect, the second indication information is determined based on second information. The second information includes a distance from the first location information of the terminal device to a current beam boundary, a quantity of beam spacings, and a span of a reference beam. The reference beam is a beam having a largest span along a satellite motion direction, and the quantity of beam spacings is obtained by evenly dividing the reference beam.

With reference to the fifth aspect, in some implementations of the fifth aspect, the processing unit is further configured for the network device to determine a time spent by crossing each beam spacing based on the beam information, the satellite velocity vector, and the quantity of beam spacings.

With reference to the fifth aspect, in some implementations of the fifth aspect, the processing unit is further configured for the network device to calculate a distance from the relative location of the terminal device to the current beam boundary based on the first location information of the terminal device and the satellite beam topology.

With reference to the fifth aspect, in some implementations of the fifth aspect, the processing unit is further configured for the network device to evenly divide the reference beam into P beam spacings based on the satellite beam topology. The reference beam is a beam that has a largest span along a satellite motion direction, and P is a quantity of indexes of the second message list.

Optionally, for cell switching, the network device determines a cell topology based on cell information. In addition, the network device evenly divides a maximum span of the cell into Q cell intervals along the satellite motion direction, and Q is a quantity of indexes of the second message list.

With reference to the fifth aspect, in some implementations of the fifth aspect, the transceiver unit is further configured for the network device to send first information. The first information indicates a time period corresponding to each beam spacing. The first information is determined based on the beam information of the satellite device, the velocity vector of the satellite device, and the quantity of beam spacings.

With reference to the fifth aspect, in some implementations of the fifth aspect, the transceiver unit is further configured for the network device to receive the second location information of the terminal device; and when idx #0 and idx #1 meet:

$$\text{Floor}\left(\frac{t1}{T}\right) + idx\#1 \neq idx\#0$$

in this way, idx #0 represents the quantity of beam spacings crossed by the relative location of the terminal device from the current location to the $j^{th}$ time of beam switching, idx #1 represents a quantity of beam spacings crossed by the relative location of the terminal device from a moment that the $j^{th}$ time of beam switching is completed to a $(j+1)^{th}$ time of beam switching, T represents a time that the terminal device crosses each beam spacing, and t1 represents a time spent by the network device from sending idx #0 to receiving the second location information of the terminal device. The transceiver unit is further configured for the network device to send third indication information. The third indication information indicates a time period corresponding to the second index. The third indication information is different from the second indication information.

According to a sixth aspect, a beam switching apparatus is provided. The apparatus includes: a transceiver unit. The transceiver unit is configured for a network device to broadcast a satellite ephemeris message list. The satellite ephemeris message list includes a synchronization signal block identifier, a beam angle of a satellite device, and location information of the satellite device. The satellite ephemeris message list is for determining a satellite beam topology around a terminal device. The transceiver unit is further configured for the network device to receive a first request message. The first request message includes identification information of a second beam. The identification information of the second beam is determined based on the satellite ephemeris message list. The first request message is for requesting to switch from a current serving beam to the second beam in a first time period, and the first time period is determined based on first location information of the terminal device and the satellite ephemeris message list.

Optionally, after the network device completes resource configuration, the transceiver unit is further configured for the network device to send a response message to the terminal device, to indicate that the terminal device may complete beam switching by itself.

With reference to the sixth aspect, in some implementations of the sixth aspect, a ground topology of the current serving beam is determined based on angle information of the current serving beam and the location information of the satellite device.

With reference to the sixth aspect, in some implementations of the sixth aspect, the transceiver unit is further configured for the network device to receive second location information of the terminal device. When a distance difference between the second location information of the terminal device and a predetermined location in a movement trajectory of the terminal device is greater than a second preset threshold, the network device receives a second request message. The second request message includes identification information of a third beam. The second request message is for requesting to switch from the current serving beam to the third beam in a second time period. The first time period is determined based on the second location information of the terminal device and the satellite ephemeris message list. The third beam is different from the second beam, and the second time period is different from the first time period.

According to a seventh aspect, a beam switching apparatus is provided. The apparatus includes: a transceiver unit. The transceiver unit is configured for a terminal device to send first location information of the terminal device. The transceiver unit is further configured for the terminal device to receive the first indication information. The first indication information indicates one or more of K switching time periods. The K switching time periods are determined based on first information. The first information includes the first location information of the terminal device, location information of the satellite device, a velocity vector of the satellite device, and beam information of the satellite device. The K switching time periods are time periods in which the terminal device performs K times of beam switching, and K is a positive integer greater than or equal to 1. The apparatus further includes a processing unit. The processing unit is configured for the terminal device to perform beam switching based on the first indication information.

It should be noted that embodiments of this application are also applicable to cell switching, and the location information of the terminal device is periodically reported by the terminal device.

With reference to the seventh aspect, in some implementations of the seventh aspect, the beam information of the satellite device includes a pitch angle and an azimuth of a beam. The beam information of the satellite device and the location information of the satellite device are for determining a satellite beam topology. The satellite beam topology includes a projection shape, a beam width, and a beam boundary of the beam on the ground, and the satellite beam topology, third location information of the terminal device, and the velocity vector of the satellite device are for determining a movement trajectory of the terminal device. The satellite beam topology includes a projection shape, a beam width, and a beam boundary of a satellite beam on the ground.

For example, a time period for the K times of beam switching is determined based on the movement trajectory of the terminal device.

With reference to the seventh aspect, in some implementations of the seventh aspect, the transceiver unit is further configured for the terminal device to receive a first message list. The first message list indicates the K switching time periods. The first message list includes K indexes and K time periods. The K indexes are in a one-to-one correspondence with the K time periods. The K indexes indicate a sequence of the K times of beam switching, and the sequence of the K times of beam switching is a sequence of beam switching performed when the terminal device moves out of a cell covered by the satellite device from a current location. The K time periods indicate a time period in which the terminal device sequentially performs beam switching from a current moment to an $i^{th}$ time of beam switching, and i is a positive integer greater than or equal to 1 and less than or equal to K. The terminal device performs beam switching based on the first message list.

With reference to the seventh aspect, in some implementations of the seventh aspect, the transceiver unit is further configured for the terminal device to send second location information of the terminal device. In addition, when a distance difference between the second location information of the terminal device and the first location information of the terminal device is greater than a first preset threshold, the transceiver unit is further configured to receive an updated first message list from the network device.

With reference to the seventh aspect, in some implementations of the seventh aspect, the first message list includes K pieces of beam identification information. The K pieces of beam identification information are in a one-to-one correspondence with the K time periods. The K pieces of beam identification information identify corresponding beams on which the K times of beam switching are sequentially performed.

With reference to the seventh aspect, in some implementations of the seventh aspect, values of the K time periods are obtained in a differential manner.

With reference to the seventh aspect, in some implementations of the seventh aspect, the transceiver unit is further configured for the terminal device to receive a second message list. The second message list indicates the K switching time periods. The second message list includes K indexes and K time periods. The K indexes are in a one-to-one correspondence with the K time periods. Each of the K indexes indicates a quantity of beam spacings crossed by a relative location of the terminal device from a current location to a $j^{th}$ time of beam switching. The K time periods indicate a time period in which the terminal device performs beam switching from a current moment to the $j^{th}$ time of beam switching, and j is a positive integer greater than or equal to 1 and less than or equal to N. The transceiver unit is further configured for the terminal device to receive second indication information. The second indication information includes a first index. The first index is one of the K indexes. The second indication information indicates a time period of beam switching corresponding to the first index. The processing unit is further configured for the terminal device to determine a time period of beam switching based on the second indication information, and completes beam switching by itself.

With reference to the seventh aspect, in some implementations of the seventh aspect, the second indication message further includes identification information of a first beam. The identification information of the first beam is beam identification information of beam switching performed by the terminal device for the $j^{th}$ time, and the identification information of the first beam corresponds to the first index.

With reference to the seventh aspect, in some implementations of the seventh aspect, the second indication information is determined based on second information. The second information includes a distance from the first location information of the terminal device to a current beam boundary, a quantity of beam spacings, and a span of a reference beam. The reference beam is a beam having a largest span along a satellite motion direction, and the quantity of beam spacings is obtained by evenly dividing the reference beam.

With reference to the seventh aspect, in some implementations of the seventh aspect, the transceiver unit is further configured for the terminal device to receive first information. The first information indicates a time period corresponding to each beam spacing. The first information is determined based on the beam information of the satellite device, the velocity vector of the satellite device, and the quantity of beam spacings.

With reference to the seventh aspect, in some implementations of the seventh aspect, the transceiver unit is further configured for the terminal device to send the second location information of the terminal device; and when idx #0 and idx #1 meet:

$$\text{Floor}\left(\frac{t1}{T}\right) + idx\#1 \neq idx\#0$$

in this way, idx #0 represents the quantity of beam spacings crossed by the relative location of the terminal device from the current location to the $j^{th}$ time of beam switching, idx #1 represents a quantity of beam spacings crossed by the relative location of the terminal device from a moment that the $j^{th}$ time of beam switching is completed to a $(j+1)^{th}$ time of beam switching, T represents a time that the terminal device crosses each beam spacing, and t1 represents a time spent by the network device from sending idx #0 to receiving the second location information of the terminal device. The transceiver unit is further configured for the terminal device to receive third indication information. The third indication information includes a second index. The second index is one of the K indexes. The third indication information indicates a time period of beam switching corresponding to the second index. The third indication information is different from the second indication information.

With reference to the seventh aspect, in some implementations of the seventh aspect, the processing unit is further configured for the terminal device to determine beam identification information used by the terminal device to perform beam switching based on signal strength of a synchronization signal block. In addition, the terminal device performs beam switching based on the beam identification information.

According to an eighth aspect, a beam switching apparatus is provided. The apparatus includes: a transceiver unit. The transceiver unit is configured for a terminal device to receive a satellite ephemeris message list. The satellite ephemeris message list includes a synchronization signal block identifier, a beam angle of a satellite device, and location information of the satellite device. The satellite ephemeris message list is for determining a satellite beam topology around the terminal device. The transceiver unit is further configured for the terminal device to send a first request message. The first request message includes identification information of a second beam. The identification information of the second beam is determined based on the satellite ephemeris message list. The first request message is for requesting to switch from a current serving beam to the second beam in a first time period, and the first time period is determined based on first location information of the terminal device and the satellite ephemeris message list.

Optionally, the transceiver unit is further configured for the terminal device to receive a response message from the network device. The response message indicates that the terminal device may complete beam switching by itself. Correspondingly, the terminal device performs beam switching based on the response message, the time period of beam switching, and the corresponding beam identification information.

With reference to the eighth aspect, in some implementations of the eighth aspect, a ground topology of the current serving beam is determined based on angle information of the current serving beam and the location information of the satellite device.

With reference to the eighth aspect, in some implementations of the eighth aspect, the transceiver unit is further configured for the terminal device to send second location information of the terminal device. When a distance difference between the second location information of the terminal device and a predetermined location in a movement trajectory of the terminal device is greater than a second preset threshold, the terminal device sends a second request message. The second request message includes identification information of a third beam. The second request message is for requesting to switch from the current serving beam to the third beam in a second time period. The first time period is determined based on the second location information of the terminal device and the satellite ephemeris message list. The third beam is different from the second beam, and the second time period is different from the first time period.

According to a ninth aspect, a network device is provided. The network device includes a processor. Optionally, the network device further includes a memory. The processor is configured to control a transceiver to send and receive signals. The memory is configured to store a computer program. The processor is configured to invoke the computer program from the memory and run the computer program, to enable the network device to perform the method in the first aspect or any one of the possible implementations of the first aspect, or enable the network device to perform the method in the second aspect or any one of the possible implementations of the second aspect.

Optionally, there are one or more processors, and there are one or more memories.

Optionally, the memory may be integrated with the processor, or the memory and the processor are separately disposed.

Optionally, the network device further includes a transceiver. The transceiver may be specifically a transmitting machine (transmitter) and a receiving machine (receiver).

According to a tenth aspect, a terminal device is provided. The terminal device includes a processor. Optionally, the network device further includes a memory. The processor is configured to control a transceiver to send and receive signals. The memory is configured to store a computer program. The processor is configured to invoke the computer program from the memory and run the computer program, to enable the terminal device to perform the method in the third aspect or any one of the possible implementations of the third aspect, or enable the terminal device to perform the method in the fourth aspect or any one of the possible implementations of the fourth aspect.

Optionally, there are one or more processors, and there are one or more memories.

Optionally, the memory may be integrated with the processor, or the memory and the processor are separately disposed.

Optionally, the terminal device further includes a transceiver. The transceiver may be specifically a transmitting machine (transmitter) and a receiving machine (receiver).

According to an eleventh aspect, a beam switching apparatus is provided. The beam switching apparatus includes a processor. The processor is coupled to a memory. The processor is configured to execute a computer program stored in the memory, to enable the apparatus to perform the method in the first aspect or any one of the possible implementations of the first aspect, or perform the method in the second aspect or any one of the possible implementations of the second aspect. Alternatively, the apparatus is enabled to perform the method in the third aspect or any one of the possible implementations of the third aspect, or perform the method in the fourth aspect or any one of the possible implementations of the fourth aspect.

According to a twelfth aspect, a communication apparatus is provided. The communication apparatus includes: modules or units configured to implement the method in the first aspect or any one of the possible implementations of the first aspect, or modules or units configured to implement the method in the second aspect or any one of the possible implementations of the second aspect, or modules or units configured to implement the method in the third aspect or any one of the possible implementations of the third aspect, or modules or units configured to implement the method in the fourth aspect or any one of the possible implementations of the fourth aspect.

According to a thirteenth aspect, a communication system is provided. The communication system includes: a network device, configured to perform the method in the first aspect or any one of the possible implementations of the first aspect, or configured to perform the method in the second aspect or any one of the possible implementations of the second aspect; and a terminal device, configured to perform the method in the third aspect or any one of the possible implementations of the third aspect, and configured to perform the method in the fourth aspect or any one of the possible implementations of the fourth aspect.

According to a fourteenth aspect, a computer-readable storage medium is provided. The computer-readable storage medium stores a computer program or code. When the computer program or code is run on a computer, the computer is enabled to perform the method in the first aspect or any one of the possible implementations of the first aspect, or the method in the second aspect or any one of the possible implementations of the second aspect, or the method in the third aspect or any one of the possible implementations of the third aspect, or the method in the fourth aspect or any one of the possible implementations of the fourth aspect.

According to a fifteenth aspect, a chip is provided. The chip includes at least one processor. The at least one processor is coupled to a memory. The memory is configured to store a computer program. The processor is configured to invoke the computer program from the memory and run the computer program, to enable a network device in which the chip system is installed to perform the method in the first aspect or any one of the possible implementations of the first aspect, or enable the network device in which the chip system is installed to perform the method in the second aspect or any one of the possible implementations of the second aspect; and enable a terminal device in which the chip system is installed to perform the method in the third aspect or any one of the possible implementations of the third aspect, or enable the terminal device in which the chip system is installed to perform the method in the fourth aspect or any one of the possible implementations of the fourth aspect.

The chip may include an input circuit or interface configured to send information or data, and an output circuit or interface configured to receive information or data.

According to a sixteenth aspect, a computer program product is provided. The computer program product includes computer program code. When the computer program code is run by a network device, the network device is enabled to perform the method in the first aspect or any one of the possible implementations of the first aspect, or the method in the second aspect or any one of the possible implementations of the second aspect; and the terminal device is enabled to perform the method in the third aspect or any one of the possible implementations of the third aspect, or the method in the fourth aspect or any one of the possible implementations of the fourth aspect.

According to the solutions in embodiments of this application, a beam switching method and apparatus are provided. A network device can predict relative movement trajectory information of a user in a satellite cell based on beam ground topology information and initial access location information of the user, and automatically complete beam switching in a timing manner based on the feature design, thereby effectively resolving signaling overheads caused by frequent beam switching in the NTN. In addition, the network device can avoid reference signal received power L1-RSRP measurement of a terminal device by delivering a switching beam ID, to achieve the objectives of saving energy and reducing system power consumption.

DESCRIPTION OF EMBODIMENTS

The following describes technical solutions of this application with reference to the accompanying drawings.

Figure 1:
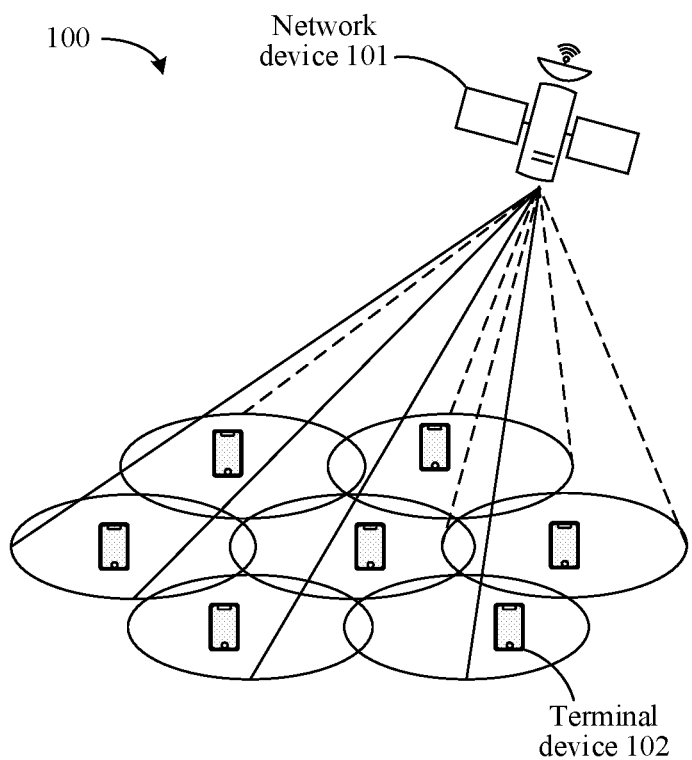
FIG. 1 is a schematic diagram of an example of a communication system applicable to this application.

The technical solutions of this application may be applied to a satellite communication system. Refer to FIG. 1. FIG. 1 is a schematic architectural diagram of a satellite communication system. The satellite communication system 100 may include at least one network device 101, that is, a satellite base station is used as a network device in this application. The satellite communication system 100 may include at least one terminal device 102. The satellite base station may communicate with a terminal device in a serving cell of the satellite base station by a beamforming technology. The satellite communication system may also be referred to as a non-terrestrial network (NTN) system.

In some satellite communication systems, a space segment of the satellite communication system may be a multi-layer structure formed by a management satellite and one or more service satellites. In the networking of a satellite communication system with the multi-layer structure, the space segment may include one or more management satellites and service satellites managed by the management satellites. The satellite or the satellite base station mentioned in this application is not limited to a management satellite or a service satellite.

The technical solutions in embodiments of this application may be further applied to various communication systems, for example, a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WIMAX) communication system, and a future 5G system or new radio (NR). The technical solutions in the embodiments of this application may also be extended to similar wireless communication systems, such as wireless-fidelity (WI-FI) and a cellular system related to the 3rd generation partnership project (3GPP).

Generally, a conventional communication system supports a limited quantity of connections, and is easy to implement. However, with the development of communication technologies, a mobile communication system not only supports conventional communication, but also supports, for example, device to device (D2D) communication, machine to machine (M2M) communication, machine type communication (MTC), and vehicle to everything (V2X) communication, for example, vehicle to vehicle (V2V) communication and vehicle to infrastructure (V2I) communication, vehicle to pedestrian (V2P) communication and vehicle to network (V2N) communication.

The technical solutions provided in this application may be further applied to a future communication system, for example, a sixth generation mobile communication system. This is not limited in this application.

In embodiments of this application, the network device may be an apparatus that is deployed in a radio access network and that provides a wireless communication function for the terminal device, and may be a device configured to communicate with the terminal device or a chip of the device. The network device includes but is not limited to: a radio network controller (RNC), a base station controller (BSC), a home base station (for example, home evolved NodeB, or home NodeB, HNB), a baseband unit (BBU), an access point (AP) in a wireless fidelity system, a radio relay node, a radio backhaul node, a transmission point (TP), a transmission and reception point (TRP), or may be a gNB or a transmission point (TRP or TP) in a 5G (for example, NR)

system, or one or a group (including a plurality of antenna panels) of antenna panels of a base station in the 5G system. Alternatively, the network device may be a network node that forms the gNB or the transmission point, for example, the baseband unit BBU or a distributed unit (DU) and the like.

The network device in embodiments of this application may include various forms of macro base stations, micro base stations (also referred to as small cells), relay stations, access points, and the like, and may be a base transceiver station (BTS) in the global system of mobile communication GSM system or the code division multiple access CDMA system, or may be a NodeB (NB) in the wideband code division multiple access WCDMA system, or may be an evolutional NodeB (eNB or eNodeB) in the LTE system, or may be a radio controller in a cloud radio access network (CRAN) scenario. Alternatively, the network device may be a relay station, an access point, a wearable device or an in-vehicle device, a wearable device, a network device in the future 5G network, a network device in a future evolved public land mobile network (PLMN) network, or the like.

In some network deployments, the network device may include a central unit (CU) and a distributed unit (DU). The network device may further include a radio unit (RU) and an active antenna unit (AAU). The CU implements some functions of the network device. For example, the CU is responsible for processing non-real-time protocols and services, and implements functions of a radio resource control (RRC) layer and a packet data convergence protocol (PDCP) layer. The DU implements some functions of the network device. For example, the DU is responsible for processing physical layer protocols and real-time services, and implements functions of a radio link control (RLC) layer, a media access control (MAC) layer, and a physical (PHY) layer. The AAU implements some physical layer processing functions, radio frequency processing, and functions related to active antennas. Information at the RRC layer is finally changed to information at the PHY layer, or is changed from information at the PHY layer. Therefore, in this architecture, higher layer signaling (for example, RRC layer signaling) may also be considered to be sent by the DU, or sent by the DU and the AAU. It may be understood that the network device may be a CU node, a DU node, or a device including a CU node and a DU node. In addition, the CU may be classified as a network device in an access network RAN, or the CU may be classified as a network device in a core network CN. This is not limited herein.

The network device provides a service for a cell. The terminal device communicates with the cell by transmission resources (for example, frequency domain resources or spectrum resources) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

Alternatively, the network device may be a positioning service center, for example, an evolved service mobile location center (E-SMLC) or a location management function (LMF). The positioning service center is used for measurement information and location information of a mobile phone network device and the terminal device. The positioning service center is further responsible for performing location resolution on a measurement quantity of the terminal device, to determine a location of the terminal device. Information exchange between the terminal device and the positioning service center may be implemented by an LTE positioning protocol or an NR positioning protocol. Interaction between the network device and the positioning center is implemented by an LTE positioning protocol A (LPPa) or an NR positioning protocol A (NRPPa).

In embodiments of this application, the terminal device needs to access a mobile satellite communication network by a ground segment of the satellite communication system for mobile communication. The terminal device may be referred to as user equipment (UE), an access terminal, a subscriber unit, a subscriber station, a mobile station, a mobile console, a remote station, a remote terminal, a mobile device, a user terminal, a terminal, a wireless communication device, a user agent or a user apparatus, a soft terminal, or the like. The terminal device may be a device that provides voice/data connectivity for a user, for example, a hand-held device or an in-vehicle device with a wireless connection function. The terminal may be a mobile station (MS), a subscriber unit, a cellular phone, a smartphone, a wireless data card, a personal digital assistant (PDA) computer, a tablet computer, a wireless modem, a handset, a laptop computer, a machine type communication (MTC) terminal, or the like.

The terminal device in embodiments of this application may also be a mobile phone, a computer with a wireless transceiver function, a virtual reality (VR) terminal device, an augmented reality (AR) terminal device, a wireless terminal in industrial control, a wireless terminal in unmanned driving (self driving), a wireless terminal in remote medical care, a wireless terminal in smart grid, a wireless terminal in transportation safety, a wireless terminal in smart city, or a wireless terminal in smart home, a cellular phone, a cordless phone, a session initiation protocol (SIP) phone, a wireless local loop (WLL) station, a personal digital assistant (PDA), a handset with wireless communication functions, an in-vehicle device, a wearable device, a computing device or another processing device connected to the wireless modem, a hand-held terminal, a notebook computer, a cordless phone or a wireless local loop (WLL) station, and a terminal device in the future 5G network, a terminal device in the future evolved public land mobile network PLMN, or the like.

The wearable device may also be referred to as a wearable intelligent device, and is a general term of wearable devices, such as glasses, gloves, watches, clothes, and shoes, that are intelligently designed and developed for daily wear by applying wearable technologies. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without relying on smartphones, and are, for example, smartwatches or smart glasses; and devices that focus on only one type of application function and need to be used with other devices such as smartphones, and are, for example, various smart bands, or smart jewelry for physical sign monitoring.

In addition, the terminal device may alternatively be a terminal device in an internet of things (IoT) system. An IoT is an important component of future information technology development. A main technical feature of the IoT is connecting an object to a network by using a communication technology, to implement an intelligent network of humanmachine interconnection and thing-thing interconnection. The IoT technology can implement massive connections, deep coverage, and terminal power saving using a narrow band (NB) technology. It should be understood that a specific form of the terminal device is not limited in this application.

In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

Figure 2:
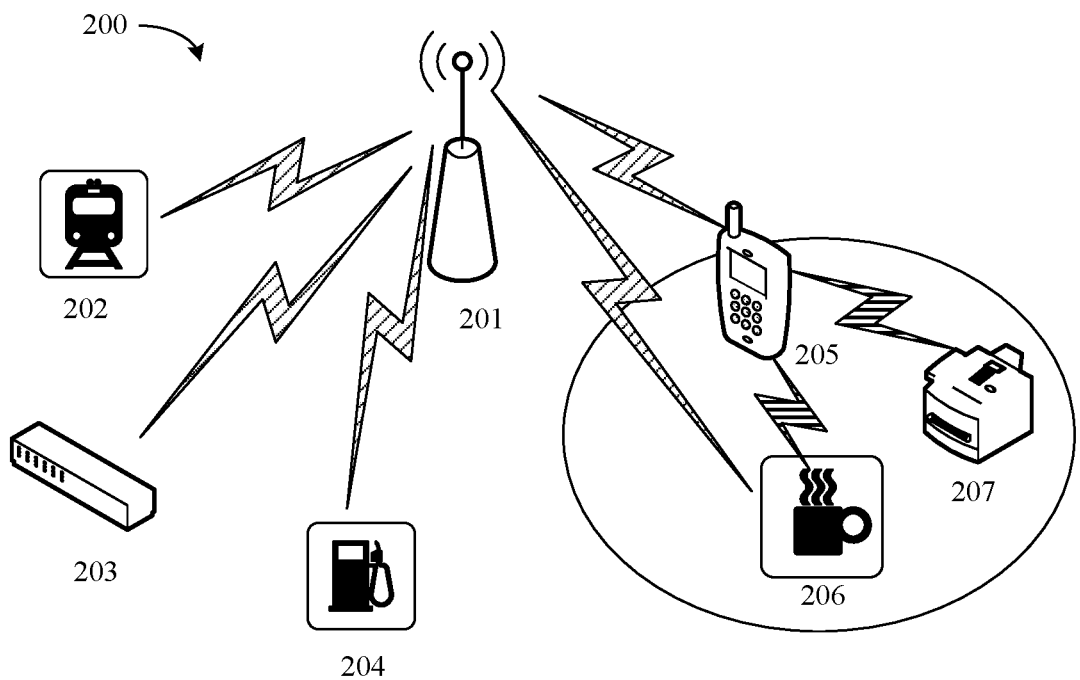
FIG. 2 is a schematic diagram of another example of a communication system applicable to this application.

For ease of understanding embodiments of this application, a communication system applicable to the embodiments of this application is first described in detail with reference to FIG. 2. FIG. 2 is a schematic diagram of a communication system 200 applicable to a method according to an embodiment of this application. As shown in the figure, the communication system 200 may include at least one network device, for example, the network device 201 shown in FIG. 2. The communication system 200 may further include at least one terminal device, for example, the terminal devices 202, 203, 204, 205, 206, and 207 shown in FIG. 2. The terminal devices 202 to 207 may be mobile or fixed. The network device 201 may communicate with one or more of the terminal devices 202 to 207 via a radio link. Each network device may provide communication coverage for a specific geographical area, and may communicate with a terminal device located in the coverage area. For example, the network device may send configuration information to the terminal device, and the terminal device may send uplink data to the network device based on the configuration information. For another example, the network device may send downlink data to the terminal device. Therefore, the network device 201 and the terminal devices 202 to 207 in FIG. 2 form a communication system.

Optionally, the terminal devices may directly communicate with each other. For example, direct communication between the terminal devices may be implemented using a D2D technology or the like. As shown in the figure, direct communication may be implemented between the terminal devices 205 and 206 and between the terminal devices 205 and 207 using the D2D technology. The terminal device 206 and the terminal device 207 may separately or simultaneously communicate with the terminal device 205.

Alternatively, the terminal devices 205 to 207 may separately communicate with the network device 201. For example, the terminal device may directly communicate with the network device 201, and the terminal devices 205 and 206 in the figure may directly communicate with the network device 201; or may indirectly communicate with the network device 201, and the terminal device 207 in the figure communicates with the network device 201 via the terminal device 205.

It should be understood that FIG. 2 shows one network device, a plurality of terminal devices, and communication links between communication devices. Optionally, the communication system 200 may include a plurality of network devices, and coverage of each network device may include another quantity of terminal devices, for example, more or fewer terminal devices. This is not limited in this embodiment of this application.

A plurality of antennas may be configured for each of the foregoing communication devices, for example, the network device 201 and the terminal devices 202 to 207 in FIG. 2. The plurality of antennas may include at least one transmit antenna configured to send signals and at least one receive antenna configured to receive signals. In addition, each communication device further additionally includes a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. Therefore, the network device may communicate with the terminal devices using a multi-antenna technology.

Optionally, the wireless communication system 200 may further include another network entity, for example, a network controller or a mobility management entity. This is not limited in embodiments of this application.

It should be further understood that FIG. 2 is merely a simplified schematic diagram of an example for ease of understanding. The communication system 200 may further include another network device or may further include another terminal device, which is not shown in FIG. 2.

FIG. 2 is an architectural diagram of a network system according to an embodiment of this application. Embodiments of this application are applicable to a beam-based multi-carrier communication system shown in FIG. 2, for example, an NR system. The system includes uplink (from the terminal device to the network device) and downlink (from an access network device to the terminal device) communication in the communication system. Based on a long term evolution LTE/NR protocol, at a physical layer, uplink communication includes transmission of an uplink physical channel and an uplink signal. The uplink physical channel includes a random access channel (PRACH), an uplink control channel (physical uplink control channel, PUCCH), an uplink data channel (physical uplink shared channel, PUSCH), and the like. The uplink signal includes a channel sounding reference signal (SRS), a PUCCH demodulation reference signal (PUCCH-DMRS), a PUSCH demodulation reference signal (PUSCH-DMRS), an uplink phase noise tracking reference signal (PTRS), and an uplink positioning signal. Downlink communication includes transmission of a downlink physical channel and a downlink signal. The downlink physical channel includes a broadcast channel (PBCH), a downlink control channel (physical downlink control channel, PDCCH), a downlink data channel (physical downlink shared channel, PDSCH), and the like. The downlink signal includes a primary synchronization signal (PSS)/secondary synchronization signal (SSS), a downlink control channel demodulation reference signal PDCCH-DMRS, a downlink data channel demodulation reference signal PDSCH-DMRS, a PTRS, a channel state information reference signal (CSI-RS), a cell reference signal (CRS), a fine synchronization signal (time/frequency tracking reference signal, TRS), a positioning reference signal (RS), and the like. Embodiments of this application are not limited thereto. For ease of understanding embodiments of this application, several terms used in the following are first briefly described.

1. Beam: A beam is a communication resource. The beam may be a wide beam, a narrow beam, or another type of beam. A technology for forming the beam may be a beamforming technology or another technology. The beamforming technology may be specifically a digital beamforming technology, an analog beamforming technology, a hybrid digital/analog beamforming technology, or the like. Different beams may be considered as different resources. Same information or different information may be sent by different beams. Optionally, a plurality of beams having a same or similar communication feature may be considered as one beam. One beam may include one or more antenna ports, configured to transmit a data channel, a control channel, a sounding signal, and the like. It may be understood that one or more antenna ports forming one beam may also be considered as one antenna port set. In the NR protocol, the beam may be, for example, a spatial filter. However, it should be understood that this application does not exclude a possibility of defining another term in a future protocol to represent a same or similar meaning.

When a low frequency band or an intermediate frequency band is used, a signal may be sent omnidirectionally or at a wide angle. When a high frequency band is used, because of a small carrier wavelength of a high-frequency communication system, an antenna array formed by a plurality of antenna elements may be disposed at a transmit end and a receive end. The transmit end sends a signal by a specific beamforming weight, to enable the sent signal to form a spatially directional beam, and the receive end receives the signal by the antenna array using a specific beamforming weight, so that receive power of the signal at the receive end can be increased, and path loss can be avoided.

The beam includes a transmit beam and a receive beam. The transmit beam may be signal strength distribution formed in different directions in space after a signal is transmitted by an antenna, and the receive beam may be signal strength distribution of a radio signal received by an antenna array from an antenna in different directions in space.

In the current NR protocol, the beam may be represented by an antenna port quasi co-location (QCL) relationship. Specifically, two signals of a same beam have a QCL relationship with respect to a spatial receiving parameter (spatial Rx parameter), that is, QCL-Type D: {Spatial Rx parameter} in the protocol. For example, the beam may be represented by identifiers of various signals in the protocol, for example, a resource index of a channel state information reference signal (CSI-RS), an index of a synchronization signal broadcast channel block (SS/PBCH block or SSB), a resource index of a sounding reference signal (SRS), and a resource index of a tracking reference signal (TRS).

It should be understood that a beam is generally corresponding to a resource. For example, when beam measurement is performed, a radio access network device sends different resources by different beams, and the terminal feeds back measured resource quality, so that the radio access network device knows quality of a corresponding beam. During data transmission, beam information is also indicated by a resource corresponding to the beam information. For example, the radio access network device indicates information about a beam used by the terminal to receive a physical downlink shared channel (PDSCH) by a transmission configuration indication (TCI) field in downlink control information (DCI).

In addition, generally, one beam corresponds to one reference signal, one TCI, one TRP, or one sounding reference signal resource indicator (SRI) (used for uplink data transmission). Therefore, different beams may also be represented by different reference signals or TCIs or TRPs or SRIs.

For ease of description, in embodiments of this application, a reference signal, a TCI, and a beam are used as an example to describe the solutions provided in the embodiments of this application. This is because the reference signal, the TCI, the TRP, the SRI, the resource index of a CSI-RS, the index of an SS/PBCH block, the resource index of an SRS, and the resource index of a TRS may all represent the beam. Therefore, the reference signal, the TCI, and the beam in the following may be replaced with a TRP, an SRI, a resource index of a CSI-RS, an index of an SS/PBCH block, a resource index of an SRS, or a resource index of a TRS, and the replacement does not change essence of the method provided in embodiments of this application.

2. Quasi-co-location (QCL): A quasi-co-location relationship indicates that a plurality of resources have one or more same or similar communication features. A same or similar communication configuration may be used for the plurality of resources that have the quasi-co-location relationship. For example, if two antenna ports have a quasi-co-location relationship, a large-scale channel characteristic of transmitting one symbol by one port may be deduced from a large-scale channel characteristic of transmitting one symbol by another port. The large-scale characteristic may include: a delay spread, an average delay, a Doppler spread, a Doppler frequency shift, an average gain, a receiving parameter, a receiving beam number of the terminal device, a transmission/reception channel correlation, a receiving angle of arrival, a spatial correlation of a receiver antenna, a dominant angle of arrival (AoA), an average angle of arrival, an AoA spread, and the like. Specifically, that the quasi-co-location indication indicates whether the at least two groups of antenna ports have a quasi-co-location relationship is: The quasi-co-location indication indicates whether channel state information reference signals sent by the at least two groups of antenna ports are from a same transmission point, or the quasi-co-location indication indicates whether channel state information reference signals sent by the at least two groups of antenna ports are from a same beam group.

3. Quasi-co-location assumption (QCL assumption): It is assumed whether there is a QCL relationship between two ports. The configuration and indication of the quasi-co-location assumption may be used to help a receive end receive and demodulate a signal. For example, the receive end can determine that there is a QCL relationship between the port A and the port B, that is, may use a large-scale parameter of a signal measured on the port A for signal measurement and demodulation on the port B.

4. Spatial quasi-co-location: Spatial QCL may be considered as a type of QCL. Spatial can be understood from two perspectives: from a transmit end or from a receive end. From a perspective of the transmit end, if two antenna ports are spatially quasi-co-located, it means that beam directions corresponding to the two antenna ports are spatially consistent. From a perspective of the receive end, if two antenna ports are spatially quasi-co-located, the receive end can receive signals sent by the two antenna ports in a same beam direction. If two signals are transmitted from two different antenna ports and experience a same large-scale characteristic, the two antenna ports are considered as QCL, which means that a channel estimation result obtained from one antenna port may be used for the other antenna port, to facilitate processing by a receiver.

5. Reference signal (RS): Based on a long term evolution LTE/NR protocol, at a physical layer, uplink communication includes transmission of an uplink physical channel and an uplink signal. The uplink physical channel includes a random access channel (PRACH), an uplink control channel (PUCCH), an uplink data channel (PUSCH), and the like. The uplink signal includes a channel sounding reference signal SRS, an uplink control channel demodulation reference signal (PUCCH-DMRS), an uplink data channel demodulation reference signal PUSCH-DMRS, an uplink PTRS, an uplink positioning reference signal (uplink positioning RS), and the like. Downlink communication includes transmission of a downlink physical channel and a downlink signal. The downlink physical channel includes a physical broadcast channel (PBCH), a physical downlink control channel (PDCCH), a physical downlink data channel (PDSCH), and the like. The downlink signal includes a primary synchronization signal (PSS)/secondary synchronization signal (SSS), a downlink control channel demodulation reference signal PDCCH-DMRS, a downlink data channel demodulation reference signal PDSCH-DMRS, a phase noise tracking signal PTRS, a channel status information reference signal (CSI-RS), a cell reference signal (CRS) (not available in NR), a fine synchronization signal (time/frequency tracking reference signal, TRS) (not available in LTE), an LTE/NR positioning reference signal (positioning RS), and the like.

6. Transmission configuration indicator (TCI): The TCI may indicate QCL information of a physical downlink control channel PDCCH/physical downlink shared channel PDSCH, and may specifically indicate a reference signal with which a DMRS of the PDCCH/PDSCH meets a QCL relationship. In this case, a terminal may receive the PDCCH/PDSCH using a spatial parameter that is the same as or similar to a spatial parameter of the reference signal.

In the TCI, a reference signal index may be specifically used to indicate a reference signal with which the DMRS of the PDCCH/PDSCH meets the QCL relationship.

In addition, a TCI state may be configured globally. In TCI states configured for different cells and different BWPs, if indexes of the TCI states are the same, configurations of corresponding TCI states are also the same.

For example, the TCI state mainly includes a QCL type (for example, two different QCL types may be configured) and a reference signal of each QCL type. The reference signal specifically includes a carrier component (CC) identification (ID) or a bandwidth part identifier (BWP ID) where the reference signal is located, and a number of each reference signal resource (ssb-index, or CSI-RS resource index).

Currently, the TCI state in the protocol is configured as follows:

```
TCI-State ::=           SEQUENCE {
    tci-StateId             TCI-StateId,
    qcl-Type1               QCL-Info,
    qcl-Type2                           QCL-Info
OPTIONAL,   -- Need R
    ...
}
QCL-Info ::=            SEQUENCE {
    cell                    ServCellIndex
OPTIONAL,   -- Need R
    bwp-Id                  BWP-Id
OPTIONAL, -- Cond CSI-RS-Indicated
    referenceSignal         CHOICE {
        csi-rs                  NZP-CSI-RS-ResourceId,
        ssb                     SSB-Index
    },
    qcl-Type        ENUMERATED {typeA, typeB, typeC, typeD},
    ...
}
```

The QCL types may be classified as follows:
QCL typeA: a delay, a Doppler shift, a delay spread, and a Doppler spread;
QCL typeB: a Doppler shift and a Doppler spread;
QCL typeC: a delay and a Doppler shift;
QCL typeD: a spatial receiving parameter, that is, a receive beam.

7. TCI state (QCL indication method): A higher layer in a protocol configures QCL by a TCI-State, and a parameter of the TCI-State is used to configure a quasi-co-location relationship between one or two downlink reference signals and a demodulation reference signal (DMRS) of a PDSCH. The transmission configuration indication is configured by RRC, and is referred to as a TCI state in configuration signaling. After the RRC configuration, a radio access network device sends a media access control-control element (MAC-CE) to activate one or more TCI states. The radio access network device may further send DCI to indicate one of a plurality of activated TCIs.

The TCI includes one or two QCL relationships. The QCL represents a consistency relationship between a signal/channel to be received currently and a previously known reference signal. If there is a QCL relationship, UE may inherit a receiving parameter used when a reference signal is previously received, to receive an upcoming signal/channel.

The TCI state includes one ID and a maximum of two QCL relationships (in the current 3GPP Rel-17 protocol, if there are two QCLs, one of the two QCLs is supposed to be a type D), and the QCL relationship indicates a reference signal in one BWP (Bandwidth part) of one cell.

8. Beam radiation mode: It indicates a beam gain of a beam in different horizontal and vertical directions. If the beam radiation mode is observed on the xoy plane, it can be seen that a coverage area of each beam is approximately an ellipse. A plurality of wide/narrow beams jointly cover a pitch area and azimuth area.

9. Reference signal receiving power (RSRP): It is also referred to as reference signal receiving strength, representing a linear average value of power of a cell-specific reference signal carried on a considered measurement frequency band.

10. Received signal strength indicator (RSSI): It may also be referred to as received signal power. The RSSI includes an average value of power of pilot signals, data signals, interference signals of neighboring cells, noise signals, and the like.

11. Reference signal receiving quality (RSRQ): It is the ratio of the RSRP to the RS SI multiplied by the correction coefficient N, where N indicates the correction coefficient for different bandwidths based on which the measurement is performed.

12. Antenna panel: A wireless communication signal needs to be received and transmitted by an antenna, and a plurality of antenna elements may be integrated on one panel. One radio frequency link may drive one or more antenna elements. In embodiments of this application, the terminal device may include a plurality of antenna panels, and each antenna panel includes one or more beams. Alternatively, the network device may include a plurality of antenna panels, and each antenna panel includes one or more beams. The antenna panel may also be represented as an antenna array or an antenna subarray. One antenna panel may include one or more antenna arrays/subarrays. One antenna panel may be controlled by one or more crystal oscillators. The radio frequency link may also be referred to as a receive channel and/or a transmit channel, a receiver branch, or the like. One antenna panel may be driven by one radio frequency link, or may be driven by a plurality of radio frequency links. Therefore, the antenna panel in embodiments of this application may also be replaced with a radio frequency link, a plurality of radio frequency links driving one antenna panel, or one or more radio frequency links controlled by one crystal oscillator.

Based on a satellite operating orbital altitude, the NTN system can be classified into four types: a low earth orbit (LEO) satellite system with an orbital altitude of 500 km to 2000 km; a medium earth orbit (MEO) satellite system with an orbital altitude of 2000 km to 20000 km; a high earth orbit (HEO) satellite system with an elliptical orbital altitude of over 20000 km; and a geostationary earth orbit (GEO) satellite system with an orbital altitude of 35800 km. The LEO satellite system has a low round-trip delay (RTD) and less path loss, so the LEO satellite system has more important research significance.

In NR, for beam establishment between the gNB and the terminal, training and beam alignment need to be performed on beams in different directions using a reference signal. Specifically, a CSI-RS/SSB may be used for beam training in a downlink, and an SRS may be used for beam training in an uplink. Take the downlink as an example. The gNB sends one or more narrow beam CSI-RS signals based on the surroundings of the SSB beam range for initial access, corresponding to the channel status information resource index (CSI resource index, CRI). At the receive end, the UE measures the CSI-RS reference signals to obtain L1-RSRP results, and reports measurement results of different CRIs. Finally, the gNB selects the beam corresponding to the CSI-RS with the strongest L1-RSRP for downlink channel transmission. When the L1-RSRP measured by the terminal on the serving beam is lower than a threshold, the gNB notifies the terminal of new beam information by a new TCI-State ID in the TCI State signaling indicated by the MAC-CE or DCI, to complete the beam switching. The TCI State describes a type-D QCL relationship between one or two downlink reference signals.

For example, when a serving beam is switched between a radio access network device and a terminal device, the terminal device mostly measures a candidate beam in advance, and performs beam reporting and beam switching based on a beam indication delivered by the radio access network device. In addition, after the beam switching succeeds, acknowledgment signaling is further required. For example, in an implementation, the radio access network device delivers a CSI request to trigger the terminal device to measure and report a new reference signal, to implement continuous beam switching. For the terminal device, there is a delay in waiting for the CSI request, and for the radio access network device, PDCCH overheads are required each time the CSI request is delivered. For example, in another implementation, a beam of a control channel is indicated based on DCI signaling, and a TCI state indication is used to complete updating of all channel beams. In this manner, a DCI processing delay and a hybrid automatic repeat request (HARM) delay still exist.

In the LEO orbit NTN communication system, beams may be classified into two types based on a coverage manner of a satellite beam relative to a ground position, that is, a gazing beam (a footprint of the beam on the ground does not move with a satellite) and a non-gazing beam (a footprint of the beam on the ground moves with a satellite). The non-gazing beam is also an earth-moving cell scenario that is mainly discussed in the RAN1-104 meeting. For the LEO orbit earth-moving cell scenario, a pitch angle and azimuth of the satellite beam do not change with the movement of the satellite. Therefore, a projection area of the satellite beam on the ground moves at the same speed as the movement of the satellite. In an NTN, the LEO satellite moves at a high speed. For example, the LEO satellite moves at a speed of about 7.5622 km/s at an altitude of 600 km. In addition, considering a large path loss of a high frequency band, a beam diameter is limited. For example, if a cell diameter of an LEO 600 km satellite in a Ka-band scenario is 20 km, a maximum time of a terminal in a beam is less than 3 s. It can be learned that, when a satellite serves a user that moves at a small speed on the ground, a terminal in the NTN lasts for a very short time in a beam, causing more frequent beam and cell switching than that in the terrestrial network. If the NR beam switching method is still used in the NTN, signaling overheads are high. In addition, the terminal needs to frequently measure and report the L1-RSRP, which severely increases power consumption of a user system. Therefore, how to resolve an increase in signaling overheads and terminal power consumption caused by the frequent beam and cell switching in the NTN is an urgent problem to be resolved.

Based on the characteristic that a typical moving speed of a ground user is far less than a moving speed of the satellite, it may be considered that in a ground topology of the satellite beam, the user generates a predicted trajectory opposite to the moving speed of the satellite. This application designs a new beam switching method. A timing rule is agreed on based on a predictable movement trajectory of a terminal and a fixed topology structure of a satellite non-gazing beam, so that the terminal and the satellite can automatically complete beam switching based on an agreed switching rule, to resolve an increase in signaling overheads and terminal power consumption caused by frequent beam and cell switching in an NTN.

The following describes in detail a method provided in embodiments of this application with reference to the accompanying drawings.

It should be noted that, in this application, mainly in an LEO earth-moving cell scenario of the NTN, a satellite can effectively predict a subsequent movement trajectory of a terminal at a location, given that beam topology information (for example, a beam width and a coverage area) and an initial access location of the terminal are known. By using the predictable movement trajectory of the terminal, the terminal and the satellite automatically complete the beam and cell switching based on the agreed timing rule, without frequent beam switching signaling interaction and L1-RSRP measurement.

Movement trajectory information of the terminal mainly includes: IDs of beams that are successively passed through on the trajectory, a switching relationship between different beams that the trajectory passes through, a location at which the switching occurs, a time that the user experiences in each beam on the trajectory, and the like.

By obtaining initial access location information of the terminal, for example, a terminal with a global navigation satellite system (GNSS) or another auxiliary positioning method, the satellite device may predict a beam on a subsequent movement trajectory of the terminal device and a sequence switching relationship between beams. To be specific, related information on the movement trajectory shown in table 1 is established, and signaling is delivered to the movement trajectory. In this way, the satellite device and the terminal device can automatically complete the beam switching based on the agreed rule using a beam that is passed through on the movement trajectory and a switching location.

For example, it may be understood that a next movement trajectory of the terminal device is: in a cell whose cell identity (Cell ID) is 0, switching from a beam whose Beam ID is 0 to a beam whose Beam ID is 1; and then switching from a cell whose Cell ID is 0 to a cell whose Cell ID is 1, to sequentially complete the cell and beam switching. At a current location, the terminal is handed over to the beam whose Beam ID is 0 in the cell whose Cell ID is 0 through t1, and then is handed over to the beam whose Beam ID is 1 in the cell whose Cell ID is 0 through t2, and the like.

TABLE 1

| Cell ID | Beam ID | Time (s) |
| --- | --- | --- |
| 0 | 0 | t1 |
| 0 | 1 | t2 |
| 1 | 0 | t3 |
| ... | ... | ... |

It should be understood that one cell may have a plurality of beams or only one beam. The Beam ID may be defined starting from 0 in each cell. For example, a Beam ID of a Cell ID 0 is 0 to n−1, and a Beam ID of a Cell ID 1 is 0 to n−1. Alternatively, the Beam ID may be defined starting from 0 in all cells in sequence. For example, a Beam ID of a Cell ID 0 is 0 to n−1, and a Beam ID of a Cell ID 1 is n to 2n−1.

Figure 3:
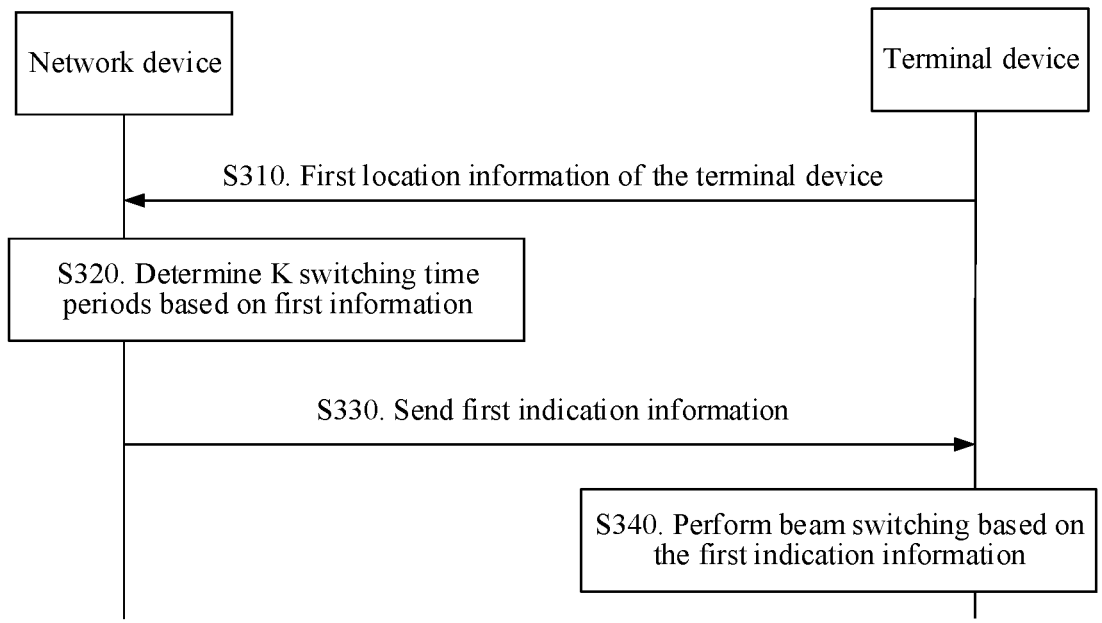
FIG. 3 is a schematic diagram of an example of a beam switching method applicable to this application.

FIG. 3 is a schematic flowchart of a beam switching method 300 according to an embodiment of this application. As shown in FIG. 3, the method 300 includes the following steps.

S310. A terminal device sends first location information of the terminal device to a network device. Correspondingly, the network device receives the first location information of the terminal device.

It should be understood that, in a service process of a satellite device, the terminal device may periodically report geographic location coordinates (ECEF) of the terminal device to the network device based on a GNSS capability of the terminal device.

That is, the location information of the terminal device in this application is periodically reported by the terminal device. In addition, the network device involved in embodiments of this application may be a satellite device.

S320. The network device determines K switching time periods based on first information.

The first information includes the first location information of the terminal device, location information of the satellite device, a velocity vector of the satellite device, and beam information of the satellite device. The K switching time periods are time periods in which K times of beam switching occur on the terminal device, and K is a positive integer greater than or equal to 1.

In embodiments of this application, the network device may obtain a motion velocity vector of the satellite device, orbital location coordinates of the satellite device, and the like based on satellite ephemeris parameter broadcasting. The network device knows the beam information of the satellite device. The beam information of the satellite device includes a pitch angle and an azimuth of a beam. The beam information of the satellite device and the location information of the satellite device are for determining a satellite beam topology, that is, a topology structure of a satellite beam projected on the ground. The satellite beam topology includes a projection shape, a beam width, and a beam boundary of the beam on the ground.

It should be understood that the network device may calculate a relative location of the terminal device in a satellite cell based on the first location information of the terminal device and the satellite beam topology. For example, FIG. 4 below shows locations of the terminal device relative to a beam 1 to a beam 7.

It should be noted that, a running speed of the satellite device is far greater than a moving speed of the terminal device. Therefore, within the satellite service time, the network device may consider that the terminal device predicts a movement trajectory in a direction opposite to a velocity vector $V_{sat}$ of the satellite device in a projection topology of a cell covered by the satellite device on the ground.

It should be understood that the movement trajectory of the terminal device does not change by default within a time interval. The satellite beam topology, the first location information of the terminal device, and the velocity vector of the satellite device are for determining a movement trajectory of the terminal device. For example, FIG. 4 below shows that the terminal predicts that a trajectory is switching from a beam 2 to a beam 3, and to a beam 5.

In embodiments of this application, the network device agrees on a beam switching rule based on the predicted movement trajectory of the terminal device, and automatically completes beam switching without a need to undergo a signaling indication related to a TCI-state in NR beam scheduling. This can effectively resolve signaling overheads caused by frequent beam switching in the NTN, reduce measurement of the terminal, and reduce power consumption of the terminal.

S330. The network device sends first indication information to the terminal device. Correspondingly, the terminal device receives the first indication information from the network device.

The first indication information indicates one or more of the K switching time periods.

In a possible implementation, the network device sends a first message list to the terminal device. Correspondingly, the terminal device receives the first message list from the network device.

The first message list indicates the K switching time periods. The first message list includes K indexes and K switching time periods, and the K indexes are in a one-to-one correspondence with the K switching time periods. The K indexes indicate a sequence of K times of beam switching, and the sequence of the K times of beam switching is a sequence of beam switching experienced when the terminal device moves out of a cell covered by the satellite device from a current location. The K switching time periods indicate a time period in which the terminal device performs beam switching from a current moment to an $i^{th}$ time of beam switching, and i is a positive integer greater than or equal to 1 and less than or equal to K.

It should be noted that, in this implementation, for each user in a cell covered by the satellite device, the network device predicts a movement trajectory of each user, and delivers a first message list of the user level, so that the user automatically completes beam switching at a scheduled time based on the first message list, thereby reducing signaling overheads of frequent beam switching in NR.

Because the terminal device periodically reports the location information of the terminal device, after receiving the location information reported by the terminal device, the network device needs to determine whether the location information of the terminal device changes, and further determine whether the movement trajectory of the terminal device and the corresponding first message list need to be updated.

For example, the terminal device sends second location information of the terminal device to the network device. Correspondingly, the network device receives the second location information of the terminal device. When a distance difference between the second location information of the terminal device and a predetermined location in the movement trajectory of the terminal device is greater than a first preset threshold, the network device updates the movement trajectory of the terminal device and the first message list, and the network device sends an updated first message list to the terminal device.

For example, the first message list includes K pieces of beam identification information, that is, some additional signaling overheads need to be introduced. The K pieces of beam identification information are in a one-to-one correspondence with the K switching time periods, and the K pieces of beam identification information identify corresponding beams on which the K times of beam switching are sequentially performed. In this case, when reading the first message list, the terminal device can simultaneously obtain the time period for beam switching and the beam ID to which the terminal device needs to be switched.

Optionally, when the first message list includes only time period information for beam switching, the terminal device needs to determine, based on the measured signal strength of the synchronization signal block SSB, a beam ID for subsequent beam switching, that is, an SSB ID when reading the first message list. In this implementation, signaling overheads for delivering the first message list by the network device are lower.

Further, because all beam switching is predicted based on a movement trajectory of a same terminal device, a plurality of times of beam switching that need to be performed when a same terminal moves out of a cell covered by the satellite device from a current location are associated with each other, and values of the K switching time periods are obtained in a differential manner.

It should be understood that, in this implementation, signaling overheads for delivering the first message list by the network device are lower.

In another possible implementation, the network device broadcasts a second message list to the terminal device. Correspondingly, the terminal device receives the second message list from the network device.

The second message list indicates K switching time periods. The second message list includes K indexes and K time periods, and the K indexes are in a one-to-one correspondence with the K time periods. Each of the K indexes indicates a quantity of beam spacings crossed by a relative location of the terminal device when beam switching is performed for a $j^{th}$ time from a current location. The K time periods indicate a time period in which the terminal device performs beam switching from a current moment to the $j^{th}$ time of beam switching, and j is a positive integer greater than or equal to 1 and less than or equal to N.

It should be noted that, in this implementation, for all users in a cell covered by the satellite device, the network device predicts a movement trajectory of each user, and delivers a second message list of the cell level, so that all the users automatically complete beam switching at a scheduled time based on the second message list, thereby reducing signaling overheads of frequent beam switching in NR. The second message list is cell-level signaling, and may be delivered by broadcasting in an SSB.

Further, the network device sends second indication information to the terminal device. Correspondingly, the terminal device receives the second indication information from the network device. The second indication information includes a first index, the first index is one of the K indexes, and the second indication information indicates a beam switching time period corresponding to the first index.

For example, the second indication message further includes identification information of a first beam, that is, some additional signaling overheads need to be introduced. The identification information of the first beam is beam identification information of beam switching performed by the terminal device for the $j^{th}$ time, and the first beam corresponds to the first index. In this case, when reading the second indication information, the terminal device can simultaneously obtain the time period for beam switching and the beam ID to which the terminal device needs to be switched.

Optionally, when the second indication information includes only index values, the terminal device needs to determine, based on the measured signal strength of the synchronization signal block SSB, a beam ID for subsequent beam switching, that is, an SSB ID when reading the second indication information.

It should be understood that, in this implementation, signaling overheads for delivering the second indication information by the network device are lower.

It should be noted that the second indication information is determined based on second information, and the second information includes a distance from the first location information of the terminal device to a current beam boundary, a quantity of beam spacings, and a span of a reference beam. The reference beam is a beam with a largest span along a satellite motion direction, and the quantity of beam spacings is obtained by evenly dividing the reference beam.

For example, the network device sends the first information to the terminal device. Correspondingly, the terminal device receives the first information from the network device. The first information indicates a time period corresponding to each beam spacing, and the first information is determined based on the beam information of the satellite device, the velocity vector of the satellite device, and the quantity of beam spacings.

Figure 5:
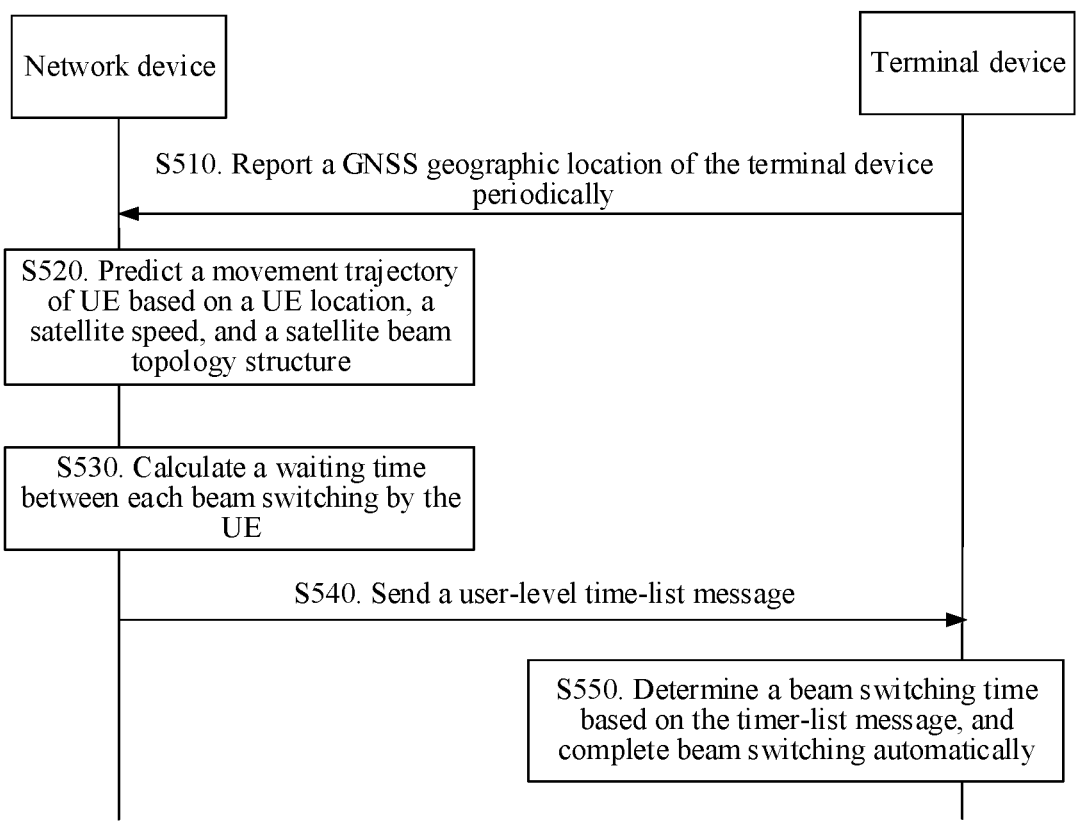
FIG. 5 is a schematic diagram of another example of a beam switching method applicable to this application.

Specifically, the network device calculates, based on the satellite ephemeris parameter and the beam information, a topology structure of projection of each beam on the ground, and selects, from the beam 1 to the beam 7 based on the topology structure, the beam with the largest span along the satellite motion direction as the reference beam, for example, a beam 3 in FIG. 5.

It should be understood that, the beam with the largest beam span is selected as the reference beam, so that a length of the second message list is as large as possible, and beam switching is completely applicable to all users in the satellite cell.

The network device evenly divides the reference beam into N_list beam spacings based on the velocity vector $V_{sat}$ direction of the satellite device. N_list is used as a length of a cell-level second message list. For example, an LEO satellite is used as a standard, and a span of the beam 3 is 400 km. If a designed table length is N_list=5, and $V_{sat}$=7.5622 km/s, a time interval represented by each beam spacing is about 10 s.

Optionally, the foregoing specific implementations are also applicable to cell switching. Therefore, based on the determined cell topology structure, the network device divides the largest span of the satellite cell into N_list areas at an equal interval along the satellite motion direction, where each area is a cell interval. N_list is used as a length of a cell-level second message list.

For example, the LEO satellite is used as a standard, and the largest span of the satellite cell is 1000 km. If the designed table length is N_list=10, and $V_{sat}$=7.5622 km/s, the time interval represented by each cell interval is about 13 s.

Because the terminal device periodically reports the location information of the terminal device, after receiving the location information reported by the terminal device, the network device needs to determine whether the location information of the terminal device changes, and further determine whether the movement trajectory of the terminal device and the corresponding second indication information need to be updated.

It should be noted that in this specific implementation, the network device does not need to update the second message list, because the K switching time periods in the second message list are determined based on information such as beam information, ephemeris information, and a velocity vector of the satellite device. The network device only needs to determine, based on the location information of the terminal device, a beam spacing that needs to be crossed by the terminal device for beam switching, and send the quantity of intervals to the terminal device by the second indication information. This can reduce signaling overheads to some extent.

For example, the terminal device sends second location information of the terminal device to a network device. Correspondingly, the network device receives the second location information of the terminal device.

When the second location information of the terminal device changes compared with the first location information of the terminal device, the network device sends third indication information to the terminal device, where the third indication information includes a second index. The second index is one of the K indexes. The third indication information indicates a beam switching time period corresponding to the second index, and the third indication information is different from the second indication information.

Specifically, before the network device sends the third indication information to the terminal device, the network device needs to compare the location information of the terminal device, that is, when idx #0 and idx #1 meet the following relationship:

$$\text{Floor}\left(\frac{t1}{T}\right) + idx\#1 \neq idx\#0,$$

where idx #0 represents the quantity of beam spacings crossed by the relative location of the terminal device from the current location to the $j^{th}$ time of beam switching, idx #1 represents a quantity of beam spacings crossed by the relative location of the terminal device from a moment that the $j^{th}$ time of beam switching is completed to a $(j+1)^{th}$ time of beam switching, T represents a time (timer) that the terminal device crosses each beam spacing, and t1 represents a time spent by the network device from sending idx #0 to receiving the second location information of the terminal device.

For example, as shown in FIG. 5, a beam on which the UE1 is located is a beam 3, and beam switching needs to be performed at four beam spacings, that is, the second indication information is idx #0=4. After the time t1, the UE reports its location information again. It is assumed that it takes 10 s to cross each beam spacing. This indicates that it takes 40 s for the terminal device to perform beam switching from a current location. If t1 is 20 s, Floor (t1/T) indicates that after 20 s, the UE1 crosses two beam spacings along the predicted trajectory. In this case, idx #1=2. The foregoing formula is not true, that is, the network device does not need to deliver the third indication information. Correspondingly, the terminal device may complete beam switching only after 20 s.

Further, because all beam switching is predicted based on a movement trajectory of a same terminal device, a plurality of times of beam switching that need to be performed when a same terminal moves out of a cell covered by the satellite device from a current location are associated with each other, and the K switching time periods in the second message list may be simplified into one field, that is, a time that a relative location of the terminal device crosses one beam spacing. In this case, when receiving the second indication information from the network device, the terminal device may directly complete beam switching based on a time rule agreed on with the network device.

It should be understood that, in this implementation, signaling overheads for delivering the second message list by the network device are lower.

S340. The terminal device performs beam switching based on the first indication information and/or the second indication information.

In embodiments of this application, a manner of carrying the indication information, the configuration information, and the like may be but is not limited to one or a combination of at least two of radio resource control signaling, media access control MAC layer signaling, and physical layer PHY signaling. The radio resource control signaling includes radio resource control RRC signaling, and the MAC layer signaling includes: a MAC-CE, where the physical layer signaling includes downlink control information DCI and the like.

For example, the network device delivers the first message list and/or the second message list to the terminal device. The first message list and/or the second message list may be delivered by UE-specific signaling, for example, configured by RRC signaling and activated by MAC-CE signaling, and the first message list is indicated to the terminal device by delivering DCI. A specific implementation is not limited in this application.

In conclusion, according to the solution provided in this application, a timing rule between the network device and the terminal device is agreed on based on a predictable relative movement trajectory of a user in a satellite cell, so that the terminal device can automatically complete beam switching. This effectively resolves signaling overheads caused by frequent beam switching in the NTN. In addition, the network device can reduce reference signal received power L1-RSRP measurement of the terminal device by delivering the switching beam identification information, thereby reducing system power consumption.

Figure 4:
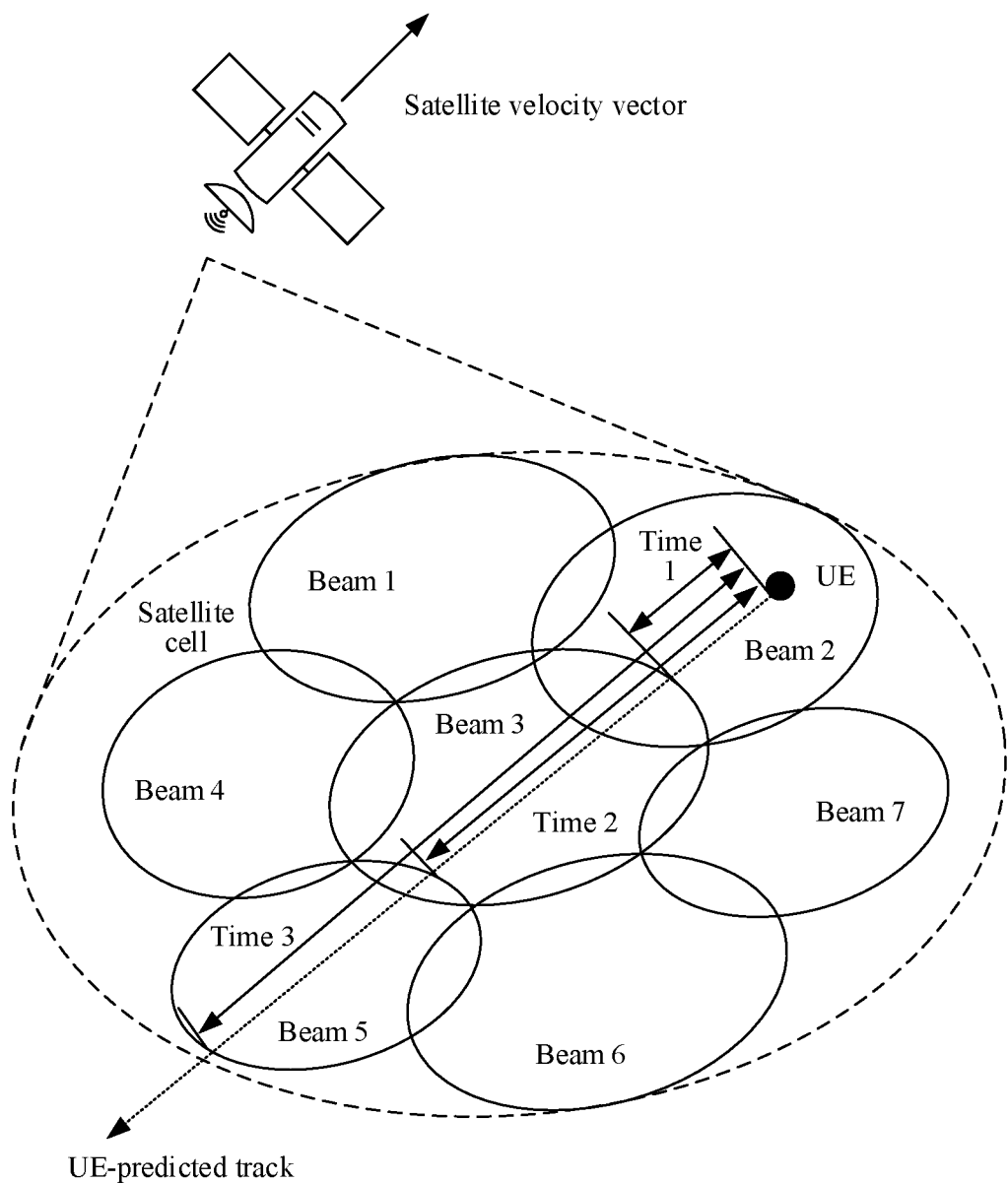
FIG. 4 is a schematic diagram of an example of user-level timer-list beam switching applicable to this application.

FIG. 4 is a schematic diagram of an example of user-level timer-list beam switching applicable to an embodiment of this application. As shown in FIG. 4, for a user in a satellite cell, a network device predicts a movement trajectory of the user, and delivers the user-level timer-list, so that the user automatically completes beam switching at a scheduled time based on the timer-list until the user moves out of the satellite cell. The network device does not need to deliver additional beam switching signaling, thereby reducing signaling overheads of NR beam switching.

It can be learned from FIG. 4 that the satellite cell includes a beam 1 to a beam 7. The movement trajectory of the UE is switching from a beam 2 to a beam 3, and then switching to a beam 5 until the UE moves out of the satellite cell. A direction of the predicted trajectory of the UE is opposite to a direction of the movement trajectory of the satellite. The timer 1, the timer 2, and the timer 3 respectively indicate a time that the UE needs to wait from a current moment to the first, the second, and the third times of beam switching.

FIG. 5 is a schematic flowchart of a beam switching method 500 according to an embodiment of this application. As shown in FIG. 5, the method 500 includes the following steps.

S510. A terminal device (for example, UE) periodically sends a GNSS geographic location of the terminal device to a network device (for example, a satellite device). Correspondingly, the network device receives the GNSS geographic location (that is, first location information of the terminal device) from the terminal device.

It should be understood that, in a satellite service process, the UE in an RRC_CONNECTED mode in a satellite cell may periodically report geographic location coordinates of the UE to the network device based on a GNSS capability of the UE. For example, an earth-centered, earth-fixed (ECEF) coordinate system.

S520. The network device predicts a movement trajectory of the UE based on location geography of the UE, a velocity vector of the satellite, and a beam topology structure of the satellite.

It should be understood that before predicting the movement trajectory of the UE, the network device first needs to calculate, based on beam information and satellite location information, a topology structure of projection of a satellite beam on the ground, for example, a projection shape, a beam width, and a beam boundary of each satellite beam on the ground. Then, the network device calculates a same location of the UE in the satellite cell based on the location of the UE reported by the UE and the satellite beam topology. For example, in FIG. 4, a location of the UE relative to the beam 1 to the beam 7 is shown.

It should be noted that the beam information includes a pitch angle, an azimuth, and the like of each beam, and the network device knows the satellite beam information. The satellite location information includes a satellite motion velocity vector $V_{sat}$, satellite orbit location coordinates ECEF, and the like. The network device may obtain the satellite motion velocity vector, the satellite orbit location coordinates, and the like by broadcasting based on the satellite ephemeris parameter.

A running speed of the satellite is far greater than a moving speed of the UE. For example, in the LEO orbit, the satellite velocity vector $V_{sat}$ can reach 7.5622 km/s, while the speed of 400 km/h high-speed rail is only 1.4% of $V_{sat}$. Therefore, within the satellite service time, the network device may consider that the UE is in the projection topology of the satellite cell on the ground, and a predicted movement trajectory along a direction opposite to $V_{sat}$ occurs. For example, a movement trajectory of the UE predicted in FIG. 4 is opposite to a speed direction of the satellite device, that is, the UE is first switched from the beam 2 to the beam 3, and then switched to the beam 5.

It should be noted that, in embodiments of this application, it may be considered that the movement trajectory does not change within a time interval.

In addition, for UE in an RRC_CONNECTED mode, if the network device has determined a predicted trajectory for the UE, after receiving GNSS location coordinates (that is, second location information of the terminal device) periodically reported by the UE next time, the network device needs to further determine whether to re-predict a movement trajectory of the UE, and further determine whether a timer-list message (that is, an example of the first message list) needs to be updated.

By way of example rather than a limitation, after obtaining a GNSS location reported by the terminal at a time, the network device calculates a distance difference between the geographic location and a predetermined location in a previously predicted movement trajectory of the terminal. If the difference is greater than a distance threshold d Threshold (that is, an example of the first preset threshold), the network device needs to deliver a new timer-list to the user, and update the predicted trajectory of the user.

S530. The network device calculates a waiting time between each beam switching by the UE.

The network device calculates, for a predicted movement trajectory of the UE in the satellite cell topology, a time of all beam switching to be performed when the UE moves along the trajectory. For example, the timer 1, the timer 2, and the timer 3 in FIG. 4. It should be understood that the timer 1 indicates a time that the UE needs to wait to switch from the current beam 2 location to a next beam 3, the timer 2 indicates a time that the UE needs to wait to switch from the current beam 2 location to a next beam 5, and the timer 3 indicates a time that the UE needs to wait to move out of the topology structure from the current beam 2 location. The switching time constitutes a user-specific timer-list message.

S540. The network device sends a timer-list signaling message to the terminal device. Correspondingly, the terminal device receives the timer-list signaling message from the network device.

The timer-list signaling message is for automatically completing beam switching, and the network device does not need to deliver beam switching signaling each time beam switching is performed. In this implementation, signaling overheads can be reduced, power consumption of the terminal can be reduced, a beam switching process can be simplified, a beam switching delay can be reduced, and the like.

It should be understood that a manner of carrying the indication information, the configuration information, and the like involved in this application may be but is not limited to one or a combination of at least two of radio resource control signaling, media access control MAC layer signaling, and physical layer PHY signaling. The radio resource control signaling includes radio resource control RRC signaling; the MAC layer signaling includes a MAC control element (CE); and the physical layer signaling includes downlink control information (DCI) and the like.

For example, the timer-list message may be delivered by UE-specific signaling. For example, the timer-list message is configured by RRC signaling, activated by MAC-CE signaling, and indicates beam switching signaling timer-list to the UE by DCI. This is not limited in this application.

In addition, for a user-level UE-specific timer-list structure, the following table 2 and table 3 sequentially provide examples. The UE may complete beam switching by itself based on the time-list signaling messages in table 2 and table 3.

By way of example rather than a limitation, table 2 shows a user-level timer-list structure, including a correspondence between beam switching signaling List_indx (for example, an example of K indexes), switching time Timer (for example, an example of K time periods), and beam identification Beam ID (for example, an example of K pieces of beam identification information) (optional). The list-indx index indicates a beam switching sequence that the user needs to experience from this moment until the user moves out of a range of a satellite cell, the timer indicates a time that the user needs to wait until a (list-indx)$^{th}$ beam switching occurs, and the Beam ID is a target beam ID when beam switching is performed at a time. When the user selects a beam in a beam RSRP manner, the timer-list does not need to include a Beam ID, so that signaling overheads of the list can be reduced.

TABLE 2

| Beam switching signaling List_indx | Switching time Timer | Beam identification Beam ID (optional) |
|---|---|---|
| 1 | timer1 | beam-ID |
| 2 | timer2 | beam-ID |
| ... | ... | ... |
| N | timerN | beam-ID |

In the timer-list shown in table 2, because all beam switching is based on a movement trajectory prediction of same UE, the sequential correlation of timers can be used to differentiate the timers in the table, so that signaling overheads of the timer-list can be further reduced.

By way of example rather than a limitation, table 3 shows a simplified user-level timer-list structure, that is, the timers in the table have differential values, including a correspondence between the beam switching signaling List_indx and the switching time Timer. The list-indx index indicates a beam switching sequence that the user needs to experience from this moment until the user moves out of a range of a satellite cell. As shown in table 3, a timer 1 in the table is used as a waiting time for next time of beam switching after the UE receives a list message, and therefore is a minimum time value in the entire list. The value is used as a basic timer. Other timers in the table are calculated based on a difference value between a current timer and a previous timer, that is, a timer-list with lower signaling overheads shown in table 3 is obtained.

TABLE 3

| Beam switching signaling List_indx | Switching time Timer |
|---|---|
| 1 | timer1 |
| 2 | timer2-timer1 |
| ... | ... |
| N | timerN-timer(N-1) |

S550. The terminal device determines the waiting time of beam switching based on the timer-list message, and completes beam switching by itself.

Specifically, the UE learns, through looking up the table based on the received timer-list message, the waiting time for the next time of beam switching, and starts timing. After the timer expires, the UE automatically performs beam switching, without a need to perform an additional signaling indication related to a TCI-state that is delivered by the network device and that is used for beam switching in NR beam scheduling.

It should be noted that a method for completing beam switching by the UE includes the following two cases, mainly depending on whether a timer-list message delivered by the network device includes a beam ID, as shown in table 2.

By way of example rather than a limitation, when the time-list message received by the UE includes the Beam ID, beam switching may be directly performed based on the Beam ID. In this solution, when delivering a UE-level timer-list to the terminal device, the network device needs to add a Beam ID corresponding to beam switching to the time-list message list. In other words, some additional signaling overheads need to be introduced. When reading the timer-list message, the user can obtain both the timer for beam switching and a corresponding Beam ID of the beam that needs to be switched.

By way of example rather than a limitation, when the time-list message received by the UE does not include the Beam ID, switching needs to be performed based on the Beam RSRP. In this solution, when the network device delivers the UE-level timer-list to the terminal device, only timer information for beam switching is included, and a corresponding Beam ID is not included. After the timer of the user expires, the user needs to determine the Beam ID (that is, the SSB ID) to which the UE needs to be switched based on the measured SSB signal strength (or L1-RSRP). Compared with the first solution, overheads of the timer-list in this solution are lower.

In conclusion, the solution of this embodiment provides a user-level timer-list structure design. The network device predicts a relative movement trajectory of a user in a satellite cell based on a beam topology, a satellite speed, and a location of a user in an RRC_CONNECTED mode, and calculates a waiting time between each beam switching by the user. A timer list is delivered, so that automatic beam switching is implemented at a scheduled time, and a network side does not need to deliver additional beam switching signaling. In this way, the user can automatically perform beam switching based on a timing sequence of the timer-list, thereby avoiding signaling overheads related to the TCI-state in NR beam management, and reducing power consumption of the user. In addition, the solution of this embodiment provides a method for introducing a differential value in the timer-list, that is, a method in which the beam switching time is a minimum timer plus the differential value, so that signaling overheads of the timer-list can be further reduced.

Figure 6:
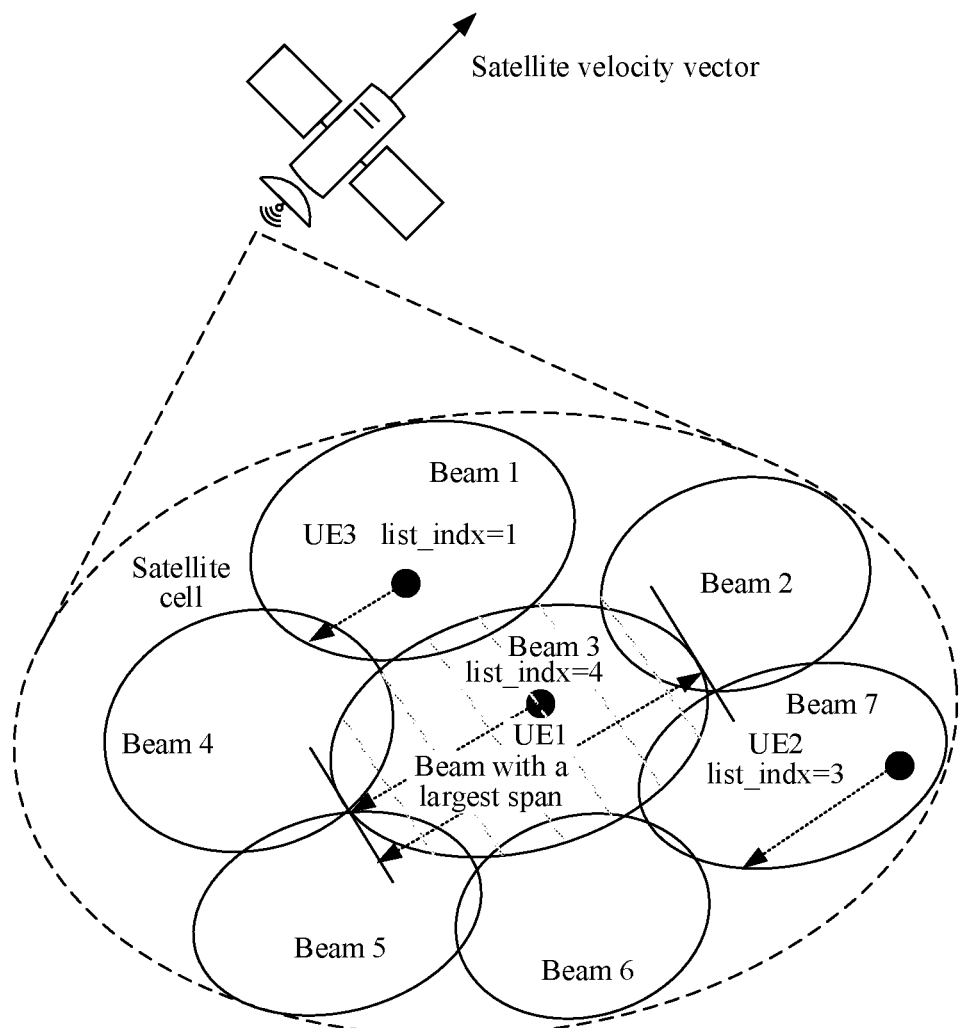
FIG. 6 is a schematic diagram of an example of cell-level timer-list beam switching applicable to this application.

FIG. 6 is a schematic diagram of an example of cell-level timer-list beam switching applicable to this application. As shown in FIG. 6, for all users in a cell, a network device delivers cell common timer-list signaling to a terminal device, so that all terminals automatically complete beam switching at a scheduled time. Different from FIG. 4, this solution is cell-level timer-list beam switching, that is, in the satellite cell, each UE switches from the current beam location to a next beam. FIG. 4 is user-level timer-list beam switching, that is, UE sequentially performs beam switching from the current beam location based on a movement trajectory predicted by the network device, until the UE moves out of the satellite cell.

It can be learned from FIG. 6 that the satellite cell includes a beam 1 to a beam 7. For example, a beam with a largest span, for example, a beam 3, is determined from the seven beams. The beam 3 is used as a reference beam for beam spacing division. The beam 3 is evenly divided into a plurality of beam spacings d max beam. It should be noted that, if a beam with a small span is selected as a reference beam herein for beam spacing division, for example, a beam 2, for a beam whose span is greater than the beam 2, beam switching cannot be completed by using beam switching instructions. In addition, a direction of the trajectory predicted by the UE is opposite to a direction of the satellite movement trajectory. For example, the UE1 switches in a direction opposite to the satellite movement trajectory in the beam 3, and moves out of a current beam location. It may be determined, based on list-indx=4, that the UE1 needs to cross four beam spacings from the current location to a location that next time of beam switching is performed.

Figure 7:
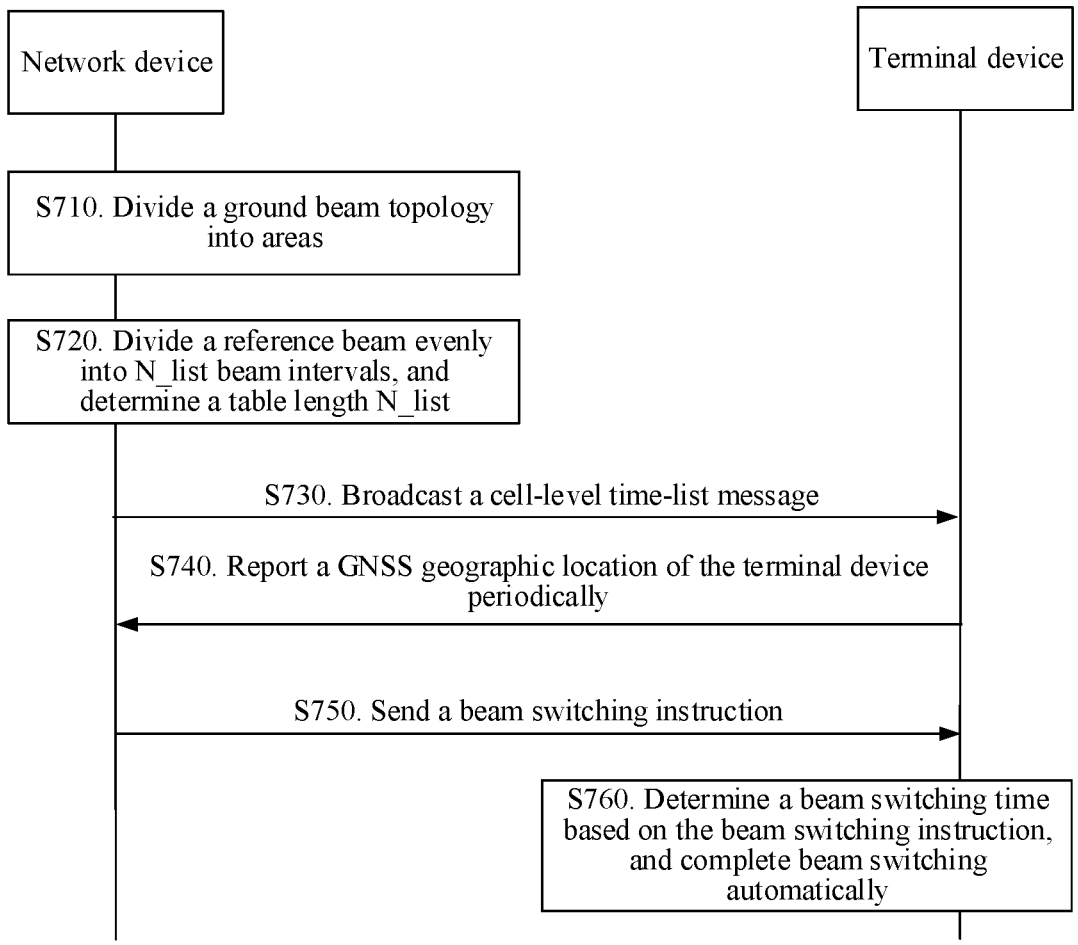
FIG. 7 is a schematic diagram of still another example of a beam switching method applicable to this application.

FIG. 7 is a schematic flowchart of a beam switching method 700 according to an embodiment of this application. As shown in FIG. 7, the method 700 includes the following steps.

S710. A network device divides a ground beam topology structure into areas.

Specifically, the network device needs to calculate, based on an ephemeris parameter, beam information, satellite location information, and the like, a topology structure of projection of each beam on the ground, for example, a projection shape, a beam width, and a beam boundary of each satellite beam on the ground.

The beam information includes a pitch angle, an azimuth, and the like of each beam, and the network device knows the satellite beam information. The satellite location information includes a satellite motion velocity vector $V_{sat}$, satellite orbit location coordinates ECEF, and the like. The network device may obtain the satellite motion velocity vector, the satellite orbit location coordinates, and the like by broadcasting based on the satellite ephemeris parameter.

A running speed of the satellite is far greater than a moving speed of the UE. For example, in the LEO orbit, the satellite velocity vector $V_{sat}$ can reach 7.5622 km/s, while the speed of 400 km/h high-speed rail is only 1.4% of $V_{sat}$. Therefore, within the satellite service time, the network device may consider that the UE is in the projection topology of the satellite cell on the ground, and a predicted movement trajectory along a direction opposite to $V_{sat}$ occurs. In embodiments of this application, it may be considered that the movement trajectory does not change within a time interval.

S720. The network device evenly divides a reference beam into N_list beam spacings, and determines a quantity of beam spacings N_list.

It should be noted that the reference beam in this application is a beam that is determined by the network device based on a beam topology structure and that has a largest span (d max beam) along a satellite motion direction, for example, the beam 3 in FIG. 6.

For example, the network device evenly divides the reference beam 3 into N_list beam spacings based on a satellite velocity vector $V_{sat}$ direction, where N_list is used as a list length of a cell-level timer-list message list.

For example, an LEO satellite is used as a standard. It is assumed that a span of the beam 3 is 400 km, and a designed table length is N_list=5. Based on $V_{sat}$=7.5622 km/s, a timer interval represented by each beam spacing is about 10 s.

S730. The network device broadcasts a timer-list message to all terminal devices in the cell. Correspondingly, all the terminal devices in the cell receive the timer-list message (for example, an example of a second message list) from the network device.

The message is cell-level cell-specific signaling, and may be broadcast and delivered by a synchronization signal block SSB. The timer-list message includes list_indx and a beam switching time corresponding to each list_indx.

In addition, for a cell-level cell-specific timer-list structure, table 4 and table 5 below sequentially provide examples. The UE searches table 4 and table 5 for a corresponding beam switching waiting time based on a beam switching instruction list_indx received in the following step S750, and then completes beam switching by itself.

By way of example rather than a limitation, table 4 shows a cell-level timer-list design structure, including a correspondence between an index List_indx and a beam switching time Timer. The list-indx index indicates a quantity of beam spacings that need to be crossed by a relative location of the user from a current moment to next time of beam switching by the user, and the timer indicates a time (that is, an example of first information) that the relative location of the user crosses each beam spacing.

For example, the LEO satellite is used as a standard. A timer interval represented by each beam spacing is designed to be about 10 s, which indicates that a timer required for a relative location of a user to cross each beam spacing is about 10 s. As shown in FIG. 6, the beam switching instruction received by the UE1 is list_indx=4. This indicates that when the UE1 switches a beam from a current moment to a next time, a quantity of beam spacings that need to be crossed by a relative location of the UE1 is 4. Correspondingly, a time required for the UE1 to switch a beam from the current moment to the next time is 20 s. If the beam switching instruction received by the UE2 is list_indx=3, it indicates that when the UE2 switches a beam from a current moment to a next time, a quantity of beam spacings that need to be crossed by a relative location of the UE2 is 3. Correspondingly, a time required for the UE1 to switch a beam from the current moment to the next time is 15 s. If the beam switching instruction received by the UE3 is list_indx=1, it indicates that when the UE3 switches a beam from a current moment to a next time, a quantity of beam spacings that need to be crossed by a relative location of the UE3 is 1. Correspondingly, a time required for the UE1 to switch a beam from the current moment to the next time is 5 s, and the like.

TABLE 4

| Index List-indx | Switching time Timer |
| --- | --- |
| 1 | timer |
| 2 | timer*2 |
| . . . | . . . |
| N_list | timer*N_list |

By way of example rather than a limitation, based on association between list_indx and values of timers in the table, the timer-list in table 4 may be simplified into one field, that is, a time that the relative location of the user crosses one beam spacing. Table 5 shows a simplified cell-level cell-specific timer-list design structure. As shown in table 5, there is only one switching time Timer parameter. Compared with table 4, this implementation further reduces signaling overheads.

When the UE receives the list_indx, the following formula is used:

timer_UE #x=timer×list_indx #x

A time at which next time of beam switching is performed is obtained through calculation. In this implementation, additional signaling overheads need to be introduced during initial access of the UE, so that a timer calculation manner is agreed on between the network device and the UE in advance.

For example, the LEO satellite is used as a standard. A timer interval represented by each beam spacing is designed to be about 10 s, which indicates that a timer required for a relative location of a user to cross each beam spacing is about 10 s. In this case, a time at which the UE performs the next time of beam switching is calculated based on the timer calculation manner agreed between the network device and the terminal device UE. The network device does not need to send a beam switching time calculation rule to the terminal device by additional signaling each time. In this application, a value of list_indx #x may be determined by the network device and the terminal device based on actual beam information, UE location information, and the like. This is not limited in this application.

TABLE 5

Time list Timer-list
Switching time Timer

S740. The terminal device (for example, the UE) periodically sends a GNSS geographic location of the terminal device to the network device (for example, the satellite). Correspondingly, the network device receives the GNSS geographic location (for example, an example of first location information of the terminal device) from the terminal device.

It should be understood that, in a satellite service process, the UE in an RRC_CONNECTED mode in a satellite cell may periodically report geographic location coordinates of the UE to the network device based on a GNSS capability of the UE. For example, an earth-centered, earth-fixed ECEF coordinate system.

S750. The network device sends a beam switching instruction list_indx to the terminal device. Correspondingly, the terminal device receives the beam switching instruction list_indx (for example, an example of second indication information) from the network device.

First, the network device calculates a distance (d_UE) at which each UE moves relative to a current beam boundary based on a geographic location periodically reported by the UE, a satellite velocity vector $V_{sat}$, and a beam topology structure. Then, the network device performs calculation based on the following formula, and delivers a beam switching instruction list_indx of each UE.

$$\text{list\_indx} = \text{Floor}\left(\frac{d\_UE \times N\_list}{d\_max\_beam}\right)$$

The beam switching instruction list_indx indicates the terminal device to find a corresponding beam switching waiting time from the time-list message list, and complete beam switching by itself. In this implementation, the network device only needs to deliver the beam switching signaling, and does not need to send time information corresponding to the beam switching. This can reduce signaling overheads and reduce power consumption of the terminal.

It should be understood that a manner of carrying the indication information, the configuration information, and the like involved in this application may be but is not limited to one or a combination of at least two of radio resource control signaling, media access control MAC layer signaling, and physical layer PHY signaling. The radio resource control signaling includes radio resource control RRC signaling; the MAC layer signaling includes a MAC control element (CE); and the physical layer signaling includes downlink control information (DCI) and the like.

For example, the beam switching instruction may be delivered by user-level UE-specific signaling. For example, the beam switching instruction is configured by RRC signaling, activated by MAC-CE signaling, and indicates beam switching signaling to the UE by DCI. This is not limited in this application.

It should be noted that after the network device sends the beam switching instruction list_indx to the terminal device, if the terminal device moves at a high speed in this period, the network device needs to determine, based on the GNSS location subsequently periodically reported by the terminal device, whether to update list_indx of the user.

By way of example rather than a limitation, it is assumed that a time span represented by each beam spacing is a timer, and the gNB indicates, for the first time, that list_indx of the UE is idx #0 (for example, an example of a first index). After time t1, the gNB receives a location reported by the UE again (for example, an example of second location information of the terminal device), and calculates a new list_indx as idx #1 (for example, an example of a second index). If $$\text{Floor}\left(\frac{t1}{T}\right) + idx\#1 \neq idx\#0$$

In this case, it indicates that the UE generates a large deviation on an original predicted trajectory due to a moving speed of the UE, and the network device needs to deliver a new list_indx (that is, an example of third indication information), that is, idx #1, to the UE.

It should be noted that, in this case, in step S730, the timer-list message broadcast by the network device does not need to be resent, because the message is determined based on the satellite information and is irrelevant to a change of a user location. In this embodiment, the geographic location of the user mainly affects the beam switching instruction list_indx sent by the network device. However, the time-list message list in the solutions provided in FIG. 4 and FIG. is determined based on the beam information and the geographic location of the UE. Therefore, when the network device calculates that a distance difference between a latest location reported by the UE and a predetermined location in a previously predicted trajectory of the UE is greater than a preset threshold d Threshold, the network device needs to re-deliver a new time-list message list.

S760. The terminal device determines the beam switching waiting time in the timer-list message list based on the beam switching signaling list_indx, and completes beam switching by itself.

Specifically, the UE looks up the table in the timer-list message based on the received beam switching signaling list_indx, to learn the waiting time for the next time of beam switching. The UE starts timing, and after the timer expires, the UE automatically performs beam switching without performing an additional signaling indication related to a TCI-state that is delivered by the network device and that is used for beam switching in NR beam scheduling.

It should be noted that a method for completing beam switching by the UE includes the following two cases, mainly depending on whether a list_indx message delivered by the network device includes a Beam ID.

By way of example rather than a limitation, when the list_indx message received by the UE includes the Beam ID (that is, an example of identification information of a first beam), beam switching may be directly performed based on the Beam ID. In this solution, when delivering a UE-level timer-list to the terminal device, the network device needs to add a Beam ID corresponding to beam switching to the time-list message list. In other words, some additional signaling overheads need to be introduced. When reading the timer-list message, the user can obtain both the timer for beam switching and a corresponding Beam ID of the beam that needs to be switched.

By way of example rather than a limitation, when the list_indx message received by the UE does not include the Beam ID, switching needs to be performed based on the Beam RSRP. In this solution, when the network device delivers the UE-level timer-list to the terminal device, only timer information for beam switching is included, and a corresponding Beam ID is not included. After the timer of the user expires, the user needs to determine the Beam ID (that is, the SSB ID) to which the UE needs to be switched based on the measured SSB signal strength (or L1-RSRP). Compared with the first solution, overheads of the timer-list in this solution are lower.

In conclusion, the cell-level timer-list message list provided in the solution of this embodiment is common to all UEs in a satellite cell, and a beam that has a largest distance span along a satellite motion direction in the cell is used as a reference beam and is partitioned at an equal interval. In addition, in the entire satellite service time, the timer-list does not need to be updated and resent depending on whether the location of the user is greatly offset. In addition, a structure of the timer-list in the solution of this embodiment is simple, and the 38.821 standard specifies that a beam footprint size of an NTN cell is 100 km to 1000 km (an actual Ka-band beam width is far less than the value). Therefore, based on calculation of a timer whose length is 10 s corresponding to each beam spacing specified in this solution, a maximum length of the timer-list N_list is 13.

In comparison, a quantity of beams in an entire satellite cell needs to be considered for a length of the timer-list in FIG. 4 and FIG. 5. However, it is specified in NR that a maximum quantity of beams in a cell may reach 64. Therefore, if the NTN uses the beam management standard of NR, the length of the timer-list in FIG. 4 and FIG. 5 is far greater than a length of the timer-list in FIG. 6 and FIG. 7. Therefore, although the beam switching timer provided in the solution of this embodiment is rougher than the UE-specific beam switching timer in FIG. 4 and FIG. 5, a simple timer-list structure design of the beam switching timer may further reduce signaling overheads of NTN beam management.

Figure 8:
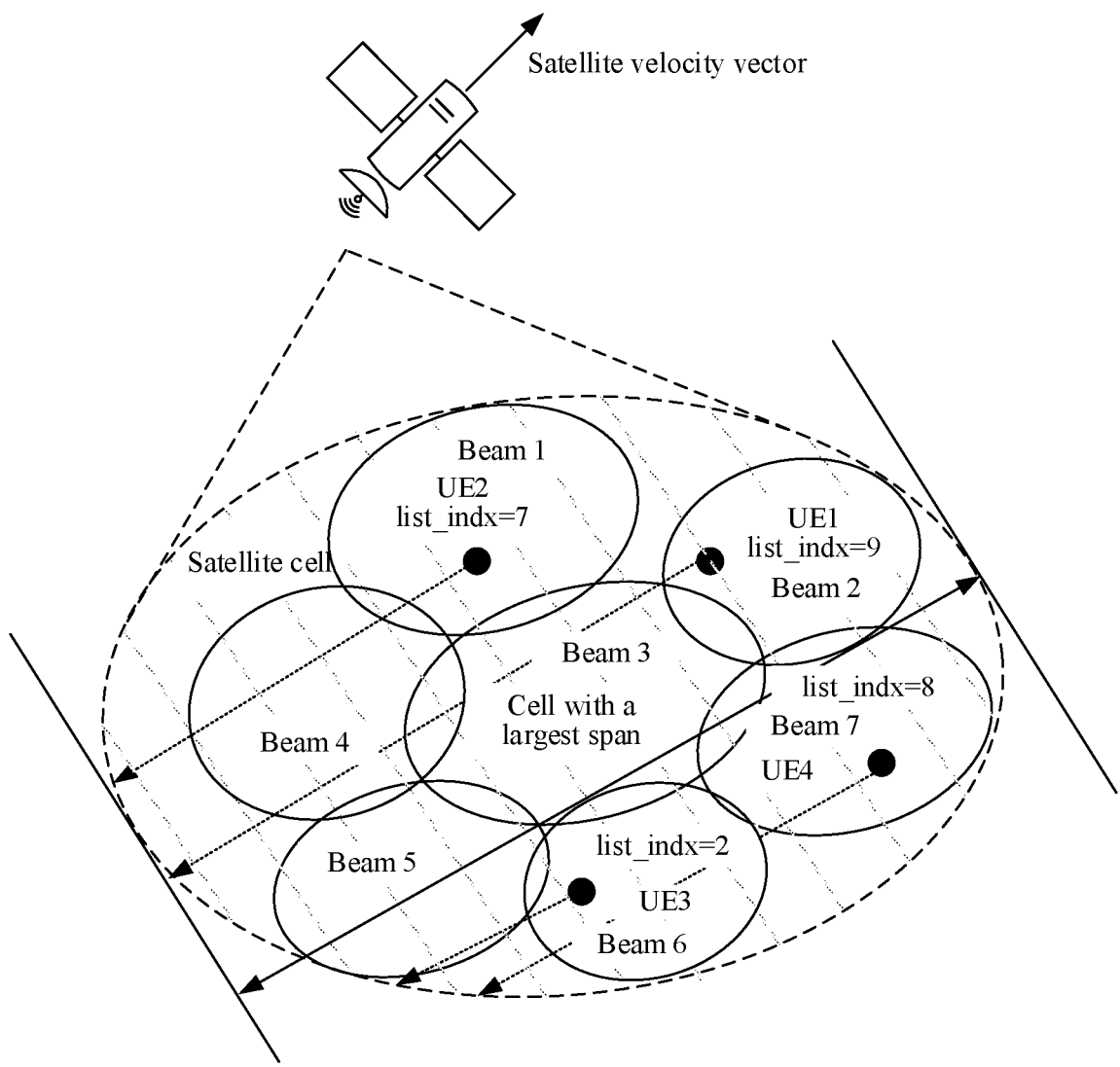
FIG. 8 is a schematic diagram of another example of cell-level timer-list beam switching applicable to this application.

FIG. 8 is a schematic diagram of another example of cell-level timer-list beam switching applicable to this application. FIG. 8 is a supplement to FIG. 6. For all users in a satellite cell, a waiting time between cell switching by the users is calculated, and cell-level beam switching signaling is delivered. As shown in FIG. 8, for all users in a cell, a network device delivers cell common timer-list signaling to a terminal device, so that all terminals automatically complete beam switching at a scheduled time. Same as the foregoing solution in FIG. 6, both are cell-level timer-list beam switching. Different from FIG. 6, in this solution, each UE directly performs cell switching from a current beam location based on a movement trajectory predicted by the network device. In FIG. 6, in the satellite cell, each UE is switched from the current beam location to a next beam.

It can be learned from FIG. 8 that the satellite cell includes a beam 1 to a beam 7. For example, a maximum span of a cell is divided into areas at an equal interval along a $V_{sat}$ direction, that is, the satellite cell is divided into a plurality of cell intervals d_cell_max. A direction of the trajectory predicted by the UE is opposite to a direction of the satellite movement trajectory. For example, the UE 1 switches in a beam 2 in a direction opposite to the satellite movement trajectory, and moves out of the satellite cell. It may be determined, based on list-indx=9, that the UE 1 needs to cross nine cell intervals from the current location to a location that next time of cell switching is performed.

Figure 9:
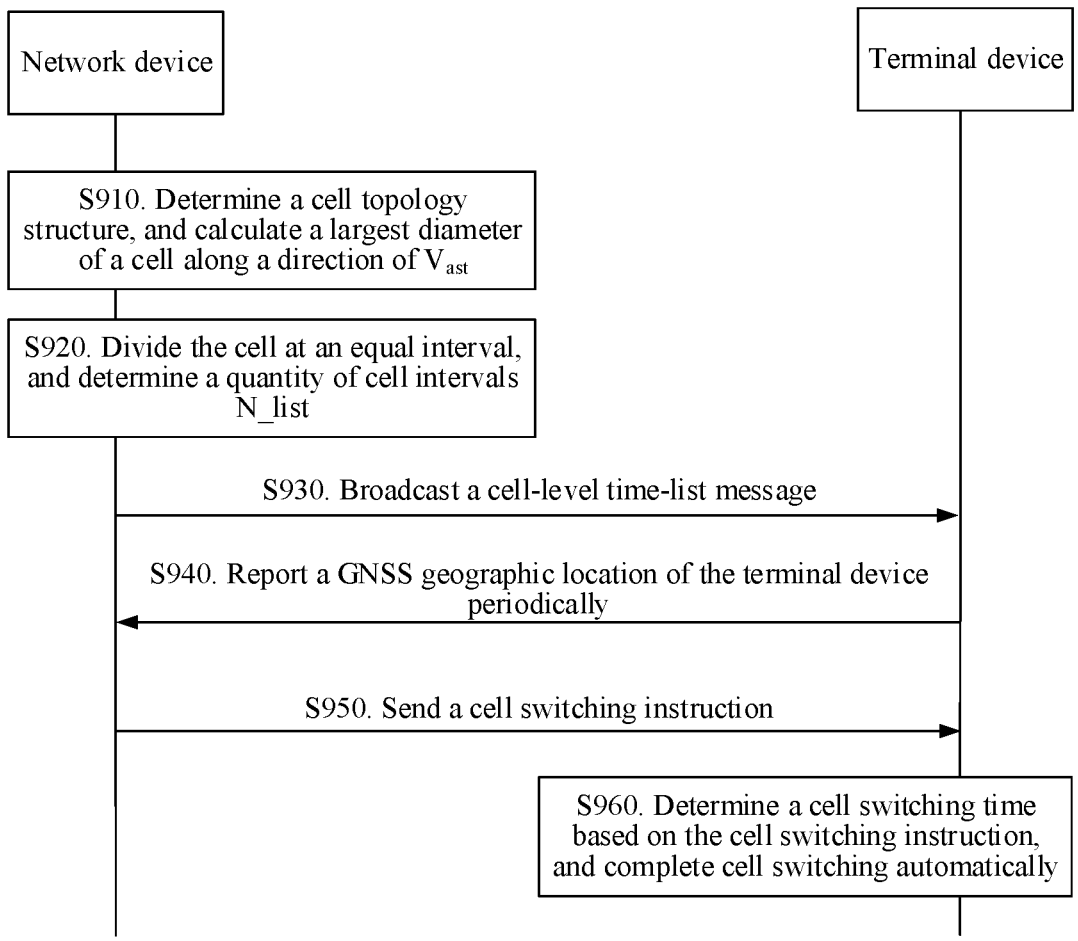
FIG. 9 is a schematic diagram of still another example of a beam switching method applicable to this application.

FIG. 9 is a schematic flowchart of a beam switching method 900 according to an embodiment of this application. As shown in FIG. 9, the method 900 includes the following steps.

S910. A network device determines a terrestrial cell topology structure.

It should be understood that the network device needs to calculate, based on an ephemeris parameter, beam information, satellite location information, and the like, a topology structure of projection of each beam on the ground, for example, a projection shape, a beam width, and a beam boundary of each satellite beam on the ground.

In embodiments of this application, the beam information includes a pitch angle, an azimuth, and the like of each beam, and the network device knows the satellite beam information. The satellite location information includes a satellite motion velocity vector $V_{sat}$, satellite orbit location coordinates ECEF, and the like. The network device may obtain the satellite motion velocity vector, the satellite orbit location coordinates, and the like by broadcasting based on the satellite ephemeris parameter. Cell information mainly refers to a maximum diameter of a satellite cell in a direction of the satellite velocity vector $V_{sat}$.

A running speed of the satellite is far greater than a moving speed of the UE. For example, in the LEO orbit, the satellite velocity vector $V_{sat}$ can reach 7.5622 km/s, while the speed of 400 km/h high-speed rail is only 1.4% of $V_{sat}$. Therefore, within the satellite service time, the network device may consider that the UE is in the projection topology of the satellite cell on the ground, and a predicted movement trajectory along a direction opposite to $V_{sat}$ occurs. In embodiments of this application, it may be considered that the movement trajectory does not change within a time interval.

S920. The network device divides the cell into N_list cell intervals at an equal interval, and determines a quantity of cell intervals N_list.

It should be understood that the network device needs to calculate a maximum cell diameter d_cell_max along the direction of the satellite velocity vector $V_{sat}$, and divide a maximum span of the satellite cell into areas at an equal interval along the direction of the satellite velocity vector $V_{sat}$. Each area becomes a cell interval. A span distance of each cell interval is d_cell_interval. A total quantity of cell intervals obtained by dividing the cell is N_list, which is specifically shown in FIG. 8.

It should be noted that the network device evenly divides the cell into N_list cell intervals based on the direction of the satellite velocity vector $V_{sat}$, where N_list is used as a list length of a cell-level timer-list. In other words, a length of the timer-list message list (for example, an example of a second message list) is set to a quantity of cell intervals obtained through division N_list. The time interval timer represented by each cell interval is equal to d_cell_interval/$V_{sat}$.

For example, an LEO satellite is used as a standard. It is assumed that a largest span of the satellite cell is 1000 km, and a designed table length is N_list=12. Based on $V_{sat}$=7.5622 km/s, a span distance of each cell interval is about 83 km, and a timer interval represented by each beam spacing is about 11 s.

S930. The network device broadcasts a timer-list message to all terminal devices in the cell. Correspondingly, all the terminal devices in the cell receive the timer-list message from the network device.

It should be noted that, the message is cell-level cell-specific signaling, and may be broadcast and delivered by a synchronization signal broadcast channel block SSB. The timer-list message includes list_indx and cell switching time corresponding to each list_indx.

In addition, for a cell-level cell-specific timer-list structure, table 6 and table 7 below sequentially provide examples. The UE looks up the table 6 and table 7 for a corresponding cell switching waiting time based on a cell switching instruction list_indx received in the following step S950, and then completes beam switching by itself.

By way of example rather than a limitation, table 6 shows a cell-level timer-list design structure, including a correspondence between an index List_indx and a cell switching time Timer. The list-indx index indicates a quantity of cell intervals that need to be crossed by a relative location of the user from a current moment to next time of cell switching by the user, and the timer indicates a time (that is, an example of first information) that the relative location of the user crosses each cell interval.

For example, the LEO satellite is used as a standard. A timer interval represented by each cell interval is designed to be about 11 s, which indicates that a timer required for a relative location of a user to cross each cell interval is about 11 s. As shown in FIG. 6, the beam switching instruction received by the UE1 is list_indx=9. This indicates that when the UE1 switches a cell from a current moment to a next time, a quantity of cell intervals that need to be crossed by a relative location of the UE1 is 9. Correspondingly, a time required for the UE1 to switch a beam from the current moment to the next time is 99 s. If the beam switching instruction received by the UE2 is list_indx=7, it indicates that when the UE2 switches a cell from a current moment to a next time, a quantity of cell intervals that need to be crossed by a relative location of the UE2 is 7. Correspondingly, a time required for the UE2 to switch a cell from the current moment to the next time is 77 s. If the beam switching instruction received by the UE3 is list_indx=2, it indicates that when the UE3 switches a cell from a current moment to a next time, a quantity of cell intervals that need to be crossed by a relative location of the UE3 is 2. Correspondingly, a time required for the UE3 to switch a cell from the current moment to the next time is 22 s. If the beam switching instruction received by the UE4 is list_indx=8, it indicates that when the UE4 switches a cell from a current moment to a next time, a quantity of cell intervals that need to be crossed by a relative location of the UE4 is 4. Correspondingly, a time required for the UE4 to switch a cell from the current moment to the next time is 44 s, and the like.

TABLE 6

| Index List-indx | Switching time Timer |
| --- | --- |
| 1 | timer |
| 2 | timer*2 |
| ... | ... |
| N_list | timer*N_list |

By way of example rather than a limitation, based on association between list_indx and values of timers in the table, the timer-list in table 6 may be simplified into one field, that is, a time that the relative location of the user crosses one cell interval. Table 7 shows a simplified cell-level cell-specific timer-list design structure. As shown in table 7, there is only one switching time Timer parameter. Compared with table 6, this implementation further reduces signaling overheads.

When the UE receives the list_indx, the following formula is used:

$$timer\_UE\ \#x = timer \times list\_indx\ \#x$$

A time at which next time of cell switching is performed is obtained through calculation. In this implementation, additional signaling overheads need to be introduced during initial access of the UE, so that a timer calculation manner is agreed on between the network device and the UE in advance.

For example, the LEO satellite is used as a standard. A timer interval represented by each cell interval is designed to be about 11 s, which indicates that a timer required for a relative location of a user to cross each cell interval is about 11 s. In this case, a time at which the UE performs the next time of cell switching is calculated based on the timer calculation manner agreed between the network device and the terminal device UE. In this application, a value of list_indx #x may be determined by the network device and the terminal device based on actual cell information, UE location information, and the like. This is not limited in this application.

TABLE 7

| Time list Timer-list |
| --- |
| Switching time Timer |

S940. The terminal device (for example, the UE) periodically sends a GNSS geographic location of the terminal device to the network device (for example, the satellite). Correspondingly, the network device receives the GNSS geographic location (that is, an example of first location information of the terminal device) from the terminal device.

It should be understood that, in a satellite service process, the UE in an RRC_CONNECTED mode in a satellite cell may periodically report geographic location coordinates of the UE to the network device based on a GNSS capability of the UE. For example, an earth-centered, earth-fixed ECEF coordinate system.

S950. The network device sends a cell switching instruction list_indx to the terminal device. Correspondingly, the terminal device receives the cell switching instruction list_indx (for example, an example of second indication information) from the network device.

First, the network device calculates a distance d_Cell at which each UE moves relative to a current cell boundary based on a geographic location periodically reported by the UE, a satellite velocity vector $V_{sat}$, a cell topology structure, and the like. The network device calculates and delivers a cell switching instruction list_indx of each UE.

$$list\_indx = Floor\left(\frac{d\_Cell \times N\_list}{d\_max\_cell}\right)$$

The cell switching instruction list_indx indicates the terminal device to find a corresponding cell switching waiting time from the time-list message list, and complete cell switching by itself. In this implementation, the network device only needs to deliver the cell switching signaling, and does not need to send time information corresponding to the cell switching. This can reduce signaling overheads and reduce power consumption of the terminal.

It should be understood that a manner of carrying the indication information, the configuration information, and the like involved in this application may be but is not limited to one or a combination of at least two of radio resource control signaling, media access control MAC layer signaling, and physical layer PHY signaling. The radio resource control signaling includes radio resource control RRC signaling; the MAC layer signaling includes a MAC control element (CE); and the physical layer signaling includes downlink control information (DCI) and the like.

For example, the cell switching instruction may be delivered by user-level UE-specific signaling. For example, the cell switching instruction is configured by RRC signaling, activated by MAC-CE signaling, and indicates cell switching signaling to the UE by DCI. This is not limited in this application.

It should be noted that after the network device sends the cell switching instruction list_indx to the terminal device, if the terminal device moves at a high speed in this period, the network device needs to determine, based on the GNSS location subsequently periodically reported by the terminal device, whether to update list_indx of the user.

By way of example rather than a limitation, it is assumed that a time span represented by each cell interval is T, that is, the timer in embodiments of this application, and the gNB indicates, for the first time, that list_indx of the UE is idx #0 (for example, an example of a first index). After time t1, the gNB receives a location reported by the UE again (for example, an example of second location information of the terminal device), and calculates a new list_indx as idx #1 (for example, an example of a second index). If $$\text{Floor}\left(\frac{t1}{T}\right) + idx\#1 \neq idx\#0$$

In this case, it indicates that the UE generates a large deviation on an original predicted trajectory due to a moving speed of the UE, and the network device needs to deliver a new list_indx (that is, an example of third indication information), that is, idx #1, to the UE.

It should be noted that, in this case, in step S930, the timer-list message broadcast by the network device does not need to be resent, because the message is determined based on the cell information and is irrelevant to a change of a user location. In this embodiment, the geographic location of the user mainly affects the cell switching instruction list_indx sent by the network device. This is the same as the time-list message list in the solutions provided in FIG. 6 and FIG. 7, and does not need to be resent. However, the time-list message list in the solutions provided in FIG. 4 and FIG. 5 is determined based on the beam information and the geographic location of the UE. Therefore, when the network device calculates that a distance difference between a latest location reported by the UE and a predetermined location in a previously predicted trajectory of the UE is greater than a preset threshold d Threshold, the network device needs to re-deliver a new time-list message list.

S960. The terminal device determines the cell switching waiting time in the timer-list message list based on the cell switching signaling list_indx, and completes cell switching by itself.

Specifically, the UE looks up the table in the timer-list message based on the received cell switching signaling list_indx, to learn the waiting time for the next time of cell switching. The UE starts timing, and after the timer expires, the UE automatically performs cell switching without performing an additional signaling indication related to a transmission configuration indication-state (TCI-state) that is delivered by the network device and that is used for cell switching in NR beam scheduling. It should be noted that a specific implementation in which the UE completes cell handover by itself is not specifically limited in this application.

In conclusion, in the solution of this embodiment, a cell-level timer-list message list is mainly introduced to predict a time at which a user performs cell switching. Based on this, a network device may configure beam information, BWP information, and the like of a next satellite cell for the user in advance by RRC signaling, to reduce a blind detection time when the user performs the cell switching and signaling overheads related to cell access, and reduce power consumption of the user.

In addition, the cell-level timer-list message list provided in the solution of this embodiment is common to all UEs in a satellite cell, and the cell is partitioned at an equal interval along a satellite motion direction. In addition, in the entire satellite service time, the timer-list does not need to be updated and resent depending on whether the location of the user is greatly offset. In addition, a structure of the timer-list in the solution of this embodiment is simple, and the 38.821 standard specifies that a beam footprint size of an NTN cell is 100 km to 1000 km (an actual Ka-band beam width is far less than the value). Therefore, based on calculation of a timer whose length is 10 s corresponding to each beam spacing specified in this solution, a maximum length of the timer-list N_list is 13. In comparison, a quantity of beams in an entire satellite cell needs to be considered for a length of the timer-list in FIG. 4 and FIG. 5. However, it is specified in NR that a maximum quantity of beams in a cell may reach 64. Therefore, if the NTN uses the beam management standard of NR, the length of the timer-list in FIG. 4 and FIG. 5 is far greater than a length of the timer-list in FIG. 8 and FIG. 9. Therefore, although the beam switching timer provided in the solution of this embodiment is rougher than the UE-specific beam switching timer in FIG. 4 and FIG. 5, a simple timer-list structure design of the beam switching timer may further reduce signaling overheads of NTN beam management.

Figure 10:
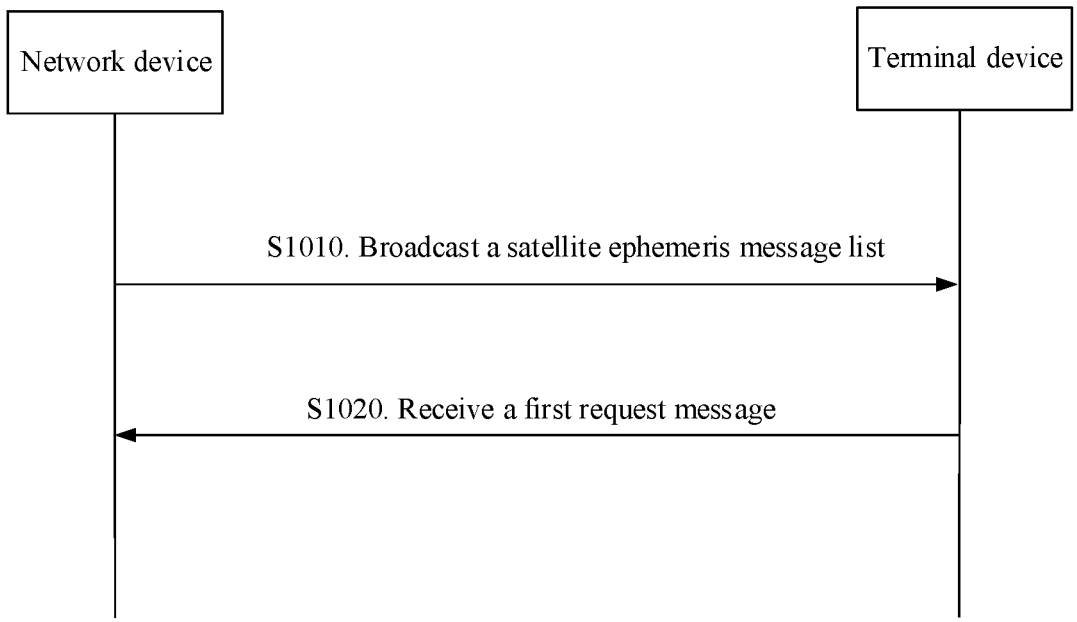
FIG. 10 is a schematic diagram of an example of a beam switching method applicable to this application.

FIG. 10 is a schematic flowchart of a beam switching method 1000 according to an embodiment of this application. As shown in FIG. 10, the method 1000 includes the following steps.

S1010. A network device broadcasts a satellite ephemeris message list. Correspondingly, a terminal device receives the satellite ephemeris message list from the network device.

The satellite ephemeris message list includes a synchronization signal block identifier SSB ID, beam angle information of a satellite device (for example, a beam center elevation angle shown in FIG. 11), and location information of the satellite device. The satellite ephemeris message list is for determining a satellite beam topology around the terminal device.

In this application, this implementation is for a user-led beam switching process in a cell covered by the satellite device. The cell-level broadcast may be implemented by adding beam-related information to the SSB, for example, an SSB ID, a Beam ID, a beam angle, a BWP ID, and satellite location coordinates.

S1020. The terminal device sends a first request message to the network device. Correspondingly, the network device receives the first request message from the terminal device.

The first request message includes identification information of a second beam. The identification information of the second beam is determined based on a satellite ephemeris message list. The first request message is for requesting to switch from a current serving beam to the second beam in a first time period, and the first time period is determined based on first location information of the terminal device and the satellite ephemeris message list.

It should be noted that, a ground topology of the current serving beam is determined based on angle information of the current serving beam and the location information of the satellite device.

By way of example rather than a limitation, the terminal device sends second location information of the terminal device to the network device, where the second location information is latest location information of the terminal device. Correspondingly, the network device receives the second location information of the terminal device.

When a distance difference between the second location information of the terminal device and a predetermined location in the movement trajectory of the terminal device is greater than a second preset threshold, the terminal device sends a second request message to the network device. Correspondingly, the network device receives the second request message from the terminal device.

The second request message includes identification information of a third beam. The second request message is for requesting to switch from the current serving beam to the third beam in a second time period, and the first time period is determined based on the second location information of the terminal device and the satellite ephemeris message list.

It should be understood that the third beam is different from the second beam, and the second time period is different from the first time period.

Figure 11:
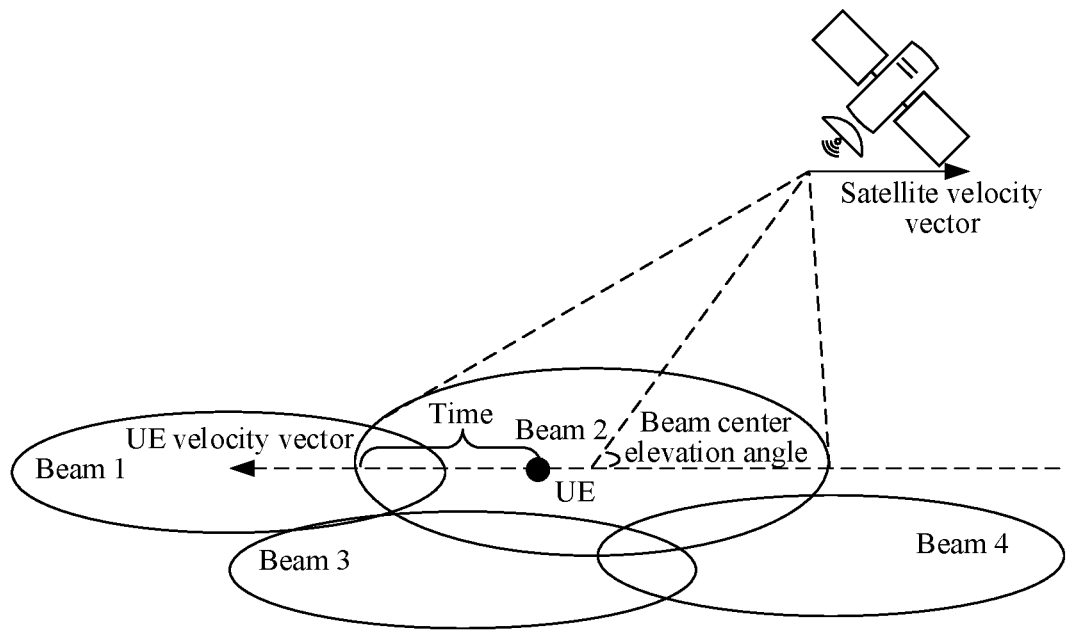
FIG. 11 is a schematic diagram of an example in which a terminal device dominates timer-based beam switching applicable to this application.

FIG. 11 is a schematic diagram of an example in which UE dominates timer-based beam switching applicable to this application. Different from the beam and cell switching led by the network device in embodiments shown in FIG. 4 to FIG. 9, the solution in this embodiment is designed for a user-led, timer-based beam switching procedure in a satellite cell. A large quantity of timer-list signaling overheads are avoided by increasing calculation complexity of the UE.

It can be learned from FIG. 11 that the satellite cell includes a beam 1 to a beam 4. A trajectory predicted by the UE is in a direction opposite to a satellite movement trajectory. For example, a current location of the UE is in a beam 2, and the UE switches in a direction opposite to the satellite movement trajectory, and needs to wait for a timer to move out of the beam 2.

Figure 12:
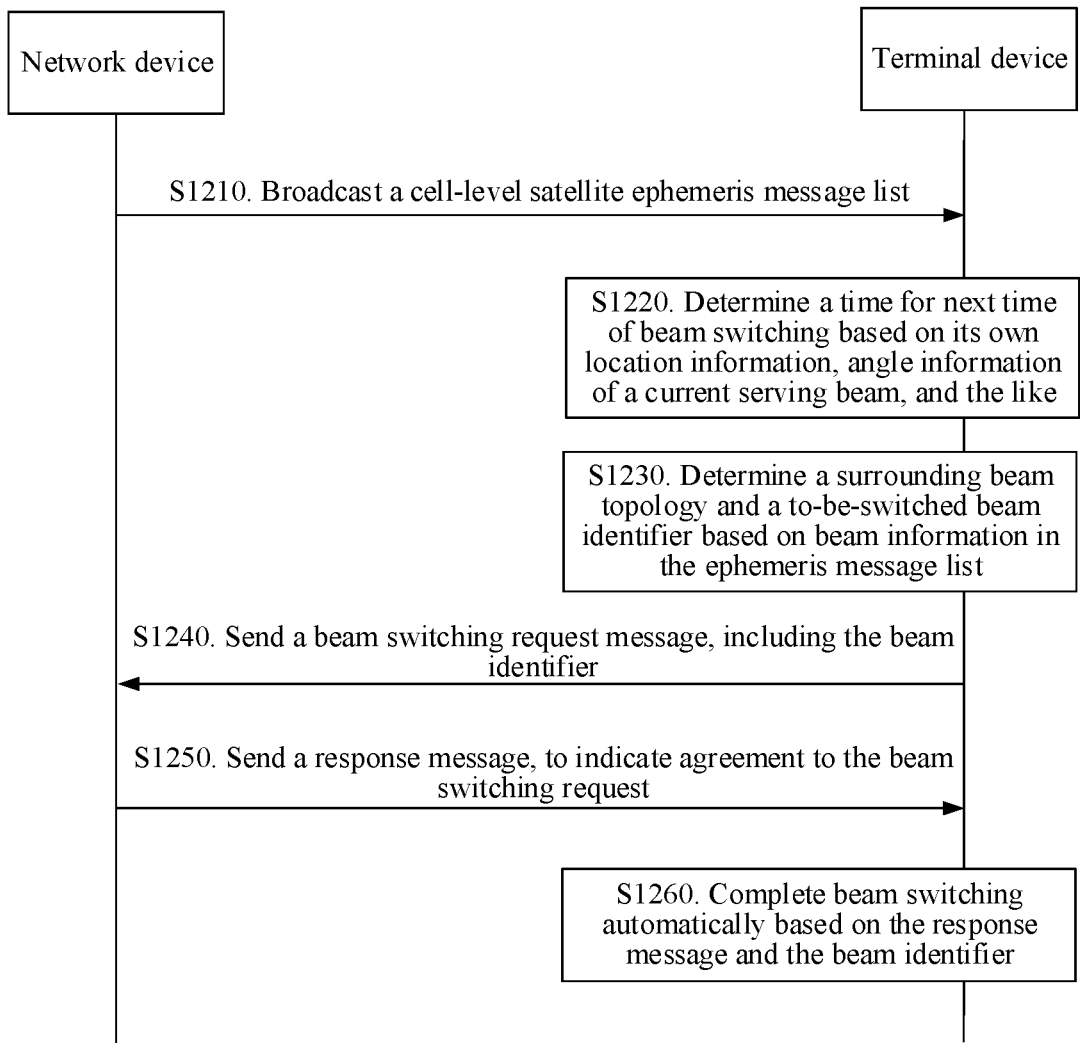
FIG. 12 is a schematic diagram of another example of a beam switching method applicable to this application.

FIG. 12 is a schematic flowchart of a beam switching method 1200 according to an embodiment of this application. As shown in FIG. 12, the method 1200 includes the following steps.

S1210. A network device (for example, a satellite device) broadcasts a cell-level satellite ephemeris message list to a terminal device (for example, UE in a connected mode). Correspondingly, the terminal device receives the satellite ephemeris message list from the network device.

The ephemeris message list includes a synchronization signal block identifier SSB ID, beam angle information (for example, the beam center elevation angle in FIG. 11), and satellite location coordinates ECEF. The cell-level broadcast may be implemented by adding beam-related information to the SSB. For a specific design, see table 8.

Table 8 shows a structure of a cell-specific ephemeris broadcast list used for UE-dominated cell-level beam switching, including a relationship between a Beam ID, a synchronization signal block identifier SSB ID, a partial bandwidth identifier BWP ID, a beam angle, and a satellite coordinate location. It should be noted that, the ephemeris message list is cell-level cell-specific signaling, and may be broadcast and delivered by a synchronization signal broadcast channel block SSB. When the Beam ID is in a one-to-one correspondence with the SSB ID, the Beam ID may be omitted. The BWP ID is introduced because BWP switching needs to be performed simultaneously during beam switching in an NTN. A beam is in a one-to-one correspondence with a partial bandwidth BWP, and each beam has a corresponding frequency band. Based on the correspondence between the SSB and the BWP, the UE can know, when performing beam switching, a BWP ID to which the UE should be switched, so that the network device is not required to perform reconfiguration, thereby reducing signaling overheads.

TABLE 8

| Synchronization signal broadcast channel block SSB ID | Beam identifier Beam ID | Partial bandwidth identifier BWP ID | Beam angle | Satellite location |
|---|---|---|---|---|
| SSB 0 | 0 | 1 | Angle | Coordinate |
| SSB 1 | 1 | 2 | Angle | |
| ... | ... | ... | ... | |
| SSB N | N | N | Angle | |

It should be understood that the network device needs to calculate, based on an ephemeris parameter, beam information, satellite location information, and the like, a topology structure of projection of each beam on the ground, for example, a projection shape, a beam width, and a beam boundary of each satellite beam on the ground.

In embodiments of this application, the beam information includes a pitch angle, an azimuth, and the like of each beam, and the network device knows the satellite beam information. The satellite location information includes a satellite motion speed vector $V_{sat}$, satellite orbit location coordinates ECEF, and the like. The network device may obtain the satellite motion speed vector, the satellite orbit location coordinates, and the like by broadcasting based on the satellite ephemeris parameter. Cell information mainly refers to a maximum diameter of a satellite cell in a direction of the satellite velocity vector $V_{sat}$.

A running speed of the satellite is far greater than a moving speed of the UE. For example, in the LEO orbit, the satellite velocity vector $V_{sat}$ can reach 7.5622 km/s, while the speed of 400 km/h high-speed rail is only 1.4% of $V_{sat}$. Therefore, within the satellite service time, the network device may consider that the UE is in the projection topology of the satellite cell on the ground, and a predicted movement trajectory along a direction opposite to $V_{sat}$ occurs. In embodiments of this application, it may be considered that the movement trajectory does not change within a time interval.

S1220. The terminal device determines a timer (that is, an example of a first time period) for next time of beam switching.

First, the terminal device calculates a ground topology of a current serving beam based on the location coordinates of the terminal device (that is, an example of first location information of the terminal device), angle information of the current serving beam, the satellite location coordinates, and the like. Then, with reference to the satellite velocity vector $V_{sat}$, the terminal device may calculate time required to wait for leaving the current serving beam. For example, FIG. 11 shows the timer that the UE needs to wait to switch from the current beam 2 to the beam 1.

S1230. The terminal device determines a surrounding beam topology structure, and a to-be-switched beam identifier Beam ID (that is, an example of identification information of a second beam) based on beam information in the ephemeris broadcast message list.

It should be noted that the beam information in the ephemeris broadcast message list includes an SSB ID, a beam angle, and a satellite location. A satellite beam topology around the current serving beam is calculated, and a Beam ID (that is, an SSB ID) for next time of beam switching is determined based on a direction of $V_{sat}$.

S1240. The terminal device sends a beam switching request message to the network device. Correspondingly, the network device receives the beam switching request message (that is, an example of a first request message) from the terminal device.

The beam switching request message includes a Beam ID (that is, the example of the identification information of the second beam). The Beam ID is used for beam identification information corresponding to a beam that is used by the terminal device to switch from the current serving beam to a next beam.

It should be noted that the network device needs to configure, based on the beam identifier Beam ID reported by the terminal device, resources related to the beam switching, for example, a BWP.

It should be noted that the terminal device needs to determine whether to update a value of the timer based on a location relationship of the terminal device.

For example, on the basis of determining the timer for the next time of beam switching in step S1220, if the UE subsequently moves at a high speed, the UE needs to recalculate a distance difference between a geographic location GNSS of the UE and a predetermined location in a previously predicted trajectory of the terminal. If the difference is greater than a preset threshold (that is, an example of a second preset threshold), it indicates that the geographic location of the UE generates a large deviation. The UE needs to re-determine a timer for next time of beam switching (that is, an example of a second time period), and completes beam switching by itself based on a new beam switching timer.

Optionally, if the geographic location of the UE deviates greatly, and the beam information also changes, that is, a serving beam on which the current terminal is located is different from the second beam, the terminal device needs to resend the beam switching request message to the network device. Correspondingly, the network device receives the beam switching request message (that is, an example of a second request message) from the terminal device.

It should be understood that, the beam switching request message includes a changed Beam ID (that is, an example of identification information of a third beam), and the network device needs to configure, based on a new Beam ID, resources related to beam switching, for example, a BWP.

S1250. The network device sends a response message to the terminal device. Correspondingly, the terminal device receives the response message from the network device.

The response message may be carried in 1-bit DCI indication signaling, and is used to agree on the beam switching request message.

It should be understood that a manner of carrying the indication information, the configuration information, and the like involved in this application may be but is not limited to one or a combination of at least two of radio resource control signaling, media access control MAC layer signaling, and physical layer PHY signaling. The radio resource control signaling includes radio resource control RRC signaling; the MAC layer signaling includes a MAC control element (CE); and the physical layer signaling includes downlink control information (DCI) and the like.

For example, the beam switching request message may be delivered by user-level UE-specific signaling. For example, the beam switching request message is configured by RRC signaling, activated by MAC-CE signaling, and sends beam switching request signaling to the network device by DCI. This is not limited in this application.

S1260. The terminal device completes beam switching by itself based on the response message and the beam identifier Beam ID.

For example, the UE performs timing based on the timer for the next time of beam switching determined in step S1220 until the timer expires, and performs beam switching based on the response message of the network device and the Beam ID determined in step S1230.

In conclusion, the solution in this embodiment mainly provides a UE-led beam switching procedure based on timer timing. The network device is designed to broadcast a cell-level beam switching message list (that is, a satellite ephemeris broadcast list), that is, the network device broadcasts beam angle information, a satellite location, and the like that are bound to an SSB ID, so that the terminal device locally calculates a surrounding satellite beam topology, and the terminal device can actively identify a beam identifier for next time of beam switching. Compared with the first three beam switching manners dominated by the network device, in this embodiment, calculation complexity of the UE is increased, thereby avoiding a large quantity of timer-list signaling overheads.

Based on the plurality of embodiments provided above, the network device can predict relative movement trajectory information of the terminal device in the satellite cell on the premise that the network device has mastered beam ground topology information and an initial access location of the terminal device, and automatically complete beam switching in a timing manner based on the feature design. This effectively resolves signaling overheads caused by frequent beam switching in the NTN. In addition, it is provided in the design that delivering, by the network device, a switching beam ID can avoid L1-RSRP measurement of the terminal device, to achieve the objective of saving energy.

With reference to FIG. 3 to FIG. 12, the foregoing describes in detail the beam switching method side embodiments provided in the embodiments of this application. With reference to FIG. 13 to FIG. 16, the following describes in detail apparatus side embodiments of this application. It should be understood that descriptions of method embodiments correspond to descriptions of apparatus embodiments. Therefore, for content that is not described in detail, refer to the foregoing method embodiments.

The foregoing mainly describes the solutions provided in embodiments of this application from a perspective of interaction between network elements. It may be understood that, to implement the foregoing functions, each network element, for example, the network device or the terminal device, includes a corresponding hardware structure and/or software module for performing each function. A person skilled in the art should be able to be aware that, in combination with the examples described in embodiments disclosed in this specification, units and algorithm steps can be implemented by hardware or a combination of hardware and computer hardware in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, functional modules of the network device or the terminal apparatus may be divided based on the foregoing method example. For example, each functional module may be divided based on corresponding functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation. An example in which each functional module is obtained through division based on each corresponding function is used below for description.

Figure 13:
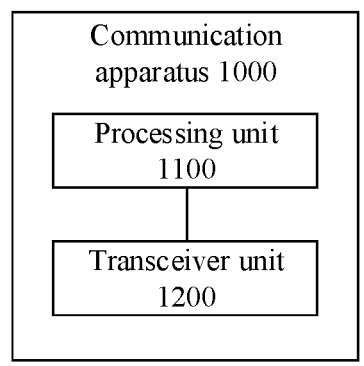
FIG. 13 is a schematic diagram of an example of a beam switching apparatus applicable to this application.

FIG. 13 is a schematic block diagram of a beam switching apparatus according to an embodiment of this application. As shown in FIG. 13, the apparatus 1000 may include a processing unit 1100 and a transceiver unit 1200.

Optionally, the apparatus 1000 may correspond to the terminal device in the foregoing method embodiment, for example, may be a terminal device, or a component (such as a circuit, a chip, or a chip system) configured in the terminal device.

For example, the transceiver unit 1200 is configured for the terminal device to send first location information of the terminal device.

The transceiver unit 11 is further configured for the terminal device to receive first indication information, where the first indication information indicates one or more of K switching time periods, the K switching time periods are determined based on first information, the first information includes the first location information of the terminal device, location information of the satellite device, a velocity vector of the satellite device, and beam information of the satellite device. The K switching time periods are time periods in which the terminal device performs K times of beam switching, and K is a positive integer greater than or equal to 1.

The processing unit 1100 is configured for the terminal device to perform beam switching based on the first indication information.

For example, the transceiver unit 1200 is configured for the terminal device to receive a satellite ephemeris message list, where the satellite ephemeris message list includes a synchronization signal block identifier, a beam angle of the satellite device, and the location information of the satellite device, and the satellite ephemeris message list is for determining a satellite beam topology around the terminal device.

The transceiver unit 1200 is further configured for the terminal device to send a first request message, where the first request message includes identification information of a second beam, the identification information of the second beam is determined based on the satellite ephemeris message list, the first request message is for requesting to switch from a current serving beam to the second beam in a first time period, and the first time period is determined based on the first location information of the terminal device and the satellite ephemeris message list.

It should be understood that the apparatus 1000 may correspond to the terminal device in the method 300, the method 500, the method 700, the method 900, the method 1000, or the method 1200 according to embodiments of this application. The apparatus 1000 may include units configured to perform the method 300 in FIG. 3, the method 500 in FIG. 5, the method 700 in FIG. 7, the method 900 in FIG. 9, the method 1000 in FIG. 10, or the method 1200 in FIG. 12. In addition, the units in the apparatus 1000 and the foregoing other operations and/or functions are respectively used to implement corresponding procedures of the method 300 in FIG. 3, the method 500 in FIG. 5, the method 700 in FIG. 7, the method 900 in FIG. 9, the method 1000 in FIG. 10, or the method 1200 in FIG. 12.

When the apparatus 1000 is configured to perform the method 300 in FIG. 3, the processing unit 1100 may be configured to perform step S340 in the method 300, and the transceiver unit 1200 may be configured to perform step S310 and step S330 in the method 300. It should be further understood that a specific process in which the units perform the foregoing corresponding steps is described in detail in the foregoing method embodiments, and for brevity, details are not described herein.

When the apparatus 1000 is configured to perform the method 500 in FIG. 5, the processing unit 1100 may be configured to perform step S550 in the method 500, and the transceiver unit 1200 may be configured to perform step S510 and step S540 in the method 500. It should be further understood that a specific process in which the units perform the foregoing corresponding steps is described in detail in the foregoing method embodiments, and for brevity, details are not described herein.

When the apparatus 1000 is configured to perform the method 700 in FIG. 7, the processing unit 1100 may be configured to perform step S760 in the method 700, and the transceiver unit 1200 may be configured to perform step S730, step S740, and step S750 in the method 700. It should be further understood that a specific process in which the units perform the foregoing corresponding steps is described in detail in the foregoing method embodiments, and for brevity, details are not described herein.

When the apparatus 1000 is configured to perform the method 900 in FIG. 9, the processing unit 1100 may be configured to perform step S960 in the method 900, and the transceiver unit 1200 may be configured to perform step S930, step S940, and step S950 in the method 900. It should be further understood that a specific process in which the units perform the foregoing corresponding steps is described in detail in the foregoing method embodiments, and for brevity, details are not described herein.

When the apparatus 1000 is configured to perform the method 1000 in FIG. 10, the transceiver unit 1200 may be configured to perform step S1010 and step S1020 in the method 1000. It should be further understood that a specific process in which the units perform the foregoing corresponding steps is described in detail in the foregoing method embodiments, and for brevity, details are not described herein.

When the apparatus 1000 is configured to perform the method 1200 in FIG. 12, the processing unit 1100 may be configured to perform step S1220, step S1230, and step S1260 in the method 1200, and the transceiver unit 1200 may be configured to perform step S1210, step S1240, and step S1250 in the method 1200. It should be further understood that a specific process in which the units perform the foregoing corresponding steps is described in detail in the foregoing method embodiments, and for brevity, details are not described herein.

Figure 14:
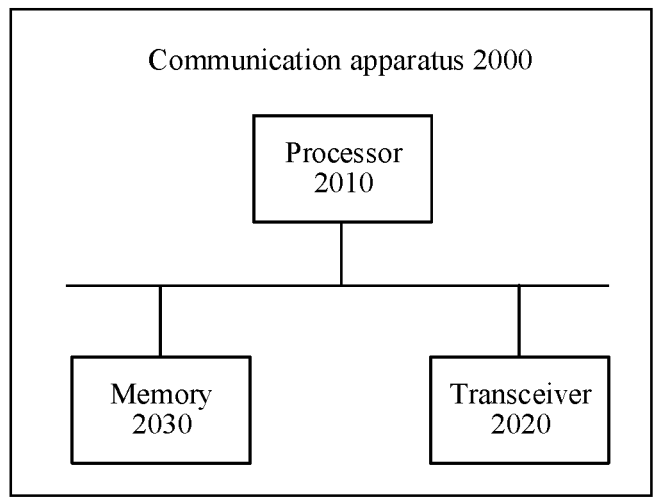
FIG. 14 is a schematic diagram of another example of a beam switching apparatus applicable to this application.
Figure 15:
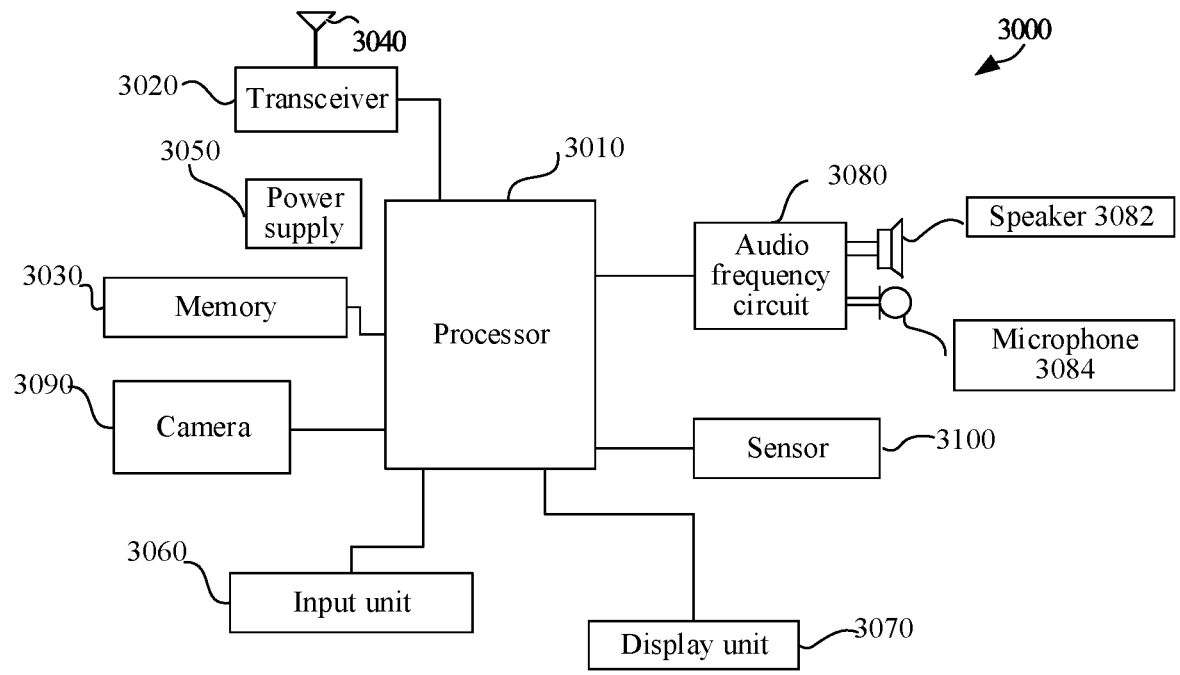
FIG. 15 is a schematic diagram of an example of a terminal device applicable to this application.

It should be further understood that when the apparatus 1000 is a terminal device, the transceiver unit 1200 in the apparatus 1000 may be implemented by a transceiver, for example, may correspond to a transceiver 2020 in an apparatus 2000 shown in FIG. 14 or a transceiver 3020 in a terminal device 3000 shown in FIG. 15. The processing unit 1100 in the apparatus 1000 may be implemented by at least one processor, for example, may correspond to a processor 2010 in the apparatus 2000 shown in FIG. 14 or a processor 3010 in the terminal device 3000 shown in FIG.

It should be further understood that when the apparatus 1000 is a chip or a chip system configured in a terminal device, the transceiver unit 1200 in the apparatus 1000 may be implemented by an input/output interface, a circuit, or the like, and the processing unit 1100 in the apparatus 1000 may be implemented by a processor, a microprocessor, an integrated circuit, or the like integrated in the chip or the chip system.

Optionally, the apparatus 1000 may correspond to the network device in the foregoing method embodiment, for example, may be a network device or a component (such as a circuit, a chip, or a chip system) configured in the network device.

For example, the transceiver unit 1200 is configured for the network device to receive the first location information of the terminal device.

The processing unit 1100 is configured for the network device to determine K switching time periods based on first information, where the first information includes the first location information of the terminal device, the location information of the satellite device, the velocity vector of the satellite device, and the beam information of the satellite device, the K switching time periods are time periods in which the terminal device performs K times of beam switching, and K is a positive integer greater than or equal to 1.

The transceiver unit 1200 is further configured for the network device to send first indication information, where the first indication information indicates one or more of the K switching time periods.

For example, the transceiver unit 1200 is configured for the network device to broadcast a satellite ephemeris message list to, where the satellite ephemeris message list includes the synchronization signal block identifier, the beam angle of the satellite device, and the location information of the satellite device, and the satellite ephemeris message list is for determining the satellite beam topology around the terminal device.

The transceiver unit 1200 is further configured for the network device to receive a first request message, where the first request message includes the identification information of the second beam, the identification information of the second beam is determined based on the satellite ephemeris message list, the first request message is for requesting to switch from the current serving beam to the second beam in the first time period, and the first time period is determined based on the first location information of the terminal device and the satellite ephemeris message list.

It should be understood that the apparatus 1000 may correspond to the network device (for example, the satellite device) in the method 300, the method 500, the method 700, the method 900, the method 1000, or the method 1200 according to embodiments of this application. The apparatus 1000 may include units configured to perform the method 300 in FIG. 3, the method 500 in FIG. 5, the method 700 in FIG. 7, the method 900 in FIG. 9, the method 1000 in FIG. 10, or the method 1200 in FIG. 12. In addition, the units in the apparatus 1000 and the foregoing other operations and/or functions are respectively used to implement corresponding procedures of the method 300 in FIG. 3, the method 500 in FIG. 5, the method 700 in FIG. 7, the method 900 in FIG. 9, the method 1000 in FIG. 10, or the method 1200 in FIG. 12.

When the apparatus 1000 is configured to perform the method 300 in FIG. 3, the processing unit 1100 may be configured to perform step S320 in the method 300, and the transceiver unit 1200 may be configured to perform step S310 and step S330 in the method 300. It should be further understood that a specific process in which the units perform the foregoing corresponding steps is described in detail in the foregoing method embodiments, and for brevity, details are not described herein.

When the apparatus 1000 is configured to perform the method 500 in FIG. 5, the processing unit 1100 may be configured to perform step S520 and step S530 in the method 500, and the transceiver unit 1200 may be configured to perform step S510 and step S540 in the method 500. It should be further understood that a specific process in which the units perform the foregoing corresponding steps is described in detail in the foregoing method embodiments, and for brevity, details are not described herein.

When the apparatus 1000 is configured to perform the method 700 in FIG. 7, the processing unit 1100 may be configured to perform step S710 and step S720 in the method 700, and the transceiver unit 1200 may be configured to perform step S730, step S740, and step S750 in the method 700. It should be further understood that a specific process in which the units perform the foregoing corresponding steps is described in detail in the foregoing method embodiments, and for brevity, details are not described herein.

When the apparatus 1000 is configured to perform the method 900 in FIG. 9, the processing unit 1100 may be configured to perform step S910 and step S920 in the method 900, and the transceiver unit 1200 may be configured to perform step S930, step S940, and step S950 in the method 900. It should be further understood that a specific process in which the units perform the foregoing corresponding steps is described in detail in the foregoing method embodiments, and for brevity, details are not described herein.

When the apparatus 1000 is configured to perform the method 1000 in FIG. 10, the transceiver unit 1200 may be configured to perform step S1010 and step S1020 in the method 1000. It should be further understood that a specific process in which the units perform the foregoing corresponding steps is described in detail in the foregoing method embodiments, and for brevity, details are not described herein.

When the apparatus 1000 is configured to perform the method 1200 in FIG. 12, the transceiver unit 1200 may be configured to perform step S1210, step S1240, and step S1250 in the method 1200. It should be further understood that a specific process in which the units perform the foregoing corresponding steps is described in detail in the foregoing method embodiments, and for brevity, details are not described herein.

Figure 16:
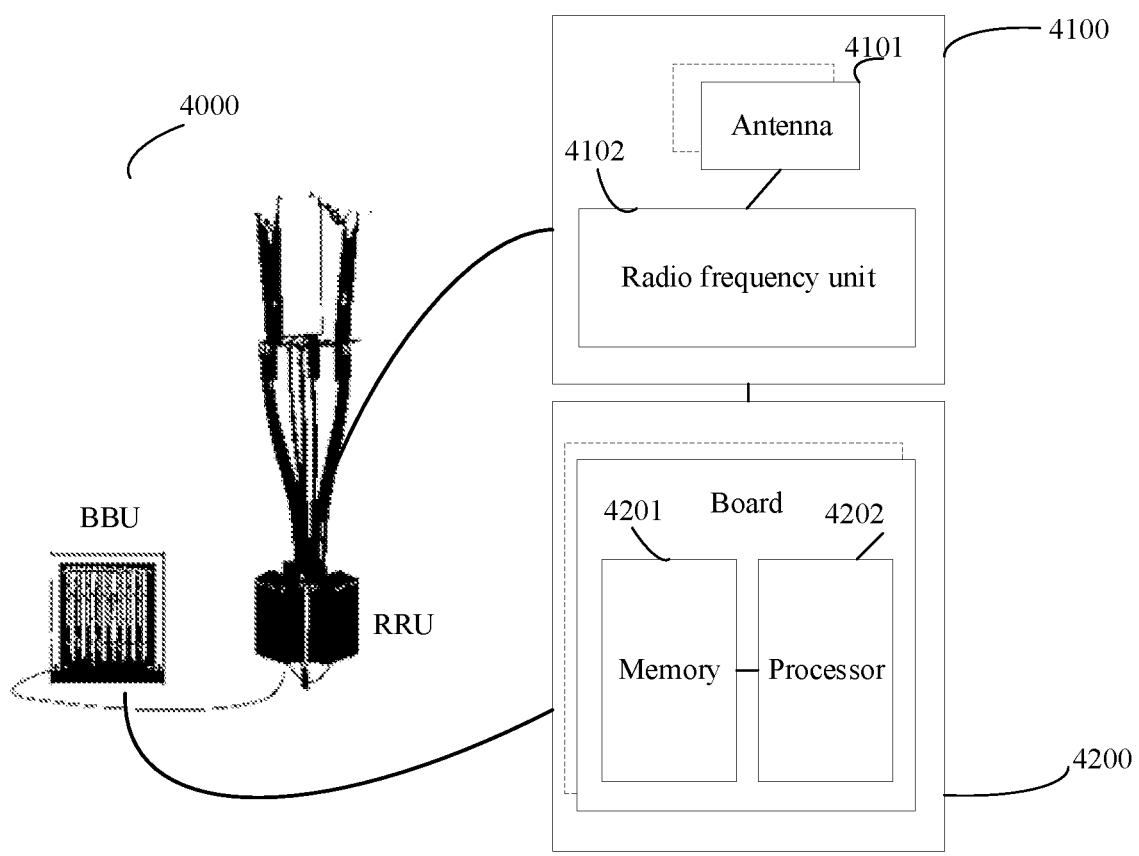
FIG. 16 is a schematic diagram of an example of a network device applicable to this application.

It should be further understood that when the apparatus 1000 is a network device, the transceiver unit 1200 in the apparatus 1000 may be implemented by a transceiver, for example, may be corresponding to the transceiver 2020 in the apparatus 2000 shown in FIG. 14 or a remote radio unit (RRU) 4100 in a network device 4000 shown in FIG. 16. The processing unit 1100 in the apparatus 1000 may be implemented by at least one processor, for example, may correspond to the processor 2010 in the apparatus 2000 shown in FIG. 14 or a processing unit 4200 or a processor 4202 in the network device 4000 shown in FIG. 16.

It should be further understood that when the apparatus 1000 is a chip or a chip system configured in a network device, the transceiver unit 1200 in the apparatus 1000 may be implemented by an input/output interface, a circuit, or the like, and the processing unit 1100 in the apparatus 1000 may be implemented by a processor, a microprocessor, an integrated circuit, or the like integrated in the chip or the chip system.

FIG. 14 is another schematic block diagram of a beam switching apparatus 2000 according to an embodiment of this application. As shown in FIG. 14, the apparatus 2000 includes a processor 2010, a transceiver 2020, and a memory 2030. The processor 2010, the transceiver 2020, and the memory 2030 communicate with each other via an internal connection path. The memory 2030 is configured to store instructions. The processor 2010 is configured to execute the instructions stored in the memory 2030, to control the transceiver 2020 to send and/or receive signals.

It should be understood that the apparatus 2000 may correspond to the network device (for example, the satellite device) in the foregoing method embodiments, and may be configured to perform steps and/or procedures performed by the network device in the foregoing method embodiments.

By way of example rather than a limitation, the transceiver 2020 is configured for the network device to receive first location information of a terminal device.

The processor 2010 is configured for the network device to determine K switching time periods based on first information, where the first information includes the first location information of the terminal device, location information of the satellite device, a velocity vector of the satellite device, and beam information of the satellite device, the K switching time periods are time periods in which the terminal device performs K times of beam switching, and K is a positive integer greater than or equal to 1.

The transceiver 2020 is further configured for the network device to send first indication information, where the first indication information indicates one or more of the K switching time periods.

By way of example rather than a limitation, the transceiver 2020 is configured for the network device to broadcast a satellite ephemeris message list, where the satellite ephemeris message list includes a synchronization signal block identifier, the beam angle of the satellite device, and the location information of the satellite device, and the satellite ephemeris message list is for determining a satellite beam topology around the terminal device.

The transceiver 2020 is further configured for the network device to receive a first request message, where the first request message includes identification information of a second beam, the identification information of the second beam is determined based on the satellite ephemeris message list, the first request message is for requesting to switch from a current serving beam to the second beam in a first time period, and the first time period is determined based on the first location information of the terminal device and the satellite ephemeris message list.

Optionally, the memory 2030 may include a read-only memory and a random access memory, and provide instructions and data to the processor. A part of the memory may further include a non-volatile random access memory. The memory 2030 may be an independent device, or may be integrated into the processor 2010. The processor 2010 may be configured to execute the instructions stored in the memory 2030, and when the processor 2010 executes the instructions stored in the memory, the processor 2010 is configured to perform the steps and/or the procedures corresponding to the network device in the foregoing method embodiments.

Optionally, the communication apparatus 2000 is a network device (for example, a satellite device) in the method 300, the method 500, the method 700, the method 900, or the method 1200 in the foregoing embodiments.

The transceiver 2020 may include a transmitter and a receiver. The transceiver 2020 may further include an antenna, and there may be one or more antennas. The processor 2010, the memory 2030, and the transceiver 2020 may be components integrated on different chips. For example, the processor 2010 and the memory 2030 may be integrated into a baseband chip, and the transceiver 2020 may be integrated into a radio frequency chip. Alternatively, the processor 2010, the memory 2030, and the transceiver 2020 may be components integrated on a same chip. This is not limited in this application.

Optionally, the apparatus 2000 is a component, such as a circuit, a chip, or a chip system, configured in a network device (for example, a satellite device).

Alternatively, the transceiver 2020 may be a communication interface, such as an input/output interface or a circuit. The transceiver 2020, the processor 2010, and the memory 2030 may be integrated into a same chip, for example, integrated into the baseband chip.

It should be understood that the apparatus 2000 may further correspond to the terminal device (for example, the UE) in the foregoing method embodiments, and may be configured to perform steps and/or procedures performed by the terminal device in the foregoing method embodiments.

By way of example rather than a limitation, the transceiver 2020 is configured for the terminal device to send first location information of the terminal device.

The transceiver 2020 is further configured for the terminal device to receive first indication information, where the first indication information indicates one or more of K switching time periods, the K switching time periods are determined based on first information, the first information includes the first location information of the terminal device, location information of the satellite device, a velocity vector of the satellite device, and beam information of the satellite device. The K switching time periods are time periods in which the terminal device performs K times of beam switching, and K is a positive integer greater than or equal to 1.

The processor 2010 is configured for the terminal device to perform beam switching based on the first indication information.

By way of example rather than a limitation, the transceiver 2020 is configured for the terminal device to receive a satellite ephemeris message list, where the satellite ephemeris message list includes the synchronization signal block identifier, the beam angle of the satellite device, and the location information of the satellite device, and the satellite ephemeris message list is for determining the satellite beam topology around the terminal device.

The transceiver 2020 is further configured for the terminal device to send a first request message, where the first request message includes the identification information of the second beam, the identification information of the second beam is determined based on the satellite ephemeris message list, the first request message is for requesting to switch from the current serving beam to the second beam in the first time period, and the first time period is determined based on the first location information of the terminal device and the satellite ephemeris message list.

Optionally, the memory 2030 may include a read-only memory and a random access memory, and provide instructions and data to the processor. A part of the memory may further include a non-volatile random access memory. The memory 2030 may be an independent device, or may be integrated into the processor 2010. The processor 2010 may be configured to execute the instructions stored in the memory 2030, and when the processor 2010 executes the instructions stored in the memory, the processor 2010 is configured to perform the steps and/or the procedures corresponding to the terminal device in the foregoing method embodiments.

Optionally, the communication apparatus 2000 is the terminal device in the method 300, the method 500, the method 700, the method 900, the method 1000, or the method 1200 in the foregoing embodiments.

The transceiver 2020 may include a transmitter and a receiver. The transceiver 2020 may further include an antenna, and there may be one or more antennas. The processor 2010, the memory 2030, and the transceiver 2020 may be components integrated on different chips. For example, the processor 2010 and the memory 2030 may be integrated into a baseband chip, and the transceiver 2020 may be integrated into a radio frequency chip. Alternatively, the processor 2010, the memory 2030, and the transceiver 2020 may be components integrated on a same chip. This is not limited in this application.

Optionally, the apparatus 2000 is a component configured in the terminal device, such as a circuit, a chip, or a chip system.

Alternatively, the transceiver 2020 may be a communication interface, such as an input/output interface or a circuit. The transceiver 2020, the processor 2010, and the memory 2020 may be integrated into a same chip, for example, integrated into the baseband chip.

FIG. 15 is a schematic structural diagram of a terminal device 3000 according to an embodiment of this application. The terminal device 3000 may be applied to the system shown in FIG. 1 and/or FIG. 2, to perform functions of the terminal device in the foregoing method embodiments. As shown in FIG. 15, the terminal device 3000 includes a processor 3010 and a transceiver 3020. Optionally, the terminal device 3000 further includes a memory 3030. The processor 3010, the transceiver 3020, and the memory 3030 may communicate with each other via an internal connection path, to transmit a control signal and/or a data signal. The memory 3030 is configured to store a computer program. The processor 3010 is configured to invoke the computer program from the memory 3030 and run the computer program, to control the transceiver 3020 to send and receive signals. Optionally, the terminal device 3000 may further include an antenna 3040, configured to send uplink data or uplink control signaling output by the transceiver 3020 via a radio signal.

The processor 3010 and the memory 3030 may be combined into one processing apparatus. The processor 3010 is configured to execute program code stored in the memory 3030 to implement the foregoing functions. During a specific implementation, the memory 3030 may also be integrated into the processor 3010, or may be independent of the processor 3010. The processor 3010 may be corresponding to the processing unit 1100 in FIG. 13 or the processor 2010 in FIG. 14.

The transceiver 3020 may be corresponding to the transceiver unit 1200 in FIG. 13 or the transceiver 2020 in FIG. 13. The transceiver 3020 may include a receiver (or referred to as a receiving machine or a receiver circuit) and a transmitter (or referred to as a transmitting machine or a transmitter circuit). The receiver is configured to receive a signal, and the transmitter is configured to transmit a signal.

By way of example rather than a limitation, the transceiver 3020 is configured for the terminal device to send first location information of the terminal device.

The transceiver 3020 is further configured for the terminal device to receive first indication information, where the first indication information indicates one or more of K switching time periods, the K switching time periods are determined based on first information, the first information includes the first location information of the terminal device, location information of the satellite device, a speed vector of the satellite device, and beam information of the satellite device. The K switching time periods are time periods in which the terminal device performs K times of beam switching, and K is a positive integer greater than or equal to 1.

The processor 3010 is configured for the terminal device to perform beam switching based on the first indication information.

By way of example rather than a limitation, the transceiver 3020 is configured for the terminal device to receive a satellite ephemeris message list, where the satellite ephemeris message list includes the synchronization signal block identifier, the beam angle of the satellite device, and the location information of the satellite device, and the satellite ephemeris message list is for determining the satellite beam topology around the terminal device.

The transceiver 3020 is further configured for the terminal device to send a first request message, where the first request message includes the identification information of the second beam, the identification information of the second beam is determined based on the satellite ephemeris message list, the first request message is for requesting to switch from the current serving beam to the second beam in the first time period, and the first time period is determined based on the first location information of the terminal device and the satellite ephemeris message list.

It should be understood that the terminal device 3000 shown in FIG. 15 can implement processes related to the terminal device in the embodiment in FIG. 3, FIG. 5, FIG. 7, FIG. 9, FIG. or FIG. 12. The operations and/or the functions of the modules in the terminal device 3000 are respectively used to implement corresponding procedures in the foregoing method embodiments. For details, reference may be made to the description in the foregoing method embodiment. To avoid repetition, detailed description is appropriately omitted herein.

The processor 3010 may be configured to perform an action that is implemented inside the terminal device and that is described in the foregoing method embodiments, and the transceiver 3020 may be configured to perform an action that is sent by the terminal device to the network device or received from the network device and that is described in the foregoing method embodiments. For details, refer to the description in the foregoing method embodiment, and details are not described herein again.

Optionally, the terminal device 3000 may further include a power supply 3050, configured to supply power to various components or circuits in the terminal device.

In addition, to make functions of the terminal device more complete, the terminal device 3000 may further include one or more of an input unit 3060, a display unit 3070, an audio frequency circuit 3080, a camera 3090, a sensor 3100, and the like. The audio frequency circuit may further include a speaker 3082, a microphone 3084, and the like.

FIG. 16 is a schematic structural diagram of a network device according to an embodiment of this application, for example, may be a schematic structural diagram of a base station. The base station 4000 may be applied to the system shown in FIG. 1 and/or FIG. 2, and performs functions of the network device in the foregoing method embodiments. As shown in the figure, the base station 4000 may include one or more radio frequency units, such as a remote radio unit (RRU) 4100 and one or more baseband units (BBU) 4200, which may also be referred to as a distributed unit (DU). The RRU 4100 may be referred to as a transceiver unit, and may correspond to the transceiver unit 1200 in FIG. 13 or the transceiver 2020 in FIG. 14.

Optionally, the RRU 4100 may also be referred to as a transceiver, a transceiver circuit, a transceiver, or the like, and may include at least one antenna 4101 and a radio frequency unit 4102. Optionally, the RRU 4100 may include a receiving unit and a sending unit. The receiving unit may correspond to a receiver (or referred to as a receiving machine or a receiver circuit), and the sending unit may correspond to a transmitter (or referred to as a transmitting machine or a transmitter circuit). The RRU 4100 part is mainly configured to receive and send a radio frequency signal and perform conversion between the radio frequency signal and a baseband signal, for example, configured to send indication information to a terminal device. The BBU 4200 is mainly configured to perform baseband processing, control the base station, and the like. The RRU 4100 and the BBU 4200 may be physically disposed together, or may be physically disposed separately, that is, a distributed base station.

The BBU 4200 is a control center of the base station, may also be referred to as a processing unit, may correspond to the processing unit 1100 in FIG. 13 or the processor 2010 in FIG. 14, and is mainly configured to complete a baseband processing function, such as channel coding, multiplexing, modulation, and spectrum spreading. For example, the BBU (the processing unit) may be configured to control the base station to perform an operation procedure related to the network device in the foregoing method embodiment, for example, generate the foregoing indication information.

In an example, the BBU 4200 may include one or more boards. A plurality of boards may jointly support a radio access network (for example, an LTE network) of a single access standard, or may separately support radio access networks (for example, an LTE network, a 5G network, or another network) of different access standards. The BBU 4200 further includes a memory 4201 and a processor 4202. The memory 4201 is configured to store necessary instructions and necessary data. The processor 4202 is configured to control the base station to perform a necessary action, for example, configured to control the base station to perform an operation procedure related to the network device in the foregoing method embodiment. The memory 4201 and the processor 4202 may serve one or more boards. That is, a memory and a processor may be separately disposed on each board. Alternatively, a plurality of boards may share a same memory and a same processor. In addition, a necessary circuit may be further disposed on each board.

By way of example rather than a limitation, the transceiver 4100 is configured for the network device to receive first location information of a terminal device.

The processor 4202 is configured for the network device to determine K switching time periods based on first information, where the first information includes the first location information of the terminal device, location information of the satellite device, a velocity vector of the satellite device, and beam information of the satellite device, the K switching time periods are time periods in which the terminal device performs K times of beam switching, and K is a positive integer greater than or equal to 1.

The transceiver 4100 is further configured for the network device to send first indication information, where the first indication information indicates one or more of the K switching time periods.

By way of example rather than a limitation, the transceiver 4100 is configured for the network device to broadcast a satellite ephemeris message list, where the satellite ephemeris message list includes a synchronization signal block identifier, the beam angle of the satellite device, and the location information of the satellite device, and the satellite ephemeris message list is for determining a satellite beam topology around the terminal device.

The transceiver 4100 is further configured for the network device to receive a first request message, where the first request message includes identification information of a second beam, the identification information of the second beam is determined based on the satellite ephemeris message list, the first request message is for requesting to switch from a current serving beam to the second beam in a first time period, and the first time period is determined based on the first location information of the terminal device and the satellite ephemeris message list.

It should be understood that the base station 4000 shown in FIG. 16 can implement processes related to the network device in the method embodiment shown in FIG. 3, FIG. 5, FIG. 7, FIG. 9, FIG. 10, or FIG. 12. Operations and/or functions of the modules in the base station 4000 are respectively used to implement corresponding procedures in the foregoing method embodiments. For details, reference may be made to the description in the foregoing method embodiment. To avoid repetition, detailed description is appropriately omitted herein.

The BBU 4200 may be configured to perform an action that is implemented inside the network device and that is described in the foregoing method embodiments, and the RRU 4100 may be configured to perform an action that is sent by the network device to the terminal device or received from the terminal device and that is described in the foregoing method embodiments. For details, refer to the description in the foregoing method embodiment, and details are not described herein again.

It should be understood that the base station 4000 shown in FIG. 16 is merely a possible form of the network device, and should not constitute any limitation on this application. The method provided in this application is applicable to a network device in another form. For example, the network device includes an AAU, and may further include a CU and/or a DU, or include a BBU and an adaptive radio unit (ARU), or a BBU; or may be a customer premises equipment (CPE), or may be in another form. A specific form of the network device is not limited in this application.

The CU and/or the DU may be configured to perform an action that is implemented inside the network device and that is described in the foregoing method embodiments, and the AAU may be configured to perform an action that is sent by the network device to the terminal device or received from the terminal device and that is described in the foregoing method embodiments. For details, refer to the description in the foregoing method embodiment, and details are not described herein again.

This application further provides a processing apparatus, including at least one processor. The at least one processor is configured to execute a computer program stored in a memory, to enable the processing apparatus to perform the method performed by the terminal device or the network device in any one of the foregoing method embodiments.

It should be understood that the processing apparatus may be one or more chips. For example, the processing apparatus may be a field programmable gate array (FPGA), an application specific integrated circuit (ASIC), a system on chip (SoC), a central processor unit (CPU), a network processor (NP), a digital signal processor (DSP), a micro controller unit (MCU), a programmable logic controller (PLD), or another integrated chip, or another programmable logic device, a discrete gate or transistor logic device, a discrete hardware component, or the like. It may implement or perform the methods, the steps, and logical block diagrams that are disclosed in the embodiments of this application. The general purpose processor may be a microprocessor, or the processor may be any conventional processor or the like.

Embodiments of this application further provide a processing apparatus, including a processor and a communication interface. The communication interface is coupled to the processor. The communication interface is configured to input and/or output information. The information includes at least one of instructions and data. The processor is configured to execute a computer program, to enable the processing apparatus to perform the method performed by the terminal device or the network device in any one of the foregoing method embodiments.

Embodiments of this application further provide a processing apparatus, including a processor and a memory. The memory is configured to store a computer program, and the processor is configured to invoke the computer program from the memory and run the computer program, to enable the processing apparatus to perform the method performed by the terminal device or the network device in any one of the foregoing method embodiments.

Based on the method provided in embodiments of this application, this application further provides a computer program product. The computer program product includes computer program code. When the computer program code is run on a computer, the computer is enabled to perform the method performed by the terminal device in the embodiment shown in FIG. 3, FIG. 5, FIG. 7, FIG. 9, FIG. 10, or FIG. 12.

Based on the method provided in embodiments of this application, this application further provides a computer-readable storage medium. The computer-readable storage medium stores program code. When the program code is run on a computer, the computer is enabled to perform the method performed by the terminal device in the embodiment shown in FIG. 3, FIG. 5, FIG. 7, FIG. 9, FIG. 10, or FIG. 12.

Based on the methods provided in embodiments of this application, this application further provides a system. The system includes the foregoing one or more terminal devices and the foregoing one or more network devices.

The network device and the terminal device in the foregoing apparatus embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a specific function of the unit, refer to the corresponding method embodiment. There may be one or more processors.

In the foregoing embodiment, the terminal device may be used as an example of a receiving device, and the network device may be used as an example of a sending device. However, this should not constitute any limitation on this application. For example, both the sending device and the receiving device may be terminal devices. Specific types of the sending device and the receiving device are not limited in this application.

It should be noted that, the processor in embodiments of this application may be an integrated circuit chip, and has a signal processing capability. In an implementation process, the steps in the foregoing method embodiments may be implemented by a hardware integrated logic circuit in the processor, or by instructions in a form of software. The method disclosed with reference to embodiments of this application may be directly performed and completed by a hardware decoding processor, or may be performed and completed by a combination of hardware and a software module in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory SLDRAM), and a direct rambus random access memory (DR RAM). It should be noted that the memories of the system and method described herein are intended to include, but are not limited to, these and any other suitable types of memories.

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the computer instructions or the computer programs are loaded or executed on a computer, the procedures or functions based on embodiments of this application are all or partially generated. The computer may be a general-purpose computer, a dedicated computer, a computer network, or another programmable apparatus. The computer instructions may be stored on a computer-readable storage medium, or transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid state drive.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division during an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory ROM, a random access memory RAM, a magnetic disk, or an optical disc.

In embodiments of this application, the terminal device or the network device includes a hardware layer, an operating system layer running on the hardware layer, and an application layer running on the operating system layer. The hardware layer includes hardware such as a central processing unit CPU, a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a windows operating system. The application layer includes applications such as a browser, an address book, word processing software, and instant messaging software. In addition, a specific structure of an execution entity of a method provided in the embodiments of this application is not specifically limited in the embodiments of this application, provided that a program that records code of the method provided in the embodiments of this application can be run to perform communication according to the method provided in the embodiments of this application. For example, the execution entity of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam switching method, comprising:
   receiving, by a network device, first location information of a terminal device;
   determining, by the network device, K switching time periods based on first information, wherein the first information comprises the first location information of the terminal device, location information of a satellite device, a velocity vector of the satellite device, and beam information of the satellite device, the K switching time periods are time periods in which the terminal device performs K times of beam switching, and K is a positive integer greater than or equal to 1; and
   sending, by the network device, first indication information, wherein the first indication information indicates one or more of the K switching time periods.

2. The method according to claim 1, wherein the beam information of the satellite device comprises a pitch angle and an azimuth of a beam, the beam information of the satellite device and the location information of the satellite device are for determining a satellite beam topology, the satellite beam topology comprises a projection shape, a beam width, and a beam boundary of the beam on the ground, and the satellite beam topology, the first location information of the terminal device, and the velocity vector of the satellite device are for determining a movement trajectory of the terminal device.

3. The method according to claim 1, wherein the method further comprises:
   sending, by the network device, a first message list, wherein the first message list indicates the K switching time periods, the first message list comprises K indexes and K time periods, the K indexes are in a one-to-one correspondence with the K time periods, the K indexes indicate a sequence of the K times of beam switching, and the sequence of the K times of beam switching is a sequence of beam switching performed when the terminal device moves out of a cell covered by the satellite device from a current location; and the K time periods indicate a time period in which the terminal device sequentially performs beam switching from a current moment to an $i^{th}$ time of beam switching, and i is a positive integer greater than or equal to 1 and less than or equal to K.

4. The method according to claim 3, wherein the method further comprises:
   receiving, by the network device, second location information of the terminal device; and
   updating, by the network device, a movement trajectory of the terminal device and the first message list when a distance difference between the second location information of the terminal device and a predetermined location in the movement trajectory of the terminal device is greater than a first preset threshold.

5. The method according to claim 3, wherein the first message list comprises K pieces of beam identification information, the K pieces of beam identification information are in a one-to-one correspondence with the K time periods, and the K pieces of beam identification information identify corresponding beams on which the K times of beam switching are sequentially performed.

6. The method according to claim 1, wherein values of the K time periods are obtained in a differential manner.

7. The method according to claim 1, wherein the method further comprises:
   broadcasting, by the network device, a second message list, wherein the second message list indicates the K switching time periods, the second message list comprises K indexes and K time periods, the K indexes are in a one-to-one correspondence with the K time periods, each of the K indexes indicates a quantity of beam spacings crossed by a relative location of the terminal device from a current location to a $j^{th}$ time of beam switching; and the K time periods indicate a time period in which the terminal device performs beam switching from a current moment to the $j^{th}$ time of beam switching, and j is a positive integer greater than or equal to 1 and less than or equal to N; and
   sending, by the network device, second indication information, wherein the second indication information comprises a first index, the first index is one of the K indexes, and the second indication information indicates a beam switching time period corresponding to the first index.

8. The method according to claim 7, wherein the second indication information further comprises identification information of a first beam, the identification information of the first beam is beam identification information of the terminal device that performs the $j^{th}$ beam switching, and the identification information of the first beam corresponds to the first index.

9. A beam switching method, comprising:
   sending, by a terminal device, first location information of the terminal device; and
   receiving, by the terminal device, first indication information, wherein the first indication information indicates one or more of K switching time periods, the K switching time periods are determined based on first information, the first information comprises the first location information of the terminal device, location information of a satellite device, a velocity vector of the satellite device, and beam information of the satellite device, the K switching time periods are time periods in which the terminal device performs K times of beam switching, and K is a positive integer greater than or equal to 1; and
   performing, by the terminal device, beam switching based on the first indication information.

10. The method according to claim 9, wherein the beam information of the satellite device comprises a pitch angle and an azimuth of a beam, the beam information of the satellite device and the location information of the satellite device are for determining a satellite beam topology, the satellite beam topology comprises a projection shape, a beam width, and a beam boundary of the beam on the ground, and the satellite beam topology, the first location information of the terminal device, and the velocity vector of the satellite device are for determining a movement trajectory of the terminal device.

11. The method according to claim 9, wherein the method further comprises:
   receiving, by the terminal device, a first message list, wherein the first message list indicates the K switching time periods, the first message list comprises K indexes and K time periods, the K indexes are in a one-to-one correspondence with the K time periods, the K indexes indicate a sequence of the K times of beam switching, and the sequence of the K times of beam switching is a sequence of beam switching performed when the terminal device moves out of a cell covered by the satellite device from a current location; and the K time periods indicate a time period in which the terminal device sequentially performs beam switching from a current moment to an $i^{th}$ time of beam switching, and i is a positive integer greater than or equal to 1 and less than or equal to K; and performing, by the terminal device, beam switching based on the first message list.

12. The method according to claim 11, wherein the first message list comprises K pieces of beam identification information, the K pieces of beam identification information are in a one-to-one correspondence with the K time periods, and the K pieces of beam identification information identify corresponding beams on which the K times of beam switching are sequentially performed.

13. The method according to claim 9, wherein values of the K time periods are obtained in a differential manner.

14. The method according to claim 9, wherein the method further comprises:

receiving, by the terminal device, a second message list, wherein the second message list indicates the K switching time periods, the second message list comprises K indexes and K time periods, the K indexes are in a one-to-one correspondence with the K time periods, each of the K indexes indicates a quantity of beam spacings crossed by a relative location of the terminal device from a current location to a $j^{th}$ time of beam switching; and the K time periods indicate a time period in which the terminal device performs beam switching from a current moment to the $j^{th}$ time of beam switching, and j is a positive integer greater than or equal to 1 and less than or equal to N;

receiving, by the terminal device, second indication information, wherein the second indication information comprises a first index, the first index is one of the K indexes, and the second indication information indicates a beam switching time period corresponding to the first index; and performing, by the terminal device, beam switching based on the second indication information.

15. The method according to claim 14, wherein the second indication information further comprises identification information of a first beam, the identification information of the first beam is beam identification information of the terminal device that performs the $j^{th}$ beam switching, and the identification information of the first beam corresponds to the first index.

16. The method according to claim 14, wherein the second indication information is determined based on second information, the second information comprises a distance from the first location information of the terminal device to a current beam boundary, a quantity of beam spacings, and a span of a reference beam, the reference beam is a beam having a largest span along a satellite motion direction, and the quantity of beam spacings is obtained by evenly dividing the reference beam.

17. The method according to claim 9, wherein the method further comprises:

receiving, by the terminal device, the first information, wherein the first information indicates a time period corresponding to each beam spacing, and the first information is determined based on the beam information of the satellite device, the velocity vector of the satellite device, and a quantity of beam spacings.

18. The method according to claim 9, wherein the method further comprises:

sending, by the terminal device, second location information of the terminal device; and when idx #0 and idx #1 meet:

$$\mathrm{Floor}\left(\frac{t1}{T}\right) + idx\#1 \neq idx\#0$$

wherein idx #0 represents a quantity of beam spacings crossed by a relative location of the terminal device from a current location to the $j^{th}$ time of beam switching, idx #1 represents a quantity of beam spacings crossed by the relative location of the terminal device from a moment that the $j^{th}$ time of beam switching is completed to a $(j+1)^{th}$ time of beam switching, T represents a time that the terminal device crosses each beam spacing, and t1 represents a time spent by a network device from sending idx #0 to receiving the second location information of the terminal device, receiving, by the terminal device, third indication information, wherein the third indication information comprises a second index, the second index is one of the K indexes, the third indication information indicates a beam switching time period corresponding to the second index, and the third indication information is different from the second indication information.

19. The method according to claim 9, wherein the method further comprises:

determining, by the terminal device based on signal strength of a synchronization signal block, beam identification information used by the terminal device to perform beam switching; and performing, by the terminal device, beam switching based on the beam identification information.

20. A communication apparatus, comprising:

at least one processor; and one or more memories coupled to the at least one processor and storing programming instructions for execution by the at least one processor to:

send first location information of the communication apparatus; and receive first indication information, wherein the first indication information indicates one or more of K switching time periods, the K switching time periods are determined based on first information, the first information comprises the first location information of the communication apparatus, location information of a satellite device, a velocity vector of the satellite device, and beam information of the satellite device, the K switching time periods are time periods in which the communication apparatus performs K times of beam switching, and K is a positive integer greater than or equal to 1; and switch beams based on the first indication information.

* * * * *

UNITED STATES PATENT AND TRADEMARK OFFICE
CERTIFICATE OF CORRECTION

| | | |
|---|---|---|
| PATENT NO. | : 12,375,152 B2 | Page 1 of 1 |
| APPLICATION NO. | : 18/479523 | |
| DATED | : July 29, 2025 | |
| INVENTOR(S) | : Feiran Zhao et al. | |

It is certified that error appears in the above-identified patent and that said Letters Patent is hereby corrected as shown below:

In the Claims

In Column 68, In Line 37, In Claim 9, after "device;" delete "and".

Signed and Sealed this
Sixteenth Day of December, 2025

John A. Squires
*Director of the United States Patent and Trademark Office*